United States Patent
Lee et al.

(10) Patent No.: US 10,091,649 B2
(45) Date of Patent: Oct. 2, 2018

(54) NETWORK ARCHITECTURE AND SECURITY WITH ENCRYPTED CLIENT DEVICE CONTEXTS

(71) Applicant: QUALCOMM Incorporated, San Diego, CA (US)

(72) Inventors: Soo Bum Lee, San Diego, CA (US); Gavin Bernard Horn, La Jolla, CA (US); Anand Palanigounder, San Diego, CA (US); Adrian Edward Escott, Reading (GB); Stefano Faccin, San Ysidro, CA (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 15/160,198

(22) Filed: May 20, 2016

(65) Prior Publication Data

US 2017/0013453 A1  Jan. 12, 2017

Related U.S. Application Data

(60) Provisional application No. 62/191,457, filed on Jul. 12, 2015, provisional application No. 62/320,506, filed on Apr. 9, 2016.

(51) Int. Cl.
  *H04W 12/04* (2009.01)
  *H04W 40/02* (2009.01)
  (Continued)

(52) U.S. Cl.
  CPC .......... *H04W 12/04* (2013.01); *H04W 40/02* (2013.01); *H04L 63/0428* (2013.01);
  (Continued)

(58) Field of Classification Search
  CPC .............................. H04W 12/04; H04W 40/02
  See application file for complete search history.

(56) References Cited

U.S. PATENT DOCUMENTS 8,494,163 B2  7/2013  Casati et al.
8,687,556 B2  4/2014  Eipe et al.
(Continued)

FOREIGN PATENT DOCUMENTS

CN  102065417 B  2/2014
EP  2757856 A1  7/2014
(Continued)

OTHER PUBLICATIONS

EventHelix (LTE Security Encryption and Integrity Protection in LTE, 2012, 11 pages).*
Partial International Search Report and Written Opinion—PCT/US2016/037279—ISA/EPO—dated Feb. 23, 2017.
(Continued)

*Primary Examiner* — Oleg Korsak
(74) *Attorney, Agent, or Firm* — Loza & Loza, LLP

(57) ABSTRACT

In an aspect, a network may support a number of client devices. In such a network, a client device transmits a request to communicate with a network, establishes a security context, and receives one or more encrypted client device contexts from the network. An encrypted client device context enables reconstruction of a context at the network for communication with the client device, where the context includes network state information associated with the client device. The client device transmits a message (e.g., including an uplink data packet) to the network that includes at least one encrypted client device context. Since the network device can reconstruct the context for the client device based on an encrypted client device context, the network device can reduce an amount of the context maintained at the network device in order to support a greater number of client devices.

31 Claims, 35 Drawing Sheets

(51) Int. Cl.
  *H04W 68/00* (2009.01)
  *H04L 29/06* (2006.01)
  *H04W 12/02* (2009.01)
  *H04W 4/70* (2018.01)

(52) U.S. Cl.
  CPC .......... *H04L 63/0457* (2013.01); *H04L 63/06* (2013.01); *H04W 4/70* (2018.02); *H04W 12/02* (2013.01); *H04W 68/005* (2013.01)

(56) References Cited

U.S. PATENT DOCUMENTS

| | | | |
|---|---|---|---|
| 9,497,624 B2* | 11/2016 | Kahn | H04W 12/04 |
| 2002/0184217 A1 | 12/2002 | Bisbee et al. | |
| 2012/0082105 A1* | 4/2012 | Hwang | H04W 76/06 370/329 |
| 2012/0269167 A1 | 10/2012 | Velev et al. | |
| 2013/0301611 A1 | 11/2013 | Baghel et al. | |
| 2013/0305386 A1 | 11/2013 | Zhang et al. | |
| 2013/0343280 A1 | 12/2013 | Lee et al. | |
| 2014/0053241 A1 | 2/2014 | Norrman et al. | |
| 2014/0126448 A1 | 5/2014 | Punz et al. | |
| 2015/0127733 A1 | 5/2015 | Ding et al. | |
| 2015/0200941 A1 | 7/2015 | Muppidi et al. | |
| 2017/0131994 A1* | 5/2017 | Middleton | G06F 8/65 |

FOREIGN PATENT DOCUMENTS

| | | |
|---|---|---|
| EP | 2804441 A1 | 11/2014 |
| WO | WO-2008152611 A1 | 12/2008 |
| WO | WO-2013024435 A1 | 2/2013 |

OTHER PUBLICATIONS

Hummen, R., etal., "Delegation-based Authentication and Authorization for the IP-based Internet of Things", 2014 Eleventh Annual IEEE International Conference on Sensing, Communication, and Networking (SECON), IEEE, Jun. 30, 2014 (Jun. 30, 2014), XP032708816, pp. 284-292. [retrieved on Dec. 16, 2014].
International Search Report and Written Opinion—PCT/US2016/037279—ISA/EPO—dated May 15, 2017.
NTT Docomo., "Signalling-Lite SDT (SL-SDT) Procedure", 3GPP Draft, S2-130378 Signalling-Lite-SDT Procedure-V4, 3rd Generation Partnership Project (3GPP), Mobile Competence Centre, 650, Route Des Lucioles, F-06921 Sophia-Antipolis Cedex, France, vol. SA WG2, No. Prague, Czech Republic, Jan. 28, 2013-Feb. 1, 2013, Jan. 25, 2013 (Jan. 25, 2013), XP050684970, Retrieved from the Internet: URL: http://www.3gpp.org/ftp/tsg_sa/WG2_Arch/TSGS2_95_Prague/Docs/ [retrieved-on Jan. 25, 2013].
3GPP TR 33.868: "3rd Generation Partnership Project, Technical Specification Group Services and System Aspects, Study on Security Aspects of Machine-Type Communications (MTC) and other Mobile Data Applications Communications Enhancements (Release 12)", 3GPP Draft, 33868-C10, 3rd Generation Partnership Project (3GPP), Mobile Competence Centre, 650, Route Des Lucioles, F-06921 Sophia-Antipolis Cedex, France, Jun. 26, 2014 (Jun. 26, 2014), pp. 1-116, XP058917128, Retrieved from the Internet: http://www.3gpp.org/ftp/Specs/zltuInfo/M.2012-2/2014-12/Rel -12/33series/ [retrieved on Jun. 26, 2014]—the whole document.
Ericsson et al.,"More details on Fast Path Security Protocol," vol. SA W63, No. Qingdao, China; Jul. 8, 2013-Jul. 12, 2013 Jul. 12, 2013 (Jul. 12, 2013), XP050727211, 10 Pages, Retrieved from the Internet: URL:http://www.3gpp.org/ftp/tsg_sa/WG3_Security/TSGS3_72_Qingdao/Docs/ [retrieved an Jul. 12, 2013].

* cited by examiner

NETWORK ARCHITECTURE AND SECURITY WITH ENCRYPTED CLIENT DEVICE CONTEXTS

CLAIM OF PRIORITY UNDER 35 U.S.C. § 119

The present application for patent claims priority to U.S. Provisional Application No. 62/191,457 entitled "IoT Architecture and Security with Encrypted UE Contexts" filed Jul. 12, 2015, and U.S. Provisional Application No. 62/320,506 entitled "Network Architecture and Security with Encrypted Client Device Contexts" filed Apr. 9, 2016, which are both assigned to the assignee hereof and hereby expressly incorporated by reference herein.

INTRODUCTION

Field of the Disclosure

Aspects of the disclosure relate generally to network communications, and more specifically, but not exclusively, to an Internet of Things (IoT) network architecture.

Background

The capabilities of electronic devices to collect, process, and exchange data are continuing to grow. Moreover, an increasing number of these electronic devices are being provided with network connectivity. Such capabilities and features are enabling many electronic devices to evolve into Internet of Things (IoT) devices. As the number of these types of electronic devices continues to rapidly increase, networks may not have the resources to adequately support these electronic devices.

For example, in an IoT environment, a network (e.g., an LTE network) may need to support a large number (e.g., billions) of IoT devices. Since the amount of resources allocated by the network for IoT purposes may be limited, the network may not be able to maintain all contexts for these types of devices. Moreover, since IoT devices may be active infrequently and have limited resources, these devices may not be able perform complex signaling needed for connectivity.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In an aspect, a method for a network access node is provided. The network access node obtains a key for an encrypted client device context associated with a client device, receives a first data packet and the encrypted client device context from the client device, obtains a security context for the client device from the encrypted client device context using the key, decrypts and/or verifies the first data packet based on the security context, and forwards the first data packet to a service network when the decryption and verification are successful. In an aspect, the network access node obtains the security context by decrypting the encrypted client device context based on the key, and wherein the security context includes at least a user plane encryption key, a user plane integrity protection key, or combinations thereof. In an aspect, the first data packet is at least verified with the user plane integrity protection key or decrypted with the user plane encryption key. In an aspect, the security context includes a user plane encryption key and a user plane integrity protection key. In such aspect, the network access node may receive a second data packet from a server or a packet data network gateway, encrypt or integrity protect the second data packet using the user plane encryption key or the user plane integrity protection key, and forward the second data packet to the client device. The network access node may remove the at least one context. The network access node may receive a message that includes a resource establishment request and at least one of the one or more encrypted client device contexts from the client device. The network access node may obtain a network address for the client device in response to the message. The network access node may transmit a network address to the client device. In an aspect, the network access node may receive a resource release request message from the client device and may transmit the resource release request message from the client device to a gateway, wherein the resource release request message enables the gateway to release one or more resources for the client device. In an aspect, the one or more resources comprises at least the network address or a bearer for the client device. In another aspect, the network access node may transmit a resource release request message to a gateway when a timer expires prior to a transmission from the client device to the network or prior to a transmission from the network to the client device, wherein the resource release request message enables the gateway to release one or more resources for the client device. In an aspect, the one or more resources comprises at least the network address or a bearer for the client device. In an aspect, the network access node may release one or more resources for the client device when a timer expires prior to a transmission from the client device to the network or prior to a transmission from the network to the client device. In an aspect, the one or more resources comprises at least the network address or a bearer for the client device. In another aspect, the network access node may receive a resource release request message from the client device. In such aspect, the network access node may release one or more resources for the client device in response to the resource release request message. In an aspect, the one or more resources comprises at least the network address or a bearer for the client device.

In an aspect, a network access node is provided. The network access node includes means for obtaining a key for an encrypted client device context associated with a client device, means for receiving a first data packet and the encrypted client device context from the client device, means for obtaining a security context for the client device from the encrypted client device context using the key, means for decrypting and/or verifying the first data packet based on the security context, and means for forwarding the first data packet to a service network when the decryption and verification are successful. In an aspect, the means for obtaining the security context is configured to decrypt the encrypted client device context based on the key, wherein the security context includes at least a user plane encryption key, a user plane integrity protection key, or combinations thereof. In an aspect, the first data packet is at least verified with the user plane integrity protection key or decrypted with the user plane encryption key. In an aspect, the security context includes a user plane encryption key and a user plane integrity protection key. In such aspect, the network access node may include means for receiving a second data packet from a server or a packet data network gateway, means for encrypting or integrity protecting the second data packet using the user plane encryption key or the user plane integrity protection key, and means for forwarding the second data packet to the client device. In an aspect, the network access node includes means for removing the at least one context. In an aspect, the network access node includes means for receiving a message that includes a resource establishment request and at least one of the one or more encrypted client device contexts from the client device. In an aspect, the network access node includes means for obtaining a network address for the client device in response to the message. In an aspect, the network access node includes means for transmitting a network address to the client device. In an aspect, the network access node includes means for receiving a resource release request message from the client device and means for transmitting the resource release request message from the client device to a gateway, wherein the resource release request message enables the gateway to release one or more resources for the client device. In an aspect, the one or more resources comprises at least the network address or a bearer for the client device. In another aspect, the network access node includes means for transmitting a resource release request message to a gateway when a timer expires prior to a transmission from the client device to the network or prior to a transmission from the network to the client device, wherein the resource release request message enables the gateway to release one or more resources for the client device. In an aspect, the one or more resources comprises at least the network address or a bearer for the client device. In an aspect, the network access node includes means for releasing one or more resources for the client device when a timer expires prior to a transmission from the client device to the network or prior to a transmission from the network to the client device. In an aspect, the one or more resources comprises at least the network address or a bearer for the client device. In another aspect, the network access node includes means for receiving a resource release request message from the client device. In such aspect, the network access node includes means for releasing one or more resources for the client device in response to the resource release request message. In an aspect, the one or more resources comprises at least the network address or a bearer for the client device.

In an aspect, a method for a client device is provided. The client device transmits a request to communicate with a network, establishes a security context for a connection with the network, wherein the security context includes at least an encryption algorithm, an encryption key, an integrity protection algorithm, an integrity protection key, or combinations thereof, and receives one or more encrypted client device contexts from the network in response to the request. The client device transmits a message that includes at least one of the one or more encrypted client device contexts to the network, wherein the one or more encrypted client device contexts enable reconstruction of a context at the network for communication with the client device, the context including network state information associated with the client device. In an aspect, the context is removed at the network. In an aspect, the client device determines at least one of the one or more encrypted client device contexts to use based on whether the message includes data or control information. In an aspect, the one or more encrypted client device contexts include a first context to be used for data related communication with the client device and a second context to be used for control related communication with the client device. In an aspect, the one or more encrypted client device contexts include at least one of a security context, a quality of service for a bearer, a tunnel endpoint identifier, or combinations thereof. In an aspect, the request comprises an indication that the client device is requesting the one or more encrypted client device contexts. In an aspect, the request comprises an indication of a service that the client device is requesting. In an aspect, the one or more encrypted client device contexts include a user plane encrypted client device context and a control plane encrypted client device context. In such aspect, the message includes a first data packet with the user plane encrypted client device context, or a control packet with the control plane encrypted client device context. In an aspect, the encryption key is a user plane encryption key and the integrity protection key is a user plane integrity protection key, wherein the user plane encryption key and the user plane integrity protection key are maintained at the client device, and wherein the first data packet is at least integrity protected with the user plane integrity protection key or encrypted with the user plane encryption key. In an aspect, transmission of the message including the first data packet does not establish a radio resource control connection with a network access node of the network. In an aspect, the client device enters an idle mode immediately after transmitting the message that includes the first data packet. In an aspect, the client device receives a second data packet, wherein receiving the second data packet does not establish a radio resource control connection with a network access node. In an aspect, the encryption key is a user plane encryption key and the integrity protection key is a user plane integrity protection key, wherein the user plane encryption key and the user plane integrity protection key are maintained at the client device, and wherein receiving the second data packet comprises at least one of verifying the second data packet with the user plane integrity protection key or decrypting the second data packet with the user plane encryption key. In an aspect, the control packet is a tracking area update. In an aspect, the client device receives a page message from the network. In an aspect, the client device transmits an empty packet with the user plane encrypted client device context to the network. In an aspect, the encrypted client device context is received from the network as a result of a successful authentication with the network. In an aspect, the successful authentication with the network does not establish an Access Stratum security context. In an aspect, the client device stores the one or more encrypted client device contexts in a local storage. In an aspect, the one or more encrypted client device contexts is not decrypted at the client device, and the one or more encrypted client device contexts is decrypted only by a network device that generated the one or more encrypted client device contexts. In an aspect, the message further includes a resource establishment request. In such aspect, the client device receives a network address for the client device in response to the message and, transmits a plurality data packets that include the network address to the network. In an aspect, the client device transmits a resource release request message to the network, wherein the resource release request message enables the network to release one or more resources for the client device. In an aspect, the context is removed at the network after receiving the one or more encrypted client device contexts from the network.

In an aspect, a client device is provided. The client device includes means for transmitting a request to communicate with a network, mean for establishing a security context for a connection with the network, wherein the security context includes at least an encryption algorithm, an encryption key, an integrity protection algorithm, an integrity protection key, or combinations thereof, means for receiving one or more encrypted client device contexts from the network in response to the request, and means for transmitting a message that includes at least one of the one or more encrypted client device contexts to the network, wherein the one or more encrypted client device contexts enable reconstruction of a context at the network for communication with the client device, the context including network state information associated with the client device. In an aspect, the context is removed at the network. In an aspect, the client device includes means for determining at least one of the one or more encrypted client device contexts to use based on whether the message includes data or control information. In an aspect, the one or more encrypted client device contexts include a first context to be used for data related communication with the client device and a second context to be used for control related communication with the client device. In an aspect, the one or more encrypted client device contexts include at least one of a security context, a quality of service for a bearer, a tunnel endpoint identifier, or combinations thereof. In an aspect, the request comprises an indication that the client device is requesting the one or more encrypted client device contexts. In an aspect, the request comprises an indication of a service that the client device is requesting. In an aspect, the one or more encrypted client device contexts include a user plane encrypted client device context and a control plane encrypted client device context. In such aspect, the message includes a first data packet with the user plane encrypted client device context, or a control packet with the control plane encrypted client device context. In an aspect, the encryption key is a user plane encryption key and the integrity protection key is a user plane integrity protection key, wherein the user plane encryption key and the user plane integrity protection key are maintained at the client device, and wherein the first data packet is at least integrity protected with the user plane integrity protection key or encrypted with the user plane encryption key. In an aspect, transmission of the message including the first data packet does not establish a radio resource control connection with a network access node of the network. In an aspect, the client device includes means for entering an idle mode immediately after transmitting the message that includes the first data packet. In an aspect, the client device includes means for receiving a second data packet, wherein receiving the second data packet does not establish a radio resource control connection with a network access node. In an aspect, the encryption key is a user plane encryption key and the integrity protection key is a user plane integrity protection key, wherein the user plane encryption key and the user plane integrity protection key are maintained at the client device, and wherein receiving the second data packet comprises at least one of verifying the second data packet with the user plane integrity protection key or decrypting the second data packet with the user plane encryption key. In an aspect, the control packet is a tracking area update. In an aspect, the client device includes means for receiving a page message from the network. In an aspect, the client device includes means for transmitting an empty packet with the user plane encrypted client device context to the network. In an aspect, the encrypted client device context is received from the network as a result of a successful authentication with the network. In an aspect, the successful authentication with the network does not establish an Access Stratum security context. In an aspect, the client device includes means for storing the one or more encrypted client device contexts in a local storage. In an aspect, the one or more encrypted client device contexts is not decrypted at the client device, and wherein the one or more encrypted client device contexts is decrypted only by a network device that generated the one or more encrypted client device contexts. In an aspect, the message further includes a resource establishment request. In such aspect, the client device includes means for receiving a network address for the client device in response to the message, and means for transmitting a plurality data packets that include the network address to the network. In an aspect, the client device includes means for transmitting a resource release request message to the network, wherein the resource release request message enables the network to release one or more resources for the client device. In an aspect, the context is removed at the network after receiving the one or more encrypted client device contexts from the network.

In an aspect, a method for a client device is provided. The client device transmits a request to communicate with a network, establishes a security context for a connection with the network, wherein the security context includes at least an encryption algorithm, an encryption key, an integrity protection algorithm, an integrity protection key, or combinations thereof, and receives one or more encrypted client device contexts from the network in response to the request. The client device transmits a message that includes at least one of the one or more encrypted client device contexts to the network. In an aspect, the one or more encrypted client device contexts enable reconstruction of at least a portion of a context at the network for communication with the client device, the context including network state information associated with the client device. In an aspect, each of the one or more encrypted client device contexts are associated with one of a plurality of services provided by the network. In an aspect, the client device obtains the message, wherein the message is associated with a service provided by the network. In such aspect, the client device determines the at least one of the one or more encrypted client device contexts that is associated with the service, wherein the at least one of the one or more encrypted client device contexts enables reconstruction of the portion of the client device context that supports the service. For example, the plurality of services may include a mobile broadband service, an ultra-reliable low-latency communications (URLLC) service, a high priority access service, a delay tolerant access service, and/or a machine type communications (MTC) service. The client device obtains usage information associated with the at least one of the one or more encrypted client device contexts. In an aspect, the usage information associated with the at least one of the one or more encrypted client device contexts indicates whether the transmission of the message is a reduced data transmission or a burst data transmission. In an aspect, the usage information may include a value (e.g., an index number or other value) associated with the context (or portion of a context) to be reconstructed by the network for a type of service provided by the network. In an aspect, the portion of the context is maintained at the network for a time period that is determined based on whether the transmission of the message is the reduced data transmission or the burst data transmission. In an aspect, the message includes the usage information. In an aspect, the one or more encrypted client device contexts include a first user plane encrypted client device context that enables reconstruction of a first context for the client device at a first entity in the network, and a second user plane encrypted client device context that enables reconstruction of a second context for the client device at a second entity in the network. In such aspect, the message includes at least the first user plane encrypted client device context and the second user plane encrypted client device context.

In an aspect, a client device is provided. The client device includes means for transmitting a request to communicate with a network, means for establishing a security context for a connection with the network, wherein the security context includes at least an encryption algorithm, an encryption key, an integrity protection algorithm, an integrity protection key, or combinations thereof, and receives one or more encrypted client device contexts from the network in response to the request. The client device further includes means for transmitting a message that includes at least one of the one or more encrypted client device contexts to the network. In an aspect, the one or more encrypted client device contexts enable reconstruction of at least a portion of a context at the network for communication with the client device, the context including network state information associated with the client device. In an aspect, each of the one or more encrypted client device contexts are associated with one of a plurality of services provided by the network. In an aspect, the client device includes means for obtaining the message, wherein the message is associated with a service provided by the network. In such aspect, the client device includes means for determining the at least one of the one or more encrypted client device contexts that is associated with the service, wherein the at least one of the one or more encrypted client device contexts enables reconstruction of the portion of the client device context that supports the service. For example, the plurality of services may include a mobile broadband service, an ultra-reliable low-latency communications (URLLC) service, a high priority access service, a delay tolerant access service, and/or a machine type communications (MTC) service. In an aspect, the client device includes means for obtaining usage information associated with the at least one of the one or more encrypted client device contexts. In an aspect, the usage information associated with the at least one of the one or more encrypted client device contexts indicates whether the transmission of the message is a reduced data transmission or a burst data transmission. In an aspect, the usage information may include a value (e.g., an index number or other value) associated with the context (or portion of a context) to be reconstructed by the network for a type of service provided by the network. In an aspect, the portion of the context is maintained at the network for a time period that is determined based on whether the transmission of the message is the reduced data transmission or the burst data transmission. In an aspect, the message includes the usage information. In an aspect, the one or more encrypted client device contexts include a first user plane encrypted client device context that enables reconstruction of a first context for the client device at a first entity in the network, and a second user plane encrypted client device context that enables reconstruction of a second context for the client device at a second entity in the network. In such aspect, the message includes at least the first user plane encrypted client device context and the second user plane encrypted client device context.

In an aspect, a method for a network device is provided. The network device receives, from a client device, a request to communicate with a network, establishes at least one context with the client device, the at least one context including network state information associated with a connection between the client device and the network, wherein the network state information includes at least an encryption algorithm, an encryption key, an integrity protection algorithm, an integrity protection key, or combinations thereof, generates one or more encrypted client device contexts, wherein the one or more encrypted client device contexts enable reconstruction of the at least one context at the network for communication with the client device, and transmits the one or more encrypted client device contexts to the client device. In an aspect, the network device determines to generate the one or more encrypted client device contexts, wherein the determination is based on at least one of encrypted client device context usage information indicated in the request, a subscription of the client device, a policy, or combinations thereof. In an aspect, the one or more encrypted client device contexts comprise a first context to be used for data related communication and a second context to be used for control related communication. In an aspect, the network device requests authentication information from a home subscriber server (HSS)/authentication, authorization, and accounting (AAA) server, and performs mutual authentication with the client device. In an aspect, the network device receives a control packet and an encrypted client device context from the client device, verifies the encrypted client device context received from the client device, reconstructs the at least one context from the encrypted client device context, processes the control packet using the at least one context, wherein the processing comprises at least one of verifying, decrypting the control packet using the context, or combinations thereof, stores a temporary identifier for a downlink packet for the client device, and forwards a payload portion of the control packet to an application server or packet data network gateway. In an aspect, the encryption key includes at least a control plane encryption key, a user plane encryption key, or combinations thereof, and the integrity protection key includes at least a user plane integrity protection key, a control plane integrity protection key, or combinations thereof. In an aspect, verifying the encrypted client device context includes determining whether the encrypted client device context has expired, generating one or more new encrypted client device contexts when a previous encrypted client device context has expired, and transmitting the one or more new encrypted client device contexts to the client device when the previous encrypted client device context has expired. In an aspect, the network device receives a control packet from a second client device, requests a context for the second client device from a second network device, the request including a control plane encrypted client device context, receives the context for the second client device from the second network device, generates a new encrypted client device context, and transmits the new encrypted client device context to the second client device. In an aspect, verifying the encrypted client device context includes determining a key for verifying the encrypted client device context. In an aspect, the network device removes the at least one context, receives a message that includes a resource establishment request and at least one of the one or more encrypted client device contexts from the client device, obtains a network address for the client device in response to the message, and transmits the network address to the client device. In an aspect, the network device receives a resource release request message from the client device, and transmits the resource release request message from the client device to a gateway, wherein the resource release request message enables the gateway to release one or more resources for the client device. In an aspect, the network device transmits a resource release request message to a gateway when a timer expires prior to a transmission from the client device to the network or prior to a transmission from the network to the client device, wherein the resource release request message enables the gateway to release one or more resources for the client device.

In an aspect, a network device is provided. The network device includes means for receiving, from a client device, a request to communicate with a network, means for establishing at least one context with the client device, the at least one context including network state information associated with a connection between the client device and the network, wherein the network state information includes at least an encryption algorithm, an encryption key, an integrity protection algorithm, an integrity protection key, or combinations thereof, mean for generating one or more encrypted client device contexts, wherein the one or more encrypted client device contexts enable reconstruction of the at least one context at the network for communication with the client device, and means for transmitting the one or more encrypted client device contexts to the client device. In an aspect, the network device includes means for determining to generate the one or more encrypted client device contexts, wherein the determination is based on at least one of encrypted client device context usage information indicated in the request, a subscription of the client device, a policy, or combinations thereof. In an aspect, the one or more encrypted client device contexts comprise a first context to be used for data related communication and a second context to be used for control related communication. In an aspect, the network device includes means for requesting authentication information from a home subscriber server (HSS)/authentication, authorization, and accounting (AAA) server, and means for performing mutual authentication with the client device. In an aspect, the network device includes means for receiving a control packet and an encrypted client device context from the client device, means for verifying the encrypted client device context received from the client device, means for reconstructing the at least one context from the encrypted client device context, means for processing the control packet using the at least one context, wherein the processing comprises at least one of verifying, decrypting the control packet using the context, or combinations thereof, means for storing a temporary identifier for a downlink packet for the client device, and means for forwarding a payload portion of the control packet to an application server or packet data network gateway. In an aspect, the encryption key includes at least a control plane encryption key, a user plane encryption key, or combinations thereof, and the integrity protection key includes at least a user plane integrity protection key, a control plane integrity protection key, or combinations thereof. In an aspect, the means for verifying the encrypted client device is configured to determine whether the encrypted client device context has expired, generate one or more new encrypted client device contexts when a previous encrypted client device context has expired, and transmit the one or more new encrypted client device contexts to the client device when the previous encrypted client device context has expired. In an aspect, the network device includes means for receiving a control packet from a second client device, means for requesting a context for the second client device from a second network device, the request including a control plane encrypted client device context, means for receiving the context for the second client device from the second network device, means for generating a new encrypted client device context, and means for transmitting the new encrypted client device context to the second client device. In an aspect, the means for verifying the encrypted client device context is configured to determine a key for verifying the encrypted client device context. In an aspect, the network device includes means for removing the at least one context, means for receiving a message that includes a resource establishment request and at least one of the one or more encrypted client device contexts from the client device, means for obtaining a network address for the client device in response to the message, and means for transmitting the network address to the client device. In an aspect, the network device includes means for receiving a resource release request message from the client device, and means for transmitting the resource release request message from the client device to a gateway, wherein the resource release request message enables the gateway to release one or more resources for the client device. In an aspect, the network device includes means for transmitting a resource release request message to a gateway when a timer expires prior to a transmission from the client device to the network or prior to a transmission from the network to the client device, wherein the resource release request message enables the gateway to release one or more resources for the client device.

In an aspect, a method for a network device is provided. The network device receives, from a client device, a request to communicate with a network. The network device establishes at least one context with the client device, the at least one context including network state information associated with a connection between the client device and the network, wherein the network state information includes at least an encryption algorithm, an encryption key, an integrity protection algorithm, an integrity protection key, or combinations thereof. The network device may generate one or more encrypted client device contexts. In an aspect, the one or more encrypted client device contexts enable reconstruction of the at least one context at the network for communication with the client device. The network device may transmit the one or more encrypted client device contexts to the client device. The network device removes the at least one context. The network device receives a message from the client device, the message including at least one of the one or more encrypted client device contexts and usage information associated with the one or more encrypted client device contexts. In an aspect, the usage information indicates whether transmission of the message is a reduced data transmission or a burst data transmission. In an aspect, the network device may reconstruct at least a portion of a context based on the at least one of the one or more encrypted client device contexts and the usage information. In an aspect, the network device maintains the at least a portion of a context for a first threshold period of time when the usage information indicates a reduced data transmission, or a second threshold period of time when the usage information indicates a burst data transmission, the second threshold period of time being greater than the first threshold period of time.

In an aspect, a network device is provided. The network device includes means for receiving, from a client device, a request to communicate with a network. The network device further includes means for establishing at least one context with the client device, the at least one context including network state information associated with a connection between the client device and the network, wherein the network state information includes at least an encryption algorithm, an encryption key, an integrity protection algorithm, an integrity protection key, or combinations thereof. In an aspect, the network device includes means for generating one or more encrypted client device contexts. In an aspect, the one or more encrypted client device contexts enable reconstruction of the at least one context at the network for communication with the client device. In an aspect, the network device includes means for transmitting the one or more encrypted client device contexts to the client device. In an aspect, the network device includes means for removing the at least one context. In an aspect, the network device includes means for receiving a message from the client device, the message including at least one of the one or more encrypted client device contexts and usage information associated with the one or more encrypted client device contexts. In an aspect, the usage information indicates whether transmission of the message is a reduced data transmission or a burst data transmission. In an aspect, the network device includes means for reconstructing at least a portion of a context based on the at least one of the one or more encrypted client device contexts and the usage information. In an aspect, the network device includes mean for maintaining the at least a portion of a context for a first threshold period of time when the usage information indicates a reduced data transmission, or a second threshold period of time when the usage information indicates a burst data transmission, the second threshold period of time being greater than the first threshold period of time.

In an aspect, a method for a network device is provided. The network device obtains a key for an encrypted client device context associated with a client device, receives a first data packet and the encrypted client device context from the client device, obtains a security context for the client device from the encrypted client device context using the key, decrypts and verifies the first data packet based on the security context, and forwards the first data packet to a service network when the decryption and verification are successful. In an aspect, the network device obtains the security context by decrypting the encrypted client device context based on the key, and wherein the security context includes at least a user plane encryption key, a user plane integrity protection key, or combinations thereof. In an aspect, the first data packet is at least verified with the user plane integrity protection key or decrypted with the user plane encryption key. In an aspect, the security context includes a user plane encryption key and a user plane integrity protection key. In such aspect, the network device receives a second data packet from a server or a packet data network gateway, determines a network access node to which the second data packet is forwarded, adds a temporary identifier to the second data packet that enables the network access node to determine the client device, encrypts or integrity protects the second data packet using the user plane encryption key or the user plane integrity protection key, and forwards the second data packet to the client device.

In an aspect, a network device is provided. The network device includes means for obtaining a key for an encrypted client device context associated with a client device, means for receiving a first data packet and the encrypted client device context from the client device, means for obtaining a security context for the client device from the encrypted client device context using the key, means for decrypting and verifying the first data packet based on the security context, and forwards the first data packet to a service network when the decryption and verification are successful. In an aspect, the means for obtaining the security context is configured to decrypt the encrypted client device context based on the key, and wherein the security context includes at least a user plane encryption key, a user plane integrity protection key, or combinations thereof. In an aspect, the first data packet is at least verified with the user plane integrity protection key or decrypted with the user plane encryption key. In an aspect, the security context includes a user plane encryption key and a user plane integrity protection key. In such aspect, the network device includes means for receiving a second data packet from a server or a packet data network gateway, means for determining a network access node to which the second data packet is forwarded, means for adding a temporary identifier to the second data packet that enables the network access node to determine the client device, means for encrypting or integrity protecting the second data packet using the user plane encryption key or the user plane integrity protection key, and means for forwarding the second data packet to the client device.

In an aspect, a method for a network access node is provided. The network access node receives, from a client device, a first data packet with a request to communicate with a network, determines a network node to which the first data packet is intended, receives a second data packet from a network function implemented at the network node, and determines the client device to which the second data packet is to be forwarded. In an aspect, the network access node stores a temporary identifier for the client device, wherein the temporary identifier is a cell radio network temporary identifier (C-RNTI), and wherein the temporary identifier is stored for a predetermined period of time. In an aspect, the network access node adds the temporary identifier to the first data packet. In an aspect, the network access node determines the network function to which the request is to be forwarded, wherein the determination is preconfigured at the network access node, and forwards the first data packet to the network function. In an aspect, the network access node removes the temporary identifier in the second data packet, and forwards the second data packet to the client device. In an aspect, the network access node determines the client device to which the second data packet is to be forwarded by identifying the client device from a temporary identifier in the second data packet.

In an aspect, a network access node is provided. The network access node includes means for receiving, from a client device, a first data packet with a request to communicate with a network, means for determining a network node to which the first data packet is intended, means for receiving a second data packet from a network function implemented at the network node, and means for determining the client device to which the second data packet is to be forwarded. In an aspect, the network access node includes means for storing a temporary identifier for the client device, wherein the temporary identifier is a cell radio network temporary identifier (C-RNTI), and wherein the temporary identifier is stored for a predetermined period of time. In an aspect, the network access node includes means for adding the temporary identifier to the first data packet. In an aspect, the network access node includes means for determining the network function to which the request is to be forwarded, wherein the determination is preconfigured at the network access node, and means for forwarding the first data packet to the network function. In an aspect, the network access node includes means for removing the temporary identifier in the second data packet, and means for forwarding the second data packet to the client device. In an aspect, the means for determining the client device to which the second data packet is to be forwarded is configured to identify the client device from a temporary identifier in the second data packet.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

DETAILED DESCRIPTION

Figure 1:
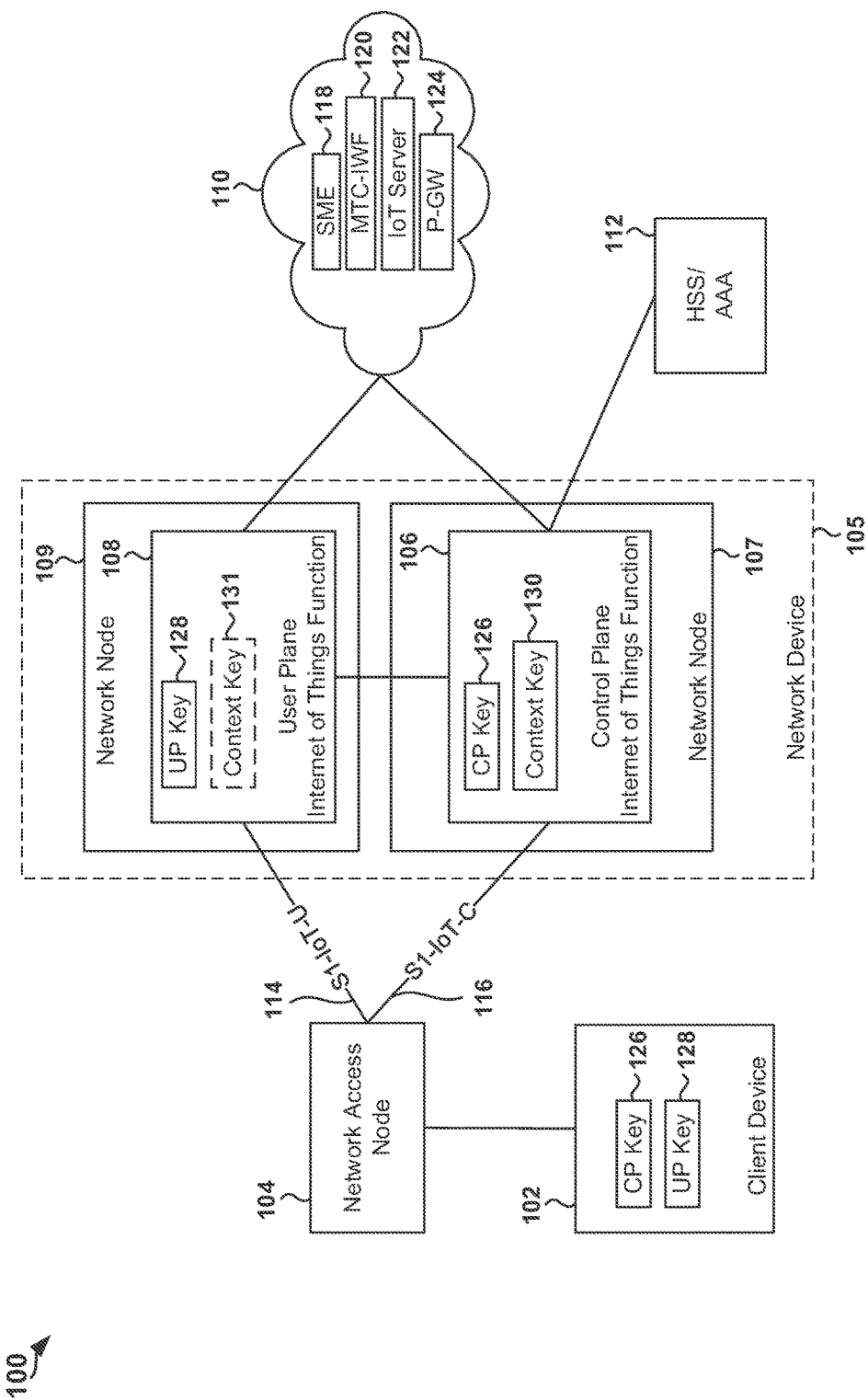
FIG. 1 is a block diagram of an Internet of Things (IoT) network architecture in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

As discussed above, in an IoT environment, a network (e.g., an LTE network) may need to support a large number (e.g., billions) of client devices (also referred to as Internet of Things (IoT) devices). A client device may be cellular telephone (e.g., a smartphone), a personal computer (e.g., a laptop), a gaming device, a user equipment (UE), or any other suitable device that is configured to communicate with a network (e.g., an LTE network). Client devices may have different requirements for data transmission and security. For example, client device traffic (also referred to as IoT traffic) may be delay tolerant or require no reliable transmission. In another example, client device traffic may not require access stratum (AS) security to reduce overhead.

Conventionally, when a client device transitions from an idle mode to a connected mode, signaling overhead may be incurred. For example, a client device may establish a connection with a network access node (e.g., evolved Node B (eNB), base station, or network access point), and the network access node may generate a context for the client device. When the client device subsequently enters an idle mode, the network access node may no longer maintain the client device context.

When a client device connects to the network, the context of the client device in the network may allow the device to perform less signaling in order to transmit data. For example, a client device that is registered may not be required to perform a full authentication procedure. In order to achieve such efficiency, however, the network may use a substantial amount of resources to maintain one or more contexts for each of the large number of connected client devices.

As used herein, the "context" of a client device may refer to network state information associated with the client device. For instance, the context may refer to client device security context, a context associated with an E-UTRAN radio access bearer (eRAB), and/or a context associated with a radio bearer and S1 bearer.

Since the amount of resources (e.g., equipment implementing network functions) allocated by the network for IoT purposes may be limited, the network functions may not be able to maintain all contexts (e.g., network state information) for client devices that are active infrequently. For example, some client devices may wake up every 10 minutes or longer, send traffic (e.g., transmit data) to a server, and immediately enter a sleep mode. As another example, some client devices may send an alert to a server when an unexpected event occurs. Moreover, some client devices may have limited resources (e.g., memory, processor, battery) and may not be suited to handle complex protocol stacks and/or signaling procedures.

Long Term Evolution (LTE) mobility management and session management incur too much overhead to scale for potentially billions of client devices. Specifically, context management and storage at network nodes may pose challenges.

For example, when the client device wakes up from the idle mode and enters a connected mode, the network access node establishes a new client device context via a service request to a mobility management entity (MME). The client device context may be maintained at an MME and serving gateway (S-GW) while the client device is in the Evolved Packet System Mobility Management (EMM) registered state. Therefore, in order to support many client devices, the MME and S-GW need to be equipped with a large amount of storage to maintain contexts for the client devices that may remain in idle mode most of the time.

The aspects disclosed herein include network architectures for client devices (also referred to as Internet of Things (IoT) devices), from an upper-layer perspective, for achieving ultra-low client device power consumption, a large number of client devices per cell, a small spectrum, and/or an increased coverage area in a cell. Dedicated network functions are introduced to enable independent deployment and remove scalability/inter-working requirements. Security is anchored at an IoT network function (also referred to as an IoT Function (IoTF)).

According to various aspects, the architecture may allow no security context at a network access node (e.g., eNB, base station, network access point) for data transfer to or from client devices. To avoid affecting normal client devices' PDN connection/traffic, dedicated core network resources are allocated for small data transfer. The network may allocate dedicated physical (PHY) layer resources for access control to also limit small data traffic. The client device context is used for small data transfer to eliminate client device's semi-persistent context at the IoTF during the idle state. To achieve efficient data transmission for IoT devices, the disclosed network architectures may include an IoTF implemented at a network device. Such IoTF may include a control plane IoTF (IoTF-C) and a user plane IoTF (IoTF-U). In an aspect, the IoTF-C may have functions similar to a mobility management entity. In an aspect, the IoTF-U may be the mobility and security anchor for user-plane data traffic. In an aspect, the IoTF-U may have functions similar to a serving gateway (S-GW) and/or a network access node (e.g., evolved Node B (eNB), base station, or network access point).

In order to allow the network functions (e.g., IoTF-C, IoTF-U) to optimize resource usage for client devices, various aspects of the disclosed IoT network architectures may implement a design protocol in which the client device context is carried in a packet (e.g., IP packet) and the IoTF (e.g., an IoTF that includes an IoTF-C and an IoTF-U) creates a client device context opportunistically. This enables network functions to maintain minimal to no network state information for the client device and minimal to no signaling overhead. A client device, for example, may be a cellular telephone (e.g., a smartphone), a personal computer (e.g., a laptop), a gaming device, an automobile, an appliance, or any other suitable device that is configured to communicate with the network. In some aspects, the client device may be referred to as a user equipment (UE) or an access terminal (AT). In some aspects, a client device as referred to herein may be a mobile device or a static device. It should be understood that the disclosed IoT network architectures and the functions included therein may be used for small data transfer with devices other than client devices. In an aspect, a client device may have a nominal mode where it establishes a connection and transfers data, but also uses procedures as disclosed herein to transfer data using a client device context.

IoT Network Architecture

FIG. 1 is a block diagram of an IoT network architecture 100 in accordance with various aspects of the present disclosure. As shown in FIG. 1, the IoT network architecture 100 includes a client device 102 (also referred to as an IoT device), a network access node 104, a network device 105, a service network 110, and a home subscriber server (HSS)/authentication, authorization, and accounting (AAA) server 112. In one aspect, the network access node 104 may be an eNB, base station, or a network access point.

In one aspect, the network device 105 may include one or more processing circuits and/or other appropriate hardware configured to implement an IoTF. In one aspect of the present disclosure, an IoTF may include a control plane IoT Function (IoTF-C) 106 and a user plane IoT Function (IoTF-U) 108. For example, the IoTF-C 106 may be implemented at a first network node 107 and the IoTF-U 108 may be implemented at a second network node 109. In accordance with the various aspects disclosed herein, the term "node" may represent a physical entity, such as a processing circuit, a device, a server, or a network entity, included in the network device 105. Accordingly, for example, a network node may be referred to as a network node device.

In one aspect, the IoTF-C 106 and the IoTF-U 108 may be implemented at the same hardware platform (e.g., a processing circuit and other associated hardware components, such as memory). In such aspect, for example, the IoTF-C 106 may be implemented at a first virtual machine (e.g., a first operating system) provided on a hardware platform (e.g., the network device 105), and the IoTF-U 108 may be implemented at a second virtual machine (e.g., a second operating system) provided on the hardware platform.

As shown in FIG. 1, the IoTF-C 106 is in communication with the network access node 104 via a first S1 connection 116, and the IoTF-U 108 is in communication with the network access node 104 via a second S1 connection 114. In an aspect, the service network 110 may include a number of entities, functions, gateways, and/or servers configured to provide various types of services. For example, the service network 110 may include a short message entity (SME) 118, a machine type communication interworking function (MTC-IWF) 120, an IoT server 122, and/or a packet data network (PDN) gateway (P-GW) 124. It should be understood that the service network 110 disclosed in FIG. 1 serves as one example and that in other aspects, the service network 110 may include different types of entities, functions, and/or servers than those disclosed in FIG. 1.

In an aspect of the present disclosure, the IoTF implemented at the network device 105 may provide control plane and user plane functionality. In an aspect, the IoTF-C 106 handles control plane signaling (e.g., packets carrying control information, herein referred to as "control packets") for client devices. For example, the IoTF-C 106 may perform mobility and session management for client devices, perform authentication and key agreement (also referred to as an AKA procedure) with client devices, and/or may create security contexts for client devices. In an aspect, the IoTF-C 106 may derive control plane (CP) key(s) 126 for control plane traffic associated with the client device 102, user plane (UP) key(s) 128 for user plane traffic associated with the client device 102, and/or a context key(s) 130 for generating an encrypted context for the client device 102. In an aspect, the IoTF-C 106 may provide the user plane key(s) 128 and/or at least one of the context key(s) 130 to the IoTF-U 108. Accordingly, in some aspects, the IoTF-U 108 may include the user plane key(s) 128 and/or context key(s) 131 provided by the IoTF-C 106.

In an aspect, the IoTF-U 108 may handle user plane traffic for client devices. For example, the IoTF-U 108 may derive a ciphering key and an integrity key (e.g., an Authenticated Encryption with Associated Data (AEAD) cipher using the UP key 128), create a client device context on-the-fly, authenticate and decipher uplink packets sent by client devices and forward the uplink packets to a PDN or P-GW (e.g., P-GW 124), cipher and authenticate downlink packets for connected client devices and forward the downlink packets to the next hop network access node (e.g., eNB), and/or buffer downlink packets for idle client devices during paging. In an aspect, the IoTF-U 108 can be considered to be the mobility and security anchor for data traffic.

Exemplary Key Hierarchy for an IoT Network

Figure 2:
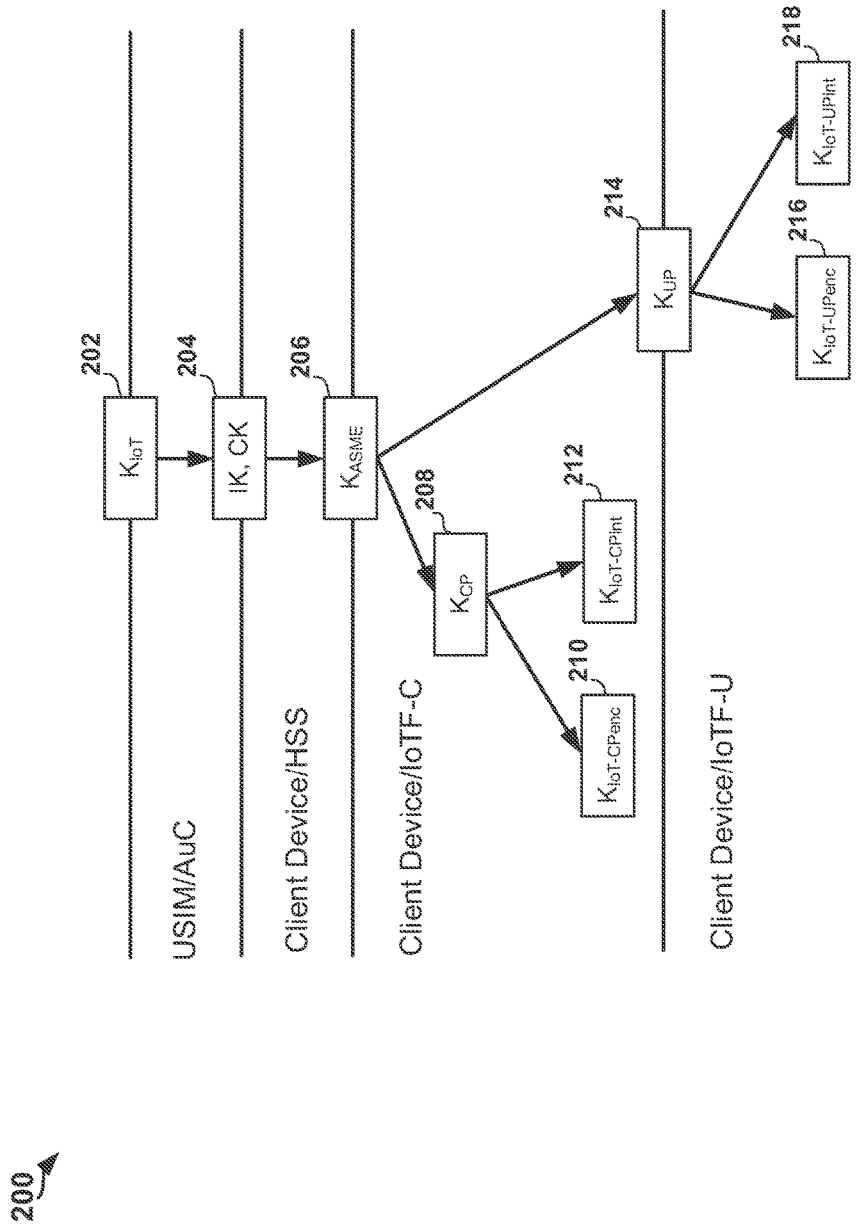
FIG. 2 is a diagram illustrating a key hierarchy for an Internet of IoT network architecture in accordance with various aspects of the present disclosure.

FIG. 2 is a diagram illustrating a key hierarchy 200 for an IoT network architecture (e.g., IoT network architecture 100) in accordance with various aspects of the present disclosure. In FIG. 2, the key $K_{IoT}$ 202 may be a secret key stored permanently in a Universal Mobile Telecommunications System (UMTS) Subscriber Identity Module (USIM) of a client device (e.g., the client device 102) and an Authentication Center (AuC) of the network. The integrity key (IK) and cipher key (CK) (shown as IK, CK 204 in FIG. 2) are a pair of keys derived in the AuC and USIM during an AKA procedure. With reference to FIG. 1, during the AKA procedure, the IoTF-C 106 may receive authentication vectors (AVs) from the HSS/AAA server 112 which contain a key (shown in FIG. 2 as the key $K_{ASME}$ 206) from an Access Security Management Entity (ASME). The IoTF-C 106 may derive a control plane key ($K_{CP}$) 208 and a user plane key ($K_{UP}$) 214 from the key $K_{ASME}$ 206. The IoTF-C 106 may provide the key $K_{UP}$ 214 to the IoTF-U 108. The IoTF-C 106 may derive an encryption key $K_{IoT\text{-}CPenc}$ 210 and an integrity protection key $K_{IoT\text{-}CPint}$ 212 from the key $K_{CP}$ 208. The IoTF-U 108 may derive an encryption key $K_{IoT\text{-}UPenc}$ 216 and an integrity protection key $K_{IoT\text{-}UPint}$ 218 from the key $K_{UP}$ 214.

Figure 3:
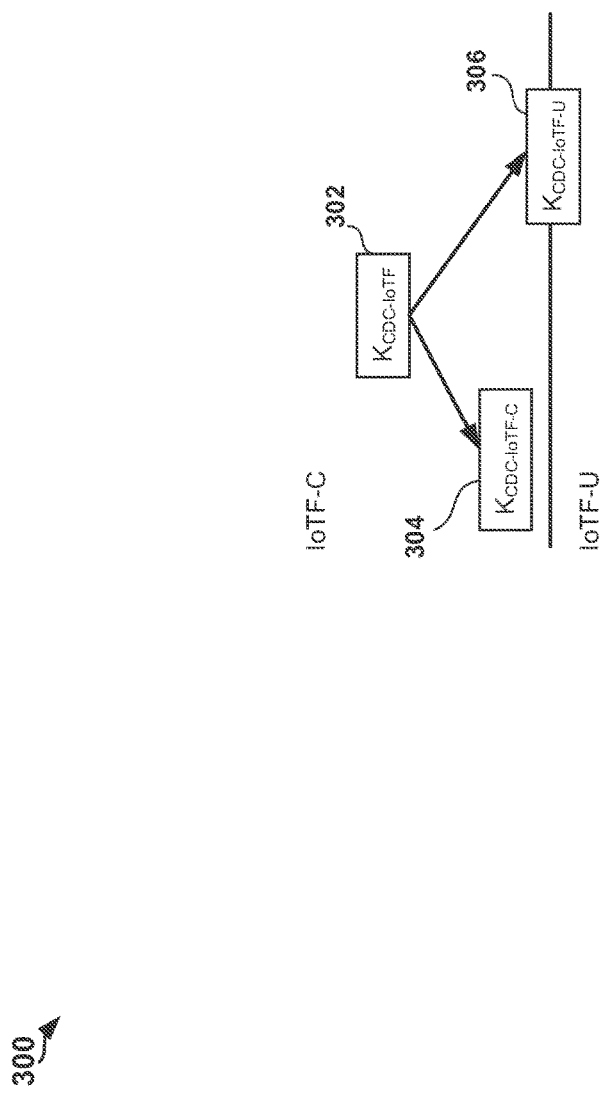
FIG. 3 is a diagram illustrating a key hierarchy for encrypting contexts in an IoT network architecture in accordance with various aspects of the present disclosure.

FIG. 3 is a diagram illustrating a key hierarchy 300 for encrypting contexts in an IoT network architecture (e.g., IoT network architecture 100) in accordance with various aspects of the present disclosure. In an aspect of the present disclosure, with reference to FIG. 1, the IoTF-C 106 may randomly generate a control plane client device context encryption key ($K_{CDC\text{-}IoTF\text{-}C}$) 304 and a user plane client device context encryption key ($K_{CDC\text{-}IoTF\text{-}U}$) 306 for a client device (e.g., client device 102) based on a context key $K_{CDC\text{-}IoTF}$ 302 for a client device.

Exemplary Network States of a Client Device

In a wireless communication system (e.g. an LTE network), network states are defined for a client device for mobility management (e.g., Evolved Packet System Mobility Management (EMM)). Such network states enable efficient communication between a client device and other entities in the network.

In an aspect of the present disclosure, a client device (e.g., client device 102 in FIG. 1) may be in a deregistered state or a registered state. For example, when the client device is in a deregistered state, the context for the client device may be stored in the HSS. The network holds no valid location or routing information for the client device, and the client device is not reachable.

As another example, the client device may enter a registered state by a successful registration with the network. In an aspect of the present disclosure, the client device may perform such registration by performing an attach procedure with the network. In the registered state, the client device has at least one active PDN connection. The client device also has an Evolved Packet System (EPS) security context set up. It should be noted that the deregistered and registered states assume that the client device has credentials (e.g., there is a subscription available in the HSS) for the network.

A wireless communication network (e.g., an LTE network) may further include network states defined for a client device for Evolved Packet System Connection Management (ECM). Accordingly, a client device (e.g., client device 102 in FIG. 1) in a registered state may be in one of two states (also referred to as sub-states of the registered state), such as an idle state or a connected state. In the idle state, no Non-Access-Stratum (NAS) signaling connection exists between the client device and the other network entities. In addition, the client device may perform cell selection/reselection and public land mobile network (PLMN) selection, and there may be no context for the client device in the RAN (e.g., network access node). Moreover, there may be no S1-MME and no S1-U connection for the client device in the idle state.

In the connected state, the location of the client device is known in the MME with an accuracy of a serving access network identifier (e.g., eNB identifier (ID), base station ID, or network access point ID). Mobility of the client device is handled by a handover procedure. In the connected state, a signaling connection exists between the client device and the MME. The signaling connection may be made up of two parts: a radio resource control (RRC) connection and an S1-MME connection.

Figure 4:
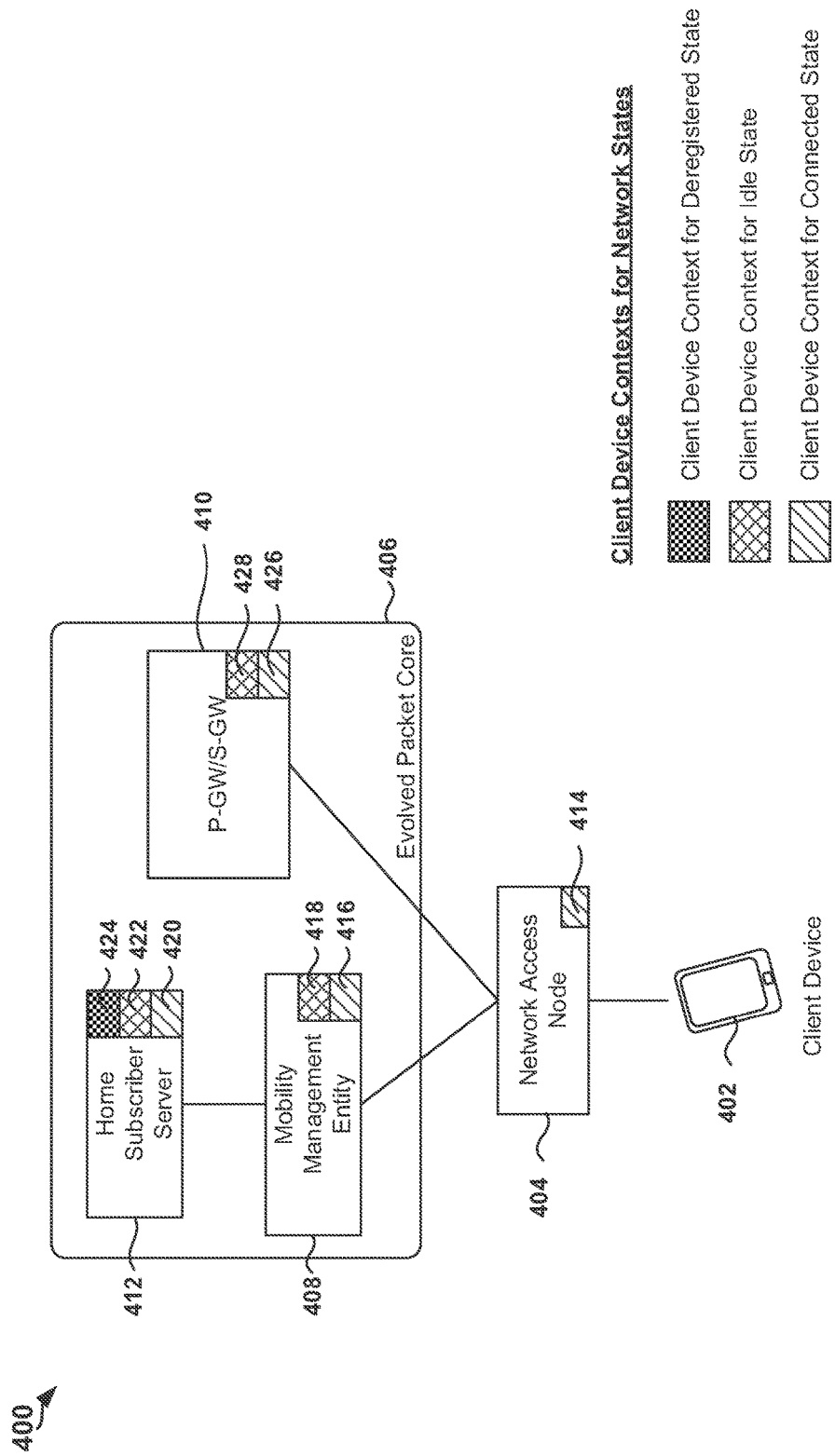
FIG. 4 is a diagram illustrating various contexts (e.g., network state information) for a client device in a network.

FIG. 4 is a diagram illustrating example network states of a client device maintained at various entities in a network 400. As shown in FIG. 4, network 400 includes a client device 402, a network access node 404, and an Evolved Packet Core (EPC) 406. As further shown in FIG. 4, the EPC 406 includes a home subscriber server (HSS) 412, a mobility management entity (MME) 408, and a Packet Data Network Gateway (P-GW)/Serving Gateway (S-GW) 410. In an aspect of the present disclosure, the network 400 may be a 4G network. In other aspects, the network 400 may be a 3G network, an LTE network, a 5G network, or other appropriate network.

For example, with reference to FIG. 4, the network access node 404 may maintain a context 414 (also referred to as network state information) for the client device 402 when the client device 402 is in a connected state. The MME 408 may maintain a context 416 for the client device 402 when the client device 402 is in a connected state, and a context 418 for the client device 402 when the client device 402 is in an idle state. The P-GW/S-GW 410 may maintain a context 426 for the client device 402 when the client device 402 is in a connected state, and a context 428 for the client device 402 when the client device 402 is in an idle state. The HSS 412 may maintain a context 420 for the client device 402 when the client device 402 is in a connected state, a context 422 for the client device 402 when the client device 402 is in an idle state, and a context 424 for the client device 402 when the client device 402 is in a deregistered state. In an aspect of the present disclosure, if the network 400 is implemented as a 3G network, the P-GW/S-GW 410 may not maintain a context for the client device 402 when the client device 402 is in the idle state.

In an aspect of the present disclosure, an encrypted client device context may be generated for network functions, such as the IoTF-C 106 and IoTF-U 108 in FIG. 1, to enable opportunistic reconstruction of a context for a client device (also referred to as a client device context). For example, an encrypted client device context may enable a network entity to reconstruct a client device context while maintaining minimal to no network state information for the client device. Therefore, the encrypted client device context may enable a network entity to reconstruct a client device context without storing or caching any network state information.

It should be noted that in the presence of potentially billions of client devices that transmit traffic infrequently, it is not desirable for network functions (e.g., the MME 408, the P-GW/S-GW 410) to maintain contexts (including security contexts) for client devices. Also, the encrypted client device context may eliminate signaling overhead at the network access node (e.g., eNB, base station, or network access point) during a handover or during transition from idle mode to connected mode. The encrypted client device context may be used to substantially reduce or eliminate signaling overhead since communication with an MME/controller may be avoided.

User Plane Encrypted Client Device Context

In an aspect of the present disclosure, a user plane (UP) encrypted client device context may be generated for a client device. For example, with reference to FIG. 1, the user plane encrypted client device context may be used at the IoTF-U 108 for uplink (UL) data transmissions. In an aspect of the present disclosure, the user plane encrypted client device context may include bearer IDs, Evolved Packet System (EPS) bearer quality of service(s) (QoS), an S5 tunnel endpoint identifier (TEID) for a user plane General Packet Radio Service (GPRS) tunneling protocol (GTP-U), a P-GW Internet Protocol (IP) address (or equivalent information) to which the IoTF-U 108 forwards UL data, a security context (e.g., a selected encryption algorithm and a user-plane (UP) key 128), and any other parameters, values, settings, or features that may be needed by the network to provide a service to the client device. For example, the UP key 128 may be the key $K_{UP}$ 214, from which the key $K_{IoT-UPenc}$ 216 and the key $K_{IoT-UPint}$ 218 may be derived. The user plane encrypted client device context may be generated by encrypting a user plane context for the client device using a secret key of the IoTF-U 108, such as the key $K_{CDC-IoTF-U}$ 306 shown in FIG. 3. In an aspect of the present disclosure, the secret key of the IoTF-U 108, such as the key $K_{CDC-IoTF-U}$ 306, may be provisioned by IoTF-C 106. The user plane encrypted client device context may be decrypted by an IoTF that has the secret key (e.g., the key $K_{CDC-IoTF-U}$ 306). Accordingly, a user plane encrypted client device context may be decrypted by the IoTF that generated the user plane encrypted client device context.

Control Plane Encrypted Client Device Context

A control plane (CP) encrypted client device context may be generated by encrypting a control plane client device context for control messages (e.g., control packets or messages including control packets). In an aspect, the control plane encrypted client device context may include a client device identifier, the client device security context (e.g., control plane keys, such as the key $K_{IoT}$ ($K_{ASME}$ equivalent), the key $K_{IoT-CPenc}$ 210, the key $K_{IoT-CPint}$ 212), the client device security capabilities (e.g., Evolved Packet System Encryption Algorithm (EEA), Evolved Packet System Integrity Algorithm (EIA)), and/or the next hop (S5/S8) configuration information. For example, the next hop configuration information may include an IoT server address, a P-GW address, and/or TEIDs. For example, with reference to FIG. 1, the control plane client device context for control messages may be encrypted with a secret key of the IoTF-C 106, such as key $K_{CDC-IoTF-C}$ 304 shown in FIG. 3. The control plane encrypted client device context may be decrypted by an IoTF that has the secret key (e.g., the key $K_{CDC-IoTF-C}$ 304). Accordingly, a control plane encrypted client device context may be decrypted by the IoTF that generated the control plane encrypted client device context.

Initial Attach Procedure

Figure 5:
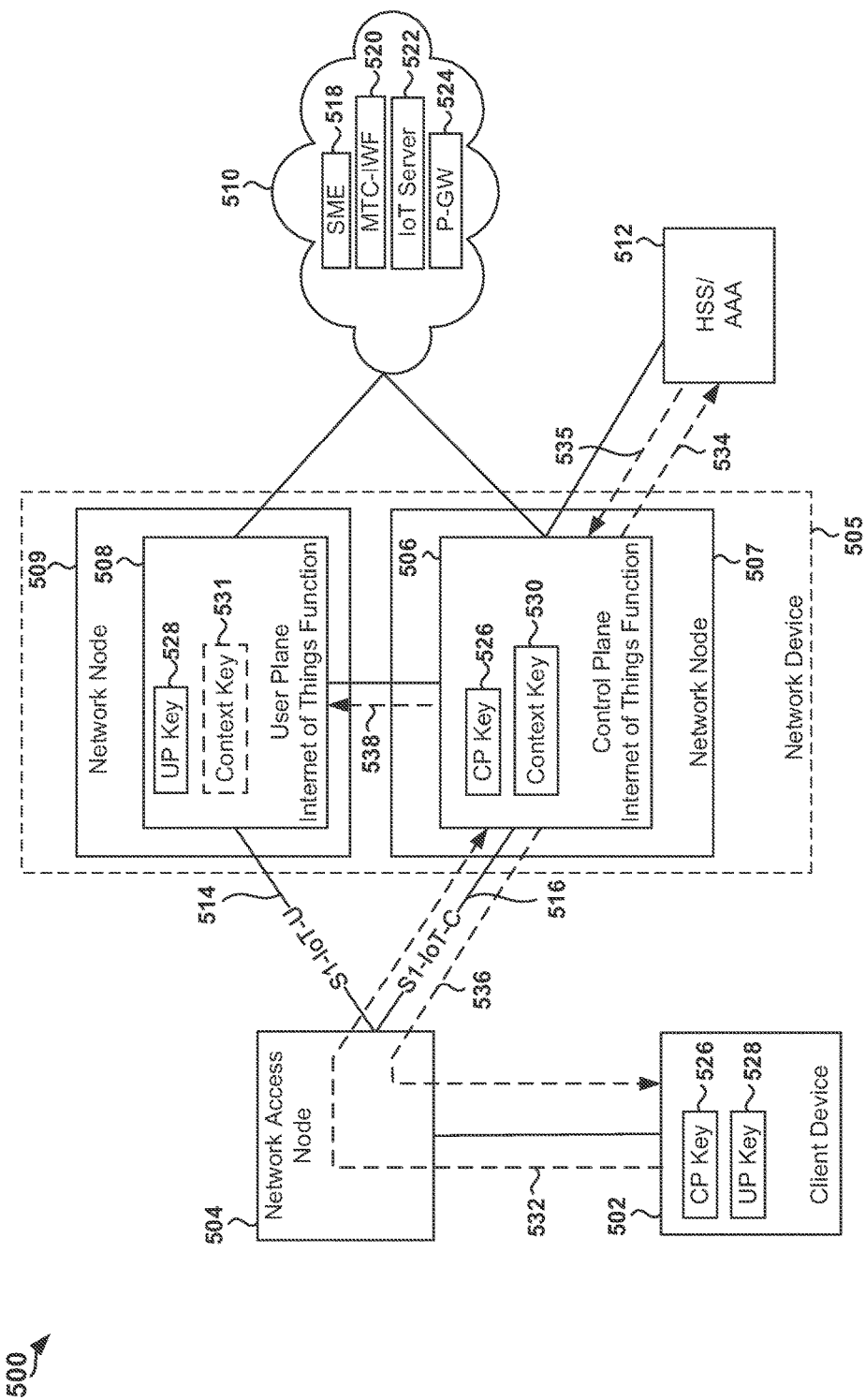
FIG. 5 is a block diagram illustrating an initial attach procedure by a client device in an IoT network architecture in accordance with various aspects of the present disclosure.

FIG. 5 is a block diagram illustrating an initial attach procedure by a client device in an IoT network architecture 500 in accordance with various aspects of the present disclosure. In some aspects, an attach procedure as described herein is also referred to as a network attachment procedure or a registration procedure.

As shown in FIG. 5, the IoT network architecture 500 includes a client device 502 (also referred to as an IoT device), a network access node 504 (e.g., eNB, base station, network access point), a network device 505, a service network 510, and a home subscriber server (HSS)/authentication, authorization, and accounting (AAA) server 512.

In one aspect, the network device 505 may include one or more processing circuits and/or other appropriate hardware configured to implement an IoTF. For example, an IoTF may include a control plane IoT Function (IoTF-C) 506 and a user plane IoT Function (IoTF-U) 508. In such aspect, the IoTF-C 506 may be implemented at a network node 507 and the IoTF-U 508 may be implemented at a network node 509.

In one aspect, the IoTF-C 506 and the IoTF-U 508 may be implemented at the same hardware platform, such that the IoTF-C 506 and the IoTF-U 508 each represent an independent node in the architecture 500. In such aspect, for example, the IoTF-C 506 may be implemented at a first virtual machine (e.g., a first operating system) provided on a hardware platform (e.g., the network device 505) and the IoTF-U 508 may be implemented at a second virtual machine (e.g., a second operating system) provided on the hardware platform.

As shown in FIG. 5, the IoTF-C 506 is in communication with the network access node 504 via a first S1 connection 516, and the IoTF-U 508 is in communication with the network access node 504 via a second S1 connection 514. In an aspect of the present disclosure, the service network 510 may include a number of entities, functions, gateways, and/or servers configured to provide various types of services. For example, the service network 510 may include a short message entity (SME) 518, a machine type communication interworking function (MTC-IWF) 520, an IoT server 522, and/or a packet data network (PDN) gateway (P-GW) 524. It should be understood that the service network 510 disclosed in FIG. 5 serves as one example and that in other aspects, the service network 510 may include different types of entities, functions, and/or servers than those disclosed in FIG. 5.

As shown in FIG. 5, the client device 502 may transmit an attach request 532 to the network, which may be received by the network access node 504. In an aspect of the present disclosure, the attach request 532 may provide one or more indications. For example, the attach request 532 may indicate that: 1) the client device 502 is to attach as an IoT device, 2) the attach request 532 is a request to perform small (reduced) data transfer, and/or 3) the client device 502 is operating in a low power consumption mode. The attach request 532 may further indicate the home domain (e.g., HPLMN ID or fully qualified domain name (FQDN)) from which the authentication information should be retrieved. The network access node 504 may forward the request to the IoTF-C 506 to which it belongs.

The IoTF-C 506 may determine the address of the HSS/AAA server 512 from the home domain information provided by the client device 502 and may transmit a request 534 for authentication information for the client device 502 to the HSS/AAA server 512. The IoTF-C 506 may receive the authentication information 535 from the HSS/AAA server 512.

The IoTF-C 506 may perform mutual authentication (e.g., an AKA procedure) with the client device 502. During the AKA procedure, the IoTF-C 506 may receive AVs from the HSS/AAA server 512 through the authentication information 535. For example, the AVs may contain a key (shown in FIG. 2 as the key $K_{ASME}$ 206) from an Access Security Management Entity (ASME). For example, the IoTF-C 506 may provide the key $K_{ASME}$ 206 to the client device 502 through the signal 536. When the AKA procedure is completed, the IoTF-C 506 and the client device 502 may derive CP key(s) 526, such as the key $K_{CP}$ 208, the key $K_{IoT-CPenc}$ 210 and/or the key $K_{IoT-CPint}$ 212, and may derive UP key(s) 528, such as the key $K_{UP}$ 214, the key $K_{IoT-UPenc}$ 216 and/or the key $K_{IoT-UPint}$ 218, from the key $K_{ASME}$ 206 or from the key $K_{IoT}$ 202.

In some aspects, the IoTF-C 506 may transfer the key $K_{UP}$ 214 and the user plane encryption and integrity protection keys, such as the key $K_{IoT-UPenc}$ 216 and the key $K_{IoT-UPint}$ 218, to the IoTF-U 508 via the message 538.

In an aspect of the present disclosure, the IoTF-C 506 may generate one or more encrypted client device contexts for the client device 502 by using the context key 530 to encrypt a client device context. The IoTF-C 506 may then transmit the one or more encrypted client device contexts to the client device 502. For example, the IoTF-C 506 may generate an encrypted client device context for the control plane and an encrypted client device context for the user plane. In such example, the context key 530 may include a first context key (e.g., the key $K_{CDC-IoTF-C}$ 304) for generating an encrypted client device context for the control plane and a second context key (e.g., the key $K_{CDC-IoTF-U}$ 306) for generating an encrypted client device context for the user plane. In an aspect of the present disclosure, the IoTF-C 506 may provide one or more of the context key(s) 530 to the IoTF-U 508. For example, the IoTF-C 506 may transmit the second context key (e.g., the key $K_{CDC-IoTF-U}$ 306) for generating the encrypted client device context for the user plane to the IoTF-U 508 via the message 538. Accordingly, in some aspects, the IoTF-U 508 may include context key(s) 531 provided by the IoTF-C 506.

Figure 6:
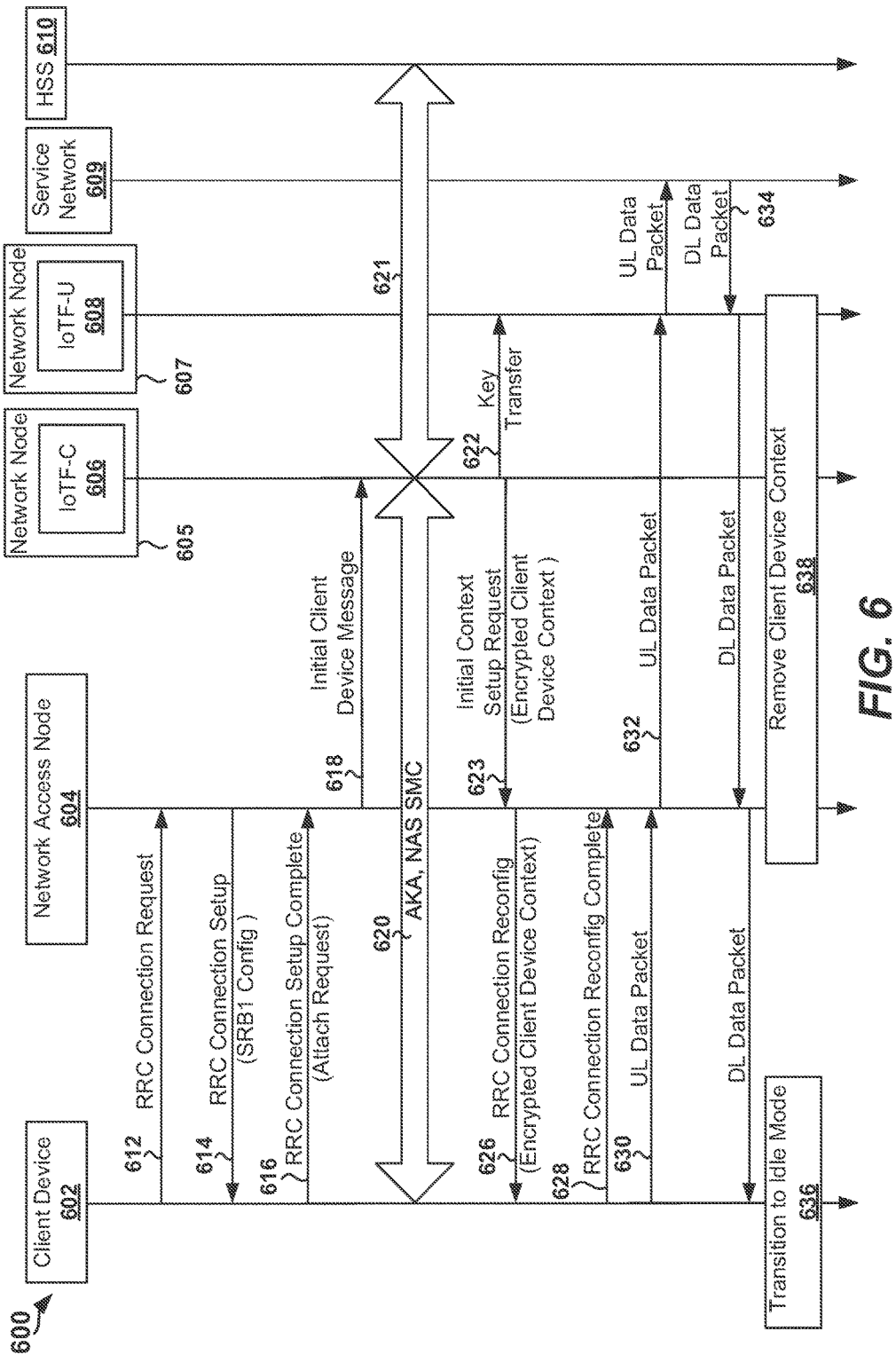
FIG. 6 is a signal flow diagram of an attach procedure by a client device in an IoT network architecture in accordance with various aspects of the present disclosure.

FIG. 6 is a signal flow diagram 600 of an exemplary attach procedure by a client device in an IoT network architecture (e.g., IoT network architecture 100, 500) in accordance with various aspects of the present disclosure. As shown in FIG. 6, the signal flow diagram 600 includes a client device 602 (also referred to as an IoT device), a network access node 604 (e.g., eNB, base station, or network access point), an IoTF-C 606 implemented at a network node 605, an IoTF-U 608 implemented at a network node 607, a service network 609, and a home subscriber server (HSS) 610.

As shown in FIG. 6, the client device 602 may transmit a request 612 (e.g., an RRC connection request) to the network access node 604 in order to communicate with the network. The client device 602 may receive an RRC connection setup message 614, which may include a signaling radio bearer (SRB) configuration (e.g., an SRB1 configuration for transmitting NAS messages over a dedicated control channel (DCCH)). The client device 602 may transmit an RRC connection setup complete message 616 to the network access node 604. For example, the RRC connection setup complete message 616 may indicate an attach request.

The network access node 604 may transmit an initial client device message 618 to the IoTF-C 606. The IoTF-C 606 may determine the address of the HSS server 610 from the home domain information provided by the client device 602, and may communicate 621 with the HSS 610. For example, the IoTF-C 606 may transmit a request for authentication information for the client device 602 to the HSS server 610 and may receive the authentication information from the HSS server 610.

As shown in FIG. 6, the IoTF-C 606 may perform mutual authentication, such as an AKA procedure 620, with the client device 602. When the AKA procedure 620 is completed, the IoTF-C 606 and the client device 602 may derive control plane keys, such as the key $K_{IoT-CPenc}$ 210 and/or key $K_{IoT-CPint}$ 212, from the key $K_{ASME}$ 206 or from the key $K_{IoT}$ 202. The IoTF-C 606 and the client device 602 may further derive user plane keys, such as the key $K_{IoT-UPenc}$ 216 and/or the key $K_{IoT-UPint}$ 218, from the key $K_{ASME}$ 206 or from the key $K_{IoT}$ 202.

In an aspect of the present disclosure, the IoTF-C 606 may generate a control plane encrypted client device context by encrypting a control plane context for the client device 602 using the key $K_{CDC-IoTF-C}$ 304 and/or may generate a user plane encrypted client device context by encrypting a user plane context for the client device 602 using the key $K_{CDC-IoTF-U}$ 306. The IoTF-C 606 may transfer one or more keys (e.g., user plane keys, such as the key $K_{IoT-UPenc}$ 216 and/or the key $K_{IoT-UPint}$ 218, and/or the key $K_{CDC-IoTF-U}$ 306) to the IoTF-U 608 via the message 622.

The IoTF-C 606 may transmit an initial context set up request message 623 with an encrypted client device context (e.g., a control plane encrypted client device context and/or user plane encrypted client device context) to the client device 602. Therefore, the encrypted client device context may include a client device context associated with the IoTF-C 606 and/or IoTF-U 608, where the client device context may be used for uplink data transmission by the client device 602.

In an aspect of the present disclosure, the encryption key is only known to an IoTF (e.g., the client device security context may be retrieved exclusively by the IoTF-C 606 and/or IoTF-U 608). Accordingly, in such aspect, the encryption key may be the $K_{CDC}$-IoTF-U 306, which may be unknown to network entities outside of an IoTF, such as a network access node 604 or a client device 602. In an aspect of the present disclosure, each encrypted client device context corresponds to one data radio bearer (DRB).

The network access node 604 may transmit an RRC connection reconfiguration message 626 to the client device 602. In an aspect of the present disclosure, the RRC connection reconfiguration message 626 may include the encrypted client device context. The client device 602 may transmit an RRC connection reconfiguration complete message 628 to the network access node 604.

The client device 602 may transmit a first message 630 including a data packet (e.g., a UL data packet) to the network access node 604. The network access node 604 may forward the data packet to the service network 609 via the second message 632. For example, and as shown in FIG. 6, the second message 632 may be forwarded to the service network 609 by the network access node 604 and the IoTF-U 608.

The service network 609 may transmit a third message 634 including a data packet (e.g., a DL data packet) to the client device 602. For example, and as shown in FIG. 6, the third message 634 may be forwarded to the client device 602 by the IoTF-U 608 and the network access node 604. The client device 602 may then transition 636 to the idle mode. The network access node 604, the IoTF-C 606, and the IoTF-U 608 may proceed to remove 638 the client device context.

IoT Uplink (UL) Data Transfer

Figure 7:
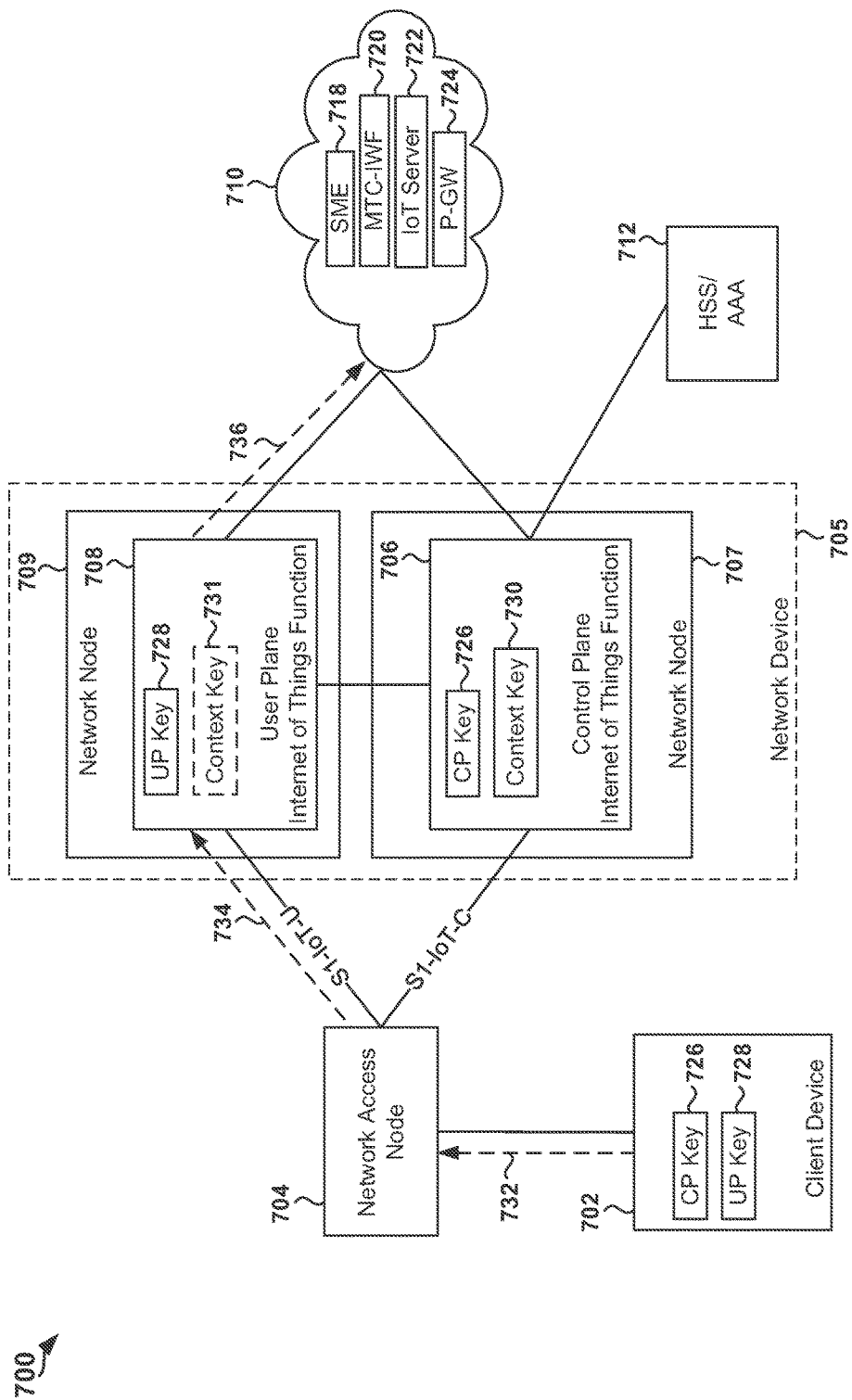
FIG. 7 is a block diagram illustrating a data transmission initiated by a client device in an IoT network architecture in accordance with various aspects of the present disclosure.

FIG. 7 is a block diagram illustrating a data transmission initiated by a client device in an IoT network architecture 700 in accordance with various aspects of the present disclosure. As shown in FIG. 7, the IoT network architecture 700 includes a client device 702 (also referred to as an IoT device), a network access node 704 (e.g., eNB, base station, network access point), a network device 705, a service network 710, and a home subscriber server (HSS)/authentication, authorization, and accounting (AAA) server 712.

In one aspect, the network device 705 may include one or more processing circuits and/or other appropriate hardware configured to implement an IoTF. For example, an IoTF may include a control plane IoT Function (IoTF-C) 706 and a user plane IoT Function (IoTF-U) 708. In such aspect, the IoTF-C 706 may be implemented at a network node 707 and the IoTF-U 708 may be implemented at a network node 709. In one aspect, the IoTF-C 706 and the IoTF-U 708 may be implemented at the same hardware platform, such that the IoTF-C 706 and the IoTF-U 708 each represent an independent node in the architecture 700. In such aspect, for example, the IoTF-C 706 may be implemented at a first virtual machine (e.g., a first operating system) provided on a hardware platform (e.g., the network device 705) and the IoTF-U 708 may be implemented at a second virtual machine (e.g., a second operating system) provided on the hardware platform.

In an aspect of the present disclosure, the service network 710 may include a number of entities, functions, gateways, and/or servers configured to provide various types of services. For example, the service network 710 may include a short message entity (SME) 718, a machine type communication interworking function (MTC-IWF) 720, an IoT server 722, and/or a packet data network (PDN) gateway (P-GW) 724. It should be understood that the service network 710 disclosed in FIG. 7 serves as one example and that in other aspects, the service network 710 may include different types of entities, functions, and/or servers than those disclosed in FIG. 7.

In the aspect of FIG. 7, the IoTF-C 706 may have generated an encrypted client device context for the control plane and an encrypted client device context for the user plane. In such aspect, the context key(s) 730 may include a first context key (e.g., the key $K_{CDC-IoTF-C}$ 304) for generating an encrypted client device context for the control plane and a second context key (e.g., the key $K_{CDC-IoTF-U}$ 306) for generating an encrypted client device context for the user plane. For example, the IoTF-C 706 may have transmitted the second context key (e.g., the key $K_{CDC-IoTF-U}$ 306) for generating the encrypted client device context for the user plane to the IoTF-U 708. Accordingly, in such example, the IoTF-U 708 may include the context key(s) 731 provided by the IoTF-C 706 as shown in FIG. 7. In the aspect of FIG. 7, the client device 702 has derived CP key(s) 726 and UP key(s) 728 in a manner previously discussed.

As shown in FIG. 7, the client device 702 may transmit a first message 732 including a data packet and an encrypted client device context provided by the IoTF-C 706 to the network access node 704. The network access node 704 may determine the address of the IoTF-U 708 from the IoTF-U identifier in the data packet and may forward the data packet to the IoTF-U 708 via a second message 734. In an aspect, the network access node 704 may forward the data packet to the next hop node (e.g., the IoTF-U 708) indicated by the client device 702 without verifying the packet. The IoTF-U 708 may verify the encrypted client device context and may decrypt the encrypted client device context using the context key 731 (e.g., the key $K_{CDC-IoTF-U}$ 306 for generating the encrypted client device context for the user plane). The IoTF-U 708 may then reconstruct the client device context based on the decrypted information. The IoTF-U 708 may then decrypt and verify the data packet with the encryption and integrity keys (e.g., UP key(s) 728).

Figure 8:
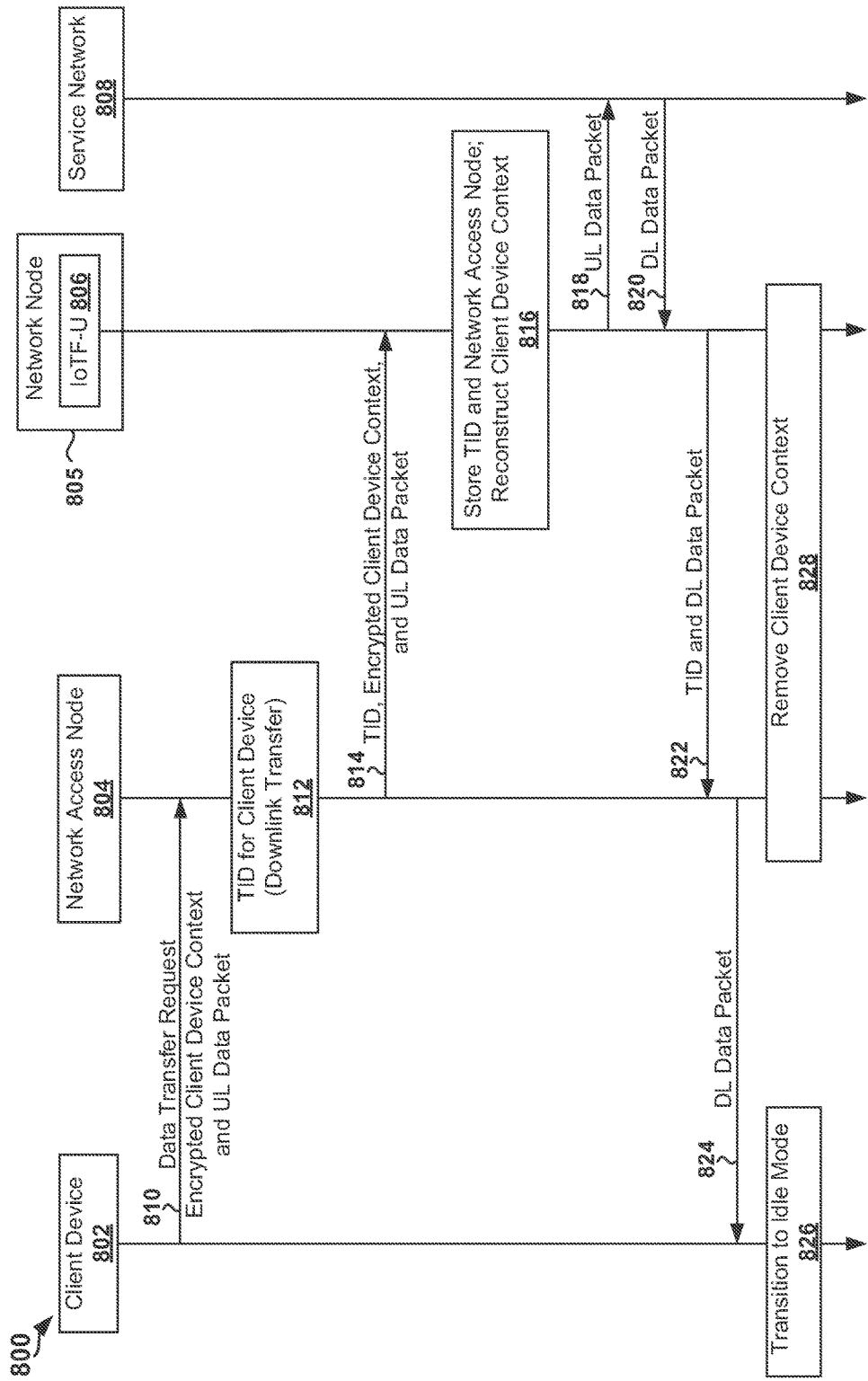
FIG. 8 is a signal flow diagram illustrating a data transmission initiated by a client device in an IoT network architecture in accordance with various aspects of the present disclosure.

FIG. 8 is a signal flow diagram 800 illustrating an exemplary data transmission initiated by a client device in an IoT network architecture (e.g., IoT network architecture 700) in accordance with various aspects of the present disclosure. As shown in FIG. 8, the signal flow diagram 800 includes a client device 802 (also referred to as an IoT device), a network access node 804 (e.g., eNB, base station, or network access point), an IoTF-U 806 implemented at a network node 805, and a service network 808. The client device 802 may transmit a data transfer request message 810 that includes an encrypted client device context and a data packet (e.g., a UL data packet) to the network access node 804. In as aspect, the data transfer request message 810 may be sent by the client device 802 without establishing an RRC connection with the network access node 804.

The network access node 804, upon receipt of the data transfer request message 810, may assign 812 a temporary identifier (TID) for the client device 802 for potential downlink (DL) traffic. For example, the TID may be a cell radio network temporary identifier (C-RNTI). The network access node 804 may determine the IoTF-U identifier included in the header of the data packet. An example format of the data packet including such header is discussed herein with reference to FIG. 12.

The network access node 804 may determine the IP address of the IoTF-U 806, and may forward the data packet to the IoTF-U 806 via a first message 814. For example, as part of the Operations and Maintenance (OAM) procedures, the network access node 804 may be configured with a set of IoTF-U identifiers and the corresponding IP address, or alternatively, the network access node 804 may use a domain name system (DNS) query based on the IoTF-U ID to determine the IP address of the IoTF-U 806. In an aspect of the present disclosure, and as shown in FIG. 8, the network access node 804 may include the TID and the encrypted client device context along with the data packet in the first message 814. In an aspect of the present disclosure, the TID is stored at the network access node 804 for a predefined time interval. In such aspect, the network access node 804 may transmit the TID expiration time to IoTF-U 806 along with the TID in the first message 814. The IoTF-U 806 may decrypt the encrypted client device context and may reconstruct 816 the client device context (e.g., S5 bearer). The IoTF-U 806 may forward the data packet to the service network 808 (e.g., the P-GW in service network 808 or other entity in the service network 808) via a second message 818.

In response to the uplink data (e.g., the UL data packet in the second message 818), the IoTF-U 806 may receive a data packet (e.g., a DL data packet) from the service network 808 (e.g., the P-GW in the service network 808 or a corresponding entity in the service network 808) via the third message 820. The IoTF-U 806 may transmit the received data packet to the network access node 804 with the TID in a fourth message 822. The network access node 804 may identify the client device 802 using the TID and may transmit the data packet to the client device 802 in a fifth message 824. The client device 802 may transition 826 to the idle mode based on a preconfigured timer. The network access node 804 and the IoTF-U 806 may proceed to remove 828 the client device context that was created on-the-fly from the encrypted client device context.

Client Device Terminated Data Transfer (Paging)

Figure 9:
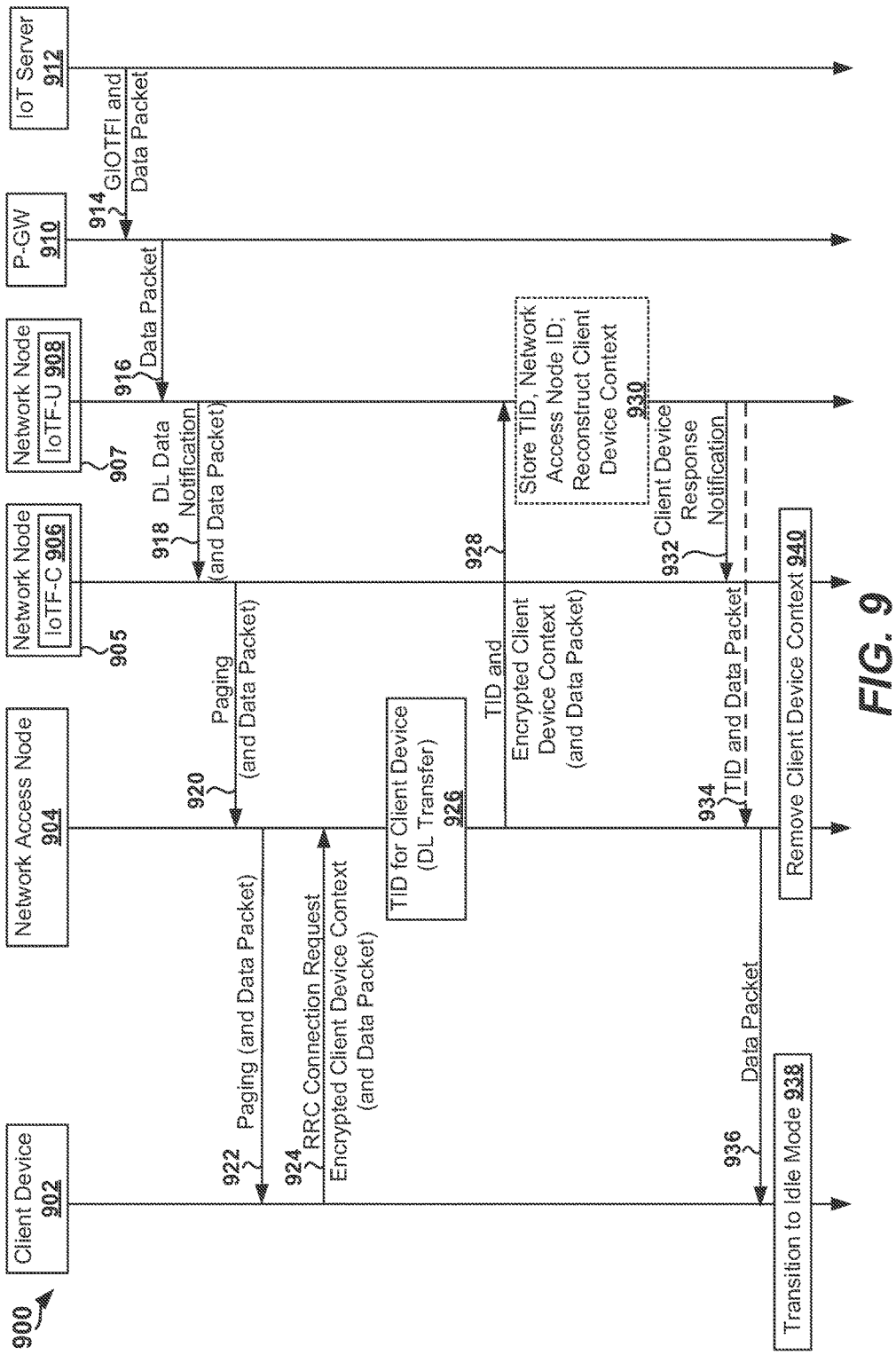
FIG. 9 is a signal flow diagram of a client device terminated data transmission in an IoT network architecture in accordance with various aspects of the present disclosure.

FIG. 9 is a signal flow diagram 900 of an exemplary client device terminated data transmission in an IoT network architecture (e.g., IoT network architecture 100) in accordance with various aspects of the present disclosure. As shown in FIG. 9, the signal flow diagram 900 includes a client device 902 (also referred to as an IoT device), a network access node 904 (e.g., eNB, base station, network access point), an IoTF-C 906 implemented at a network node 905 and an IoTF-U 908 implemented at a network node 907, a P-GW 910, and an IoT server 912. The IoT server 912 may transmit a downlink (DL) message 914 including a DL data packet and a global IoTF identifier (GIOTFI) to the P-GW 910. The P-GW 910 may locate the IoTF-U 908 based on the GIOTFI and may forward the DL data packet to the IoTF-U 908 in a forward message 916. The IoTF-U 908 may transmit a DL data notification message 918 to IoTF-C 906. In an aspect of the present disclosure, the DL data notification message 918 may include the DL data packet if the DL data packet is small enough to be carried in a paging message. The IoTF-C 906 may transmit a paging message 920 to one or more network access nodes (e.g., network access node 904). The network access node 904 may then page the client device 902 by transmitting the page message 922.

The client device 902 may transmit an RRC connection request message 924 including a UL data packet to the IoTF-U 908. In an aspect of the present disclosure, the UL data packet transmitted by the client device 902 may be empty. The network access node 904 may assign 926 a temporary identifier (TID) for the client device 902 for potential downlink (DL) traffic. For example, the TID may be a cell radio network temporary identifier (C-RNTI). The network access node 904 may then forward the UL data packet with the TID and encrypted client device context to the IoTF-U 908 in a forward message 928. The IoTF-U 908 may store 930 the TID and ID of the network access node 904.

The IoTF-U 908 may transmit a client device response notification message 932 to the IoTF-C 906. In an aspect of the present disclosure, the IoTF-U 908 may transmit, to the client device 902, a message 934 including a DL data packet and the TID for the client device 902 if the IoTF-U 908 was not able to include the DL data packet in the DL data notification message 918. The network access node 904 may forward the DL data packet to the client device 902 in a forward message 936. The client device 902 may then transition 938 to the idle mode. The network access node 904 and IoTF-C 906 may remove 940 the client device context.

Resource Establishment and Release

Figure 10:
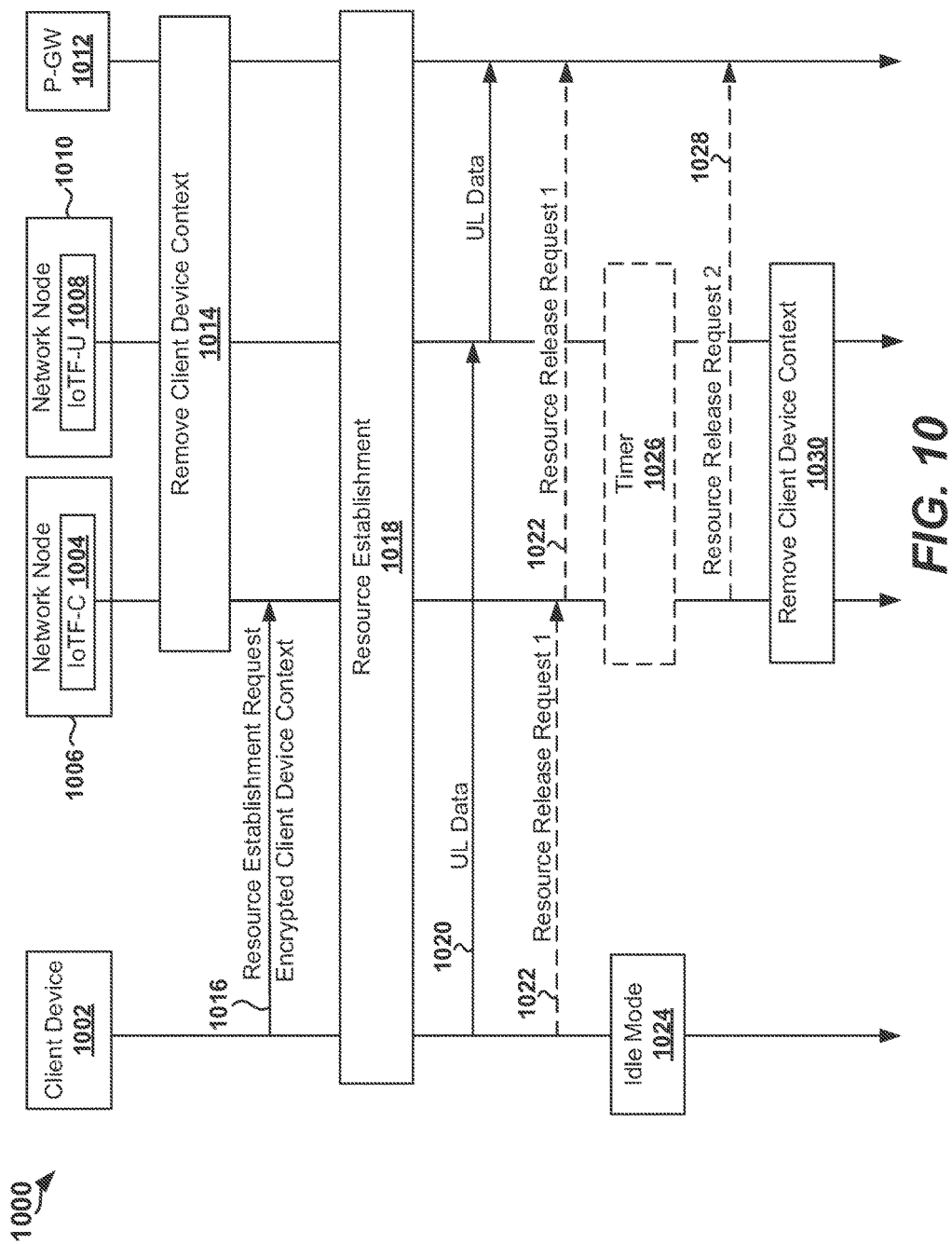
FIG. 10 is a signal flow diagram of an exemplary resource establishment and release in an IoT network architecture in accordance with various aspects of the present disclosure.

FIG. 10 is a signal flow diagram 1000 of an exemplary resource establishment and release in an IoT network architecture (e.g., IoT network architecture 100) in accordance with various aspects of the present disclosure. As shown in FIG. 10, the signal flow diagram 1000 includes a client device 1002 (also referred to as an IoT device), an IoTF-C 1004 implemented at a network node 1006, an IoTF-U 1008 implemented at a network node 1010, and a P-GW 1012.

As shown in FIG. 10, the IoTF-C 1004, the IoTF-U 1008, and/or the P-GW 1012 may remove 1014 a context for the client device 1002. In one aspect, the IoTF-C 1004 and/or the IoTF-U 1008 may remove the context for the client device 1002 after the IoTF-C 1006 has provided an encrypted client device context to the client device 1002. As shown in FIG. 10, the client device 1002 may transmit a resource establishment request message 1016 to the IoTF-C 1004. For example, the client device 1002 may transmit the resource establishment request message 1016 when the client device 1002 is to transmit infrequent burst data transmissions to the network (e.g., to the P-GW 1012). For example, a burst data transmission may include a sequence of Protocol Data Units (PDUs), such as IP packets. In an aspect, the resource establishment request message 1016 may include an encrypted client device context (e.g., a client device context for the control plane).

During the resource establishment operation 1018, the IoTF-C 1004 may verify the encrypted client device context from the client device 1002 and upon successful verification, the IoTF-C 1004 may decrypt the encrypted client device context. The IoTF-C 1004 may then reconstruct the context for the client device 1002. In an aspect, the IoTF-U 1008 and the P-GW 1012 may also reconstruct the context for the client device 1002. In an aspect, the IoTF-C 1004 may obtain a network address (e.g., an IP address) for the client device 1002 and may provide the network address to the client device 1002 during the resource establishment operation 1018. As shown in FIG. 10, the client device 1002 may transmit uplink (UL) data 1020 to the P-GW 1012 via the IoTF-U 1008. In an aspect, the client device 1002 may transmit the UL data 1020 in one or more PDUs that include the network address of the client device 1002.

In one aspect, the client device 1002 may determine that there are no further data transmissions to be made to the network. In such aspect, the client device 1002 may optionally transmit a resource release request message 1 1022 to the IoTF-C 1004. The client device 1002 may then enter the idle mode 1024. The IoTF-C 1004 may transmit the resource release request message 1 1022 to the P-GW 1012. In an aspect, the resource release request message 1 1022 enables the P-GW 1012 to release one or more resources for the client device 1002. For example, the one or more resources may include the network address assigned to the client device 1002 (e.g., to allow reallocation of that network address), a bearer for the client device 1002, and/or other resources for the client device 1002. The IoTF-C 1004 and the IoTF-U 1008 may then remove 1030 the context for the client device 1002. In another aspect, the IoTF-C 1004 and/or the IoTF-U 1008 may initiate a timer 1026 after the UL data 1020 is received at the IoTF-U 1008. If the timer 1026 expires prior to receiving any new UL data (e.g., additional UL data subsequent to the UL data 1020) from the client device 1002 and/or prior to transmitting any downlink (DL) data to the client device 1002, the IoTF-C 1004 and/or the IoTF-U 1008 may determine that the client device 1002 is in the idle mode 1024. In such a scenario, the IoTF-C 1004 may transmit a resource release request message 2 1028 to the P-GW 1012. In an aspect, the resource release request message 2 1028 enables the P-GW 1012 to release one or more resources for the client device 1002. For example, the one or more resources may include the network address assigned to the client device 1002 (e.g., to allow reallocation of that network address), a bearer for the client device 1002, and/or other resources for the client device 1002. The IoTF-C 1004 and the IoTF-U 1008 may then remove 1030 the context for the client device 1002. In one aspect, the timer 1026 may be reset by the IoTF-C 1004 and/or the IoTF-U 1008 when a new UL data transmission (e.g., additional UL data subsequent to the UL data 1020) is received at the IoTF-U 1008 from the client device 1002 prior to expiration of the timer 1026.

Figure 11:
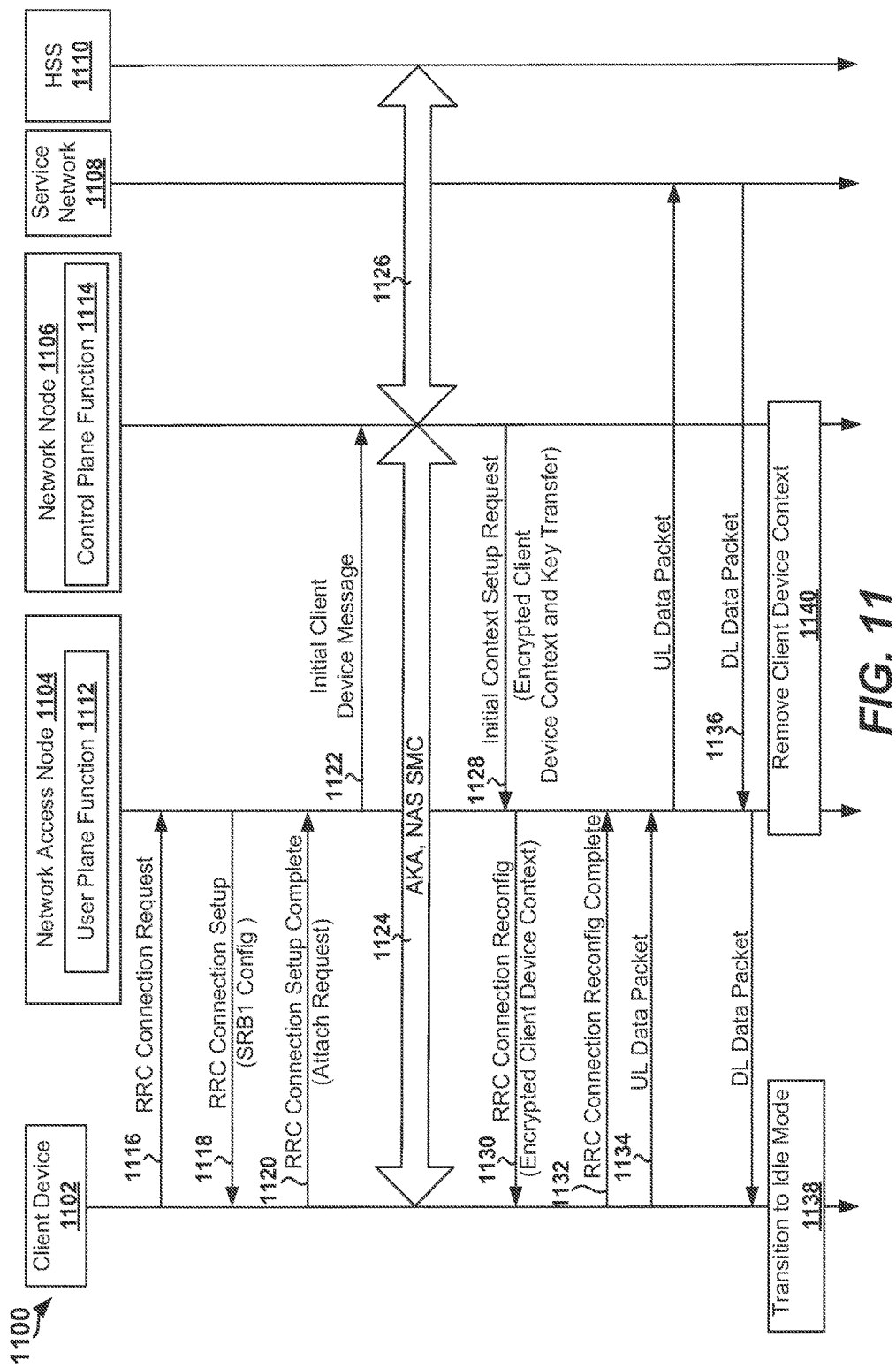
FIG. 11 is a signal flow diagram of an exemplary attach procedure by a client device in an IoT network architecture in accordance with various aspects of the present disclosure.

FIG. 11 is a signal flow diagram 1100 of an exemplary attach procedure by a client device in an IoT network architecture in accordance with various aspects of the present disclosure. As shown in FIG. 11, the signal flow diagram 1100 includes a client device 1102 (also referred to as an IoT device), a user plane function 1112 implemented at a network access node 1104 (e.g., eNB, base station, or network access point), a control plane function 1114 implemented at a network node 1106, a service network 1108, and a home subscriber server (HSS) 1110.

As shown in FIG. 11, the client device 1102 may transmit a request 1116 (e.g., an RRC connection request) to the network access node 1104 in order to communicate with the network. The client device 1102 may receive an RRC connection setup message 1118, which may include a signaling radio bearer (SRB) configuration (e.g., an SRB1 configuration for transmitting NAS messages over a dedicated control channel (DCCH)). The client device 1102 may transmit an RRC connection setup complete message 1120 to the network access node 1104. For example, the RRC connection setup complete message 1120 may indicate an attach request.

The network access node 1104 may transmit an initial client device message 1122 to the network node 1106. The control plane function 1114 may determine the address of the HSS server 1110 from the home domain information provided by the client device 1102, and may communicate 1126 with the HSS 1110. For example, the control plane function 1114 may transmit a request for authentication information for the client device 1102 to the HSS server 1110 and may receive the authentication information from the HSS server 1110.

As shown in FIG. 11, the control plane function 1114 may perform mutual authentication, such as an AKA procedure 1124, with the client device 1102. When the AKA procedure 1124 is completed, the control plane function 1114 and the client device 1102 may derive control plane keys, such as the key $K_{IoT\text{-}CPenc}$ 210 and/or key $K_{IoT\text{-}CPint}$ 212, from the key $K_{ASME}$ 206 or from the key $K_{IoT}$ 202. The control plane function 1114 and the client device 1102 may further derive user plane keys, such as the key $K_{IoT\text{-}UPenc}$ 216 and/or the key $K_{IoT\text{-}UPint}$ 218, from the key $K_{ASME}$ 206 or from the key $K_{IoT}$ 202.

In an aspect of the present disclosure, the control plane function 1114 may generate a control plane encrypted client device context by encrypting a control plane context for the client device 1102 using the key $K_{CDC\text{-}IoTF\text{-}C}$ 304 and/or may generate a user plane encrypted client device context by encrypting a user plane context for the client device 1102 using the key $K_{CDC\text{-}IoTF\text{-}U}$ 306.

The control plane function 1114 may transmit an initial context set up request message 1128 with an encrypted client device context (e.g., a control plane encrypted client device context and/or user plane encrypted client device context) to the client device 1102. Therefore, the encrypted client device context may include a client device context associated with the control plane function 1114 and/or the user plane function 1112, where the client device context may be used for uplink data transmission by the client device 1102. In an aspect, the control plane function 1114 may transfer one or more keys (e.g., user plane keys, such as the key $K_{IoT\text{-}UPenc}$ 216 and/or the key $K_{IoT\text{-}UPint}$ 218, and/or the key $K_{CDC\text{-}IoTF\text{-}U}$ 306) to the user plane function 1112 via the message 1128.

In an aspect of the present disclosure, the encryption key is only known to the user plane function 1112 and/or the control plane function 1114 (e.g., the client device security context may be retrieved exclusively by the user plane function 1112 and/or the control plane function 1114). In such aspect, for example, the encryption key may be the $K_{CDC}$-IoTF-U 306. In an aspect of the present disclosure, each encrypted client device context corresponds to one data radio bearer (DRB).

The network access node 1104 may transmit an RRC connection reconfiguration message 1130 to the client device 1102. In an aspect of the present disclosure, the RRC connection reconfiguration message 1130 may include the encrypted client device context. The client device 1102 may transmit an RRC connection reconfiguration complete message 1132 to the network access node 1104.

The client device 1102 may transmit a first message 1134 including a data packet (e.g., a UL data packet) to the network access node 1104. The user plane function 1112 implemented at the network access node 1104 may forward the data packet to the service network 1108. The service network 1108 may transmit a second message 1136 including a data packet (e.g., a DL data packet) to the client device 1102. For example, and as shown in FIG. 11, the second message 1136 may be forwarded to the client device 1102 by the user plane function 1112 at the network access node 1104. The client device 1102 may then transition 1138 to the idle mode. The network access node 1104 and the network node 1106 may proceed to remove 1140 the client device context.

Figure 12:
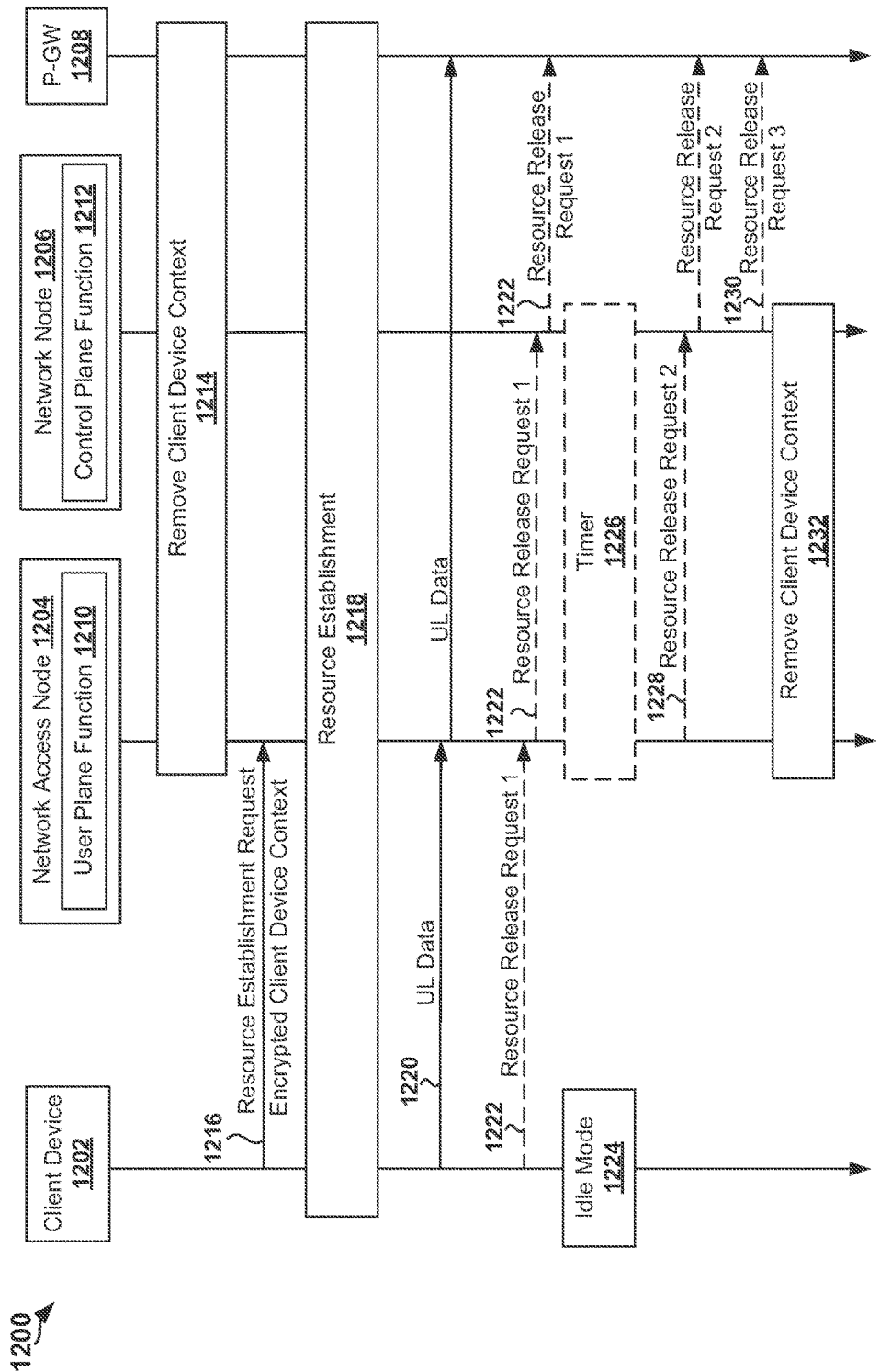
FIG. 12 is a signal flow diagram of an exemplary resource establishment and release in an IoT network architecture in accordance with various aspects of the present disclosure.

FIG. 12 is a signal flow diagram 1200 of an exemplary resource establishment and release in an IoT network architecture in accordance with various aspects of the present disclosure. As shown in FIG. 12, the signal flow diagram 1200 includes a client device 1202 (also referred to as an IoT device), a user plane function 1210 implemented at a network access node 1204, a control plane function 1212 implemented at a network node 1206, and a P-GW 1208. In an aspect, the network access node 1204, the user plane function 1210, the network node 1206, and the control plane function 1212 of FIG. 12 may respectively correspond to the network access node 1104, the user plane function 1112, the network node 1106, and the control plane function 1114 of FIG. 11.

As shown in FIG. 12, the network access node 1204, the network node 1206, and/or the P-GW 1208 may remove 1214 a context for the client device 1202. In one aspect, the network access node 1204 and/or the network node 1206 may remove the context for the client device 1202 after the control plane function 1212 has provided an encrypted client device context to the client device 1202. As shown in FIG. 12, the client device 1202 may transmit a resource establishment request 1216 to the network access node 1204. For example, the client device 1202 may transmit the resource establishment request 1216 when the client device 1202 is to transmit infrequent burst data transmissions to the network (e.g., to the P-GW 1208). For example, a burst data transmission may include a sequence of Protocol Data Units (PDUs), such as IP packets. In an aspect, the resource establishment request 1216 may include an encrypted client device context (e.g., a client device context for the control plane).

During the resource establishment operation 1218, the control plane function 1212 may verify the encrypted client device context from the client device 1202 and upon successful verification, the control plane function 1212 may decrypt the encrypted client device context. The control plane function 1212 may then reconstruct the context for the client device 1202. In an aspect, the user plane function 1210 and the P-GW 1208 may also reconstruct the context for the client device 1202. In an aspect, the control plane function 1212 may obtain a network address (e.g., an IP address) for the client device 1202 and may provide the network address to the client device 1202 during the resource establishment operation 1218. As shown in FIG. 12, the client device 1202 may transmit uplink (UL) data 1220 to the P-GW 1208 via the network access node 1204. In an aspect, the client device 1202 may transmit the UL data 1220 in one or more PDUs that include the network address of the client device 1202.

In one aspect, the client device 1202 may determine that there are no further data transmissions to be made to the network. In such aspect, the client device 1202 may optionally transmit a resource release request message 1 1222 to the network access node 1204. The client device 1202 may then enter the idle mode 1224. As shown in FIG. 12, the network access node 1204 may transmit the resource release request message 1 1222 to the P-GW 1208 via the network node 1206. In an aspect, the resource release request message 1 1222 enables the P-GW 1208 to release one or more resources for the client device 1202. For example, the one or more resources may include the network address assigned to the client device 1202 (e.g., to allow reallocation of that network address), a bearer for the client device 1202, and/or other resources for the client device 1202. The control plane function 1212 and the user plane function 1210 may then remove 1232 the context for the client device 1202. In another aspect, the user plane function 1210 and/or the control plane function 1212 may initiate a timer 1226 after the UL data 1220 is received. If the timer 1226 expires prior to receiving any new UL data (e.g., additional UL data subsequent to the UL data 1220) from the client device 1202 and/or prior to transmitting any downlink (DL) data to the client device 1202, the control plane function 1212 and/or the user plane function 1210 may determine that the client device 1202 is in the idle mode 1224. In such a scenario, according to one aspect, the user plane function 1210 may transmit a resource release request message 2 1228 to the P-GW 1208 via the network node 1206. Alternatively, according to another aspect, the control plane function 1212 may transmit a resource release request message 3 1230 to the P-GW 1208. In an aspect, the resource release request message 2 1228 or the resource release request message 3 1230 enables the P-GW 1208 to release one or more resources for the client device 1202. For example, the one or more resources may include the network address assigned to the client device 1202 (e.g., to allow reallocation of that network address), a bearer for the client device 1202, and/or other resources for the client device 1202. The control plane function 1212 and the user plane function 1210 may then remove 1232 the context for the client device 1202. In one aspect, the timer 1226 may be reset by the control plane function 1212 and/or the user plane function 1210 when a new UL data transmission (e.g., additional UL data subsequent to the UL data 1220) is received at the user plane function 1210 from the client device 1202 prior to expiration of the timer 1226.

Control Plane Protocol Stack

Figure 13:
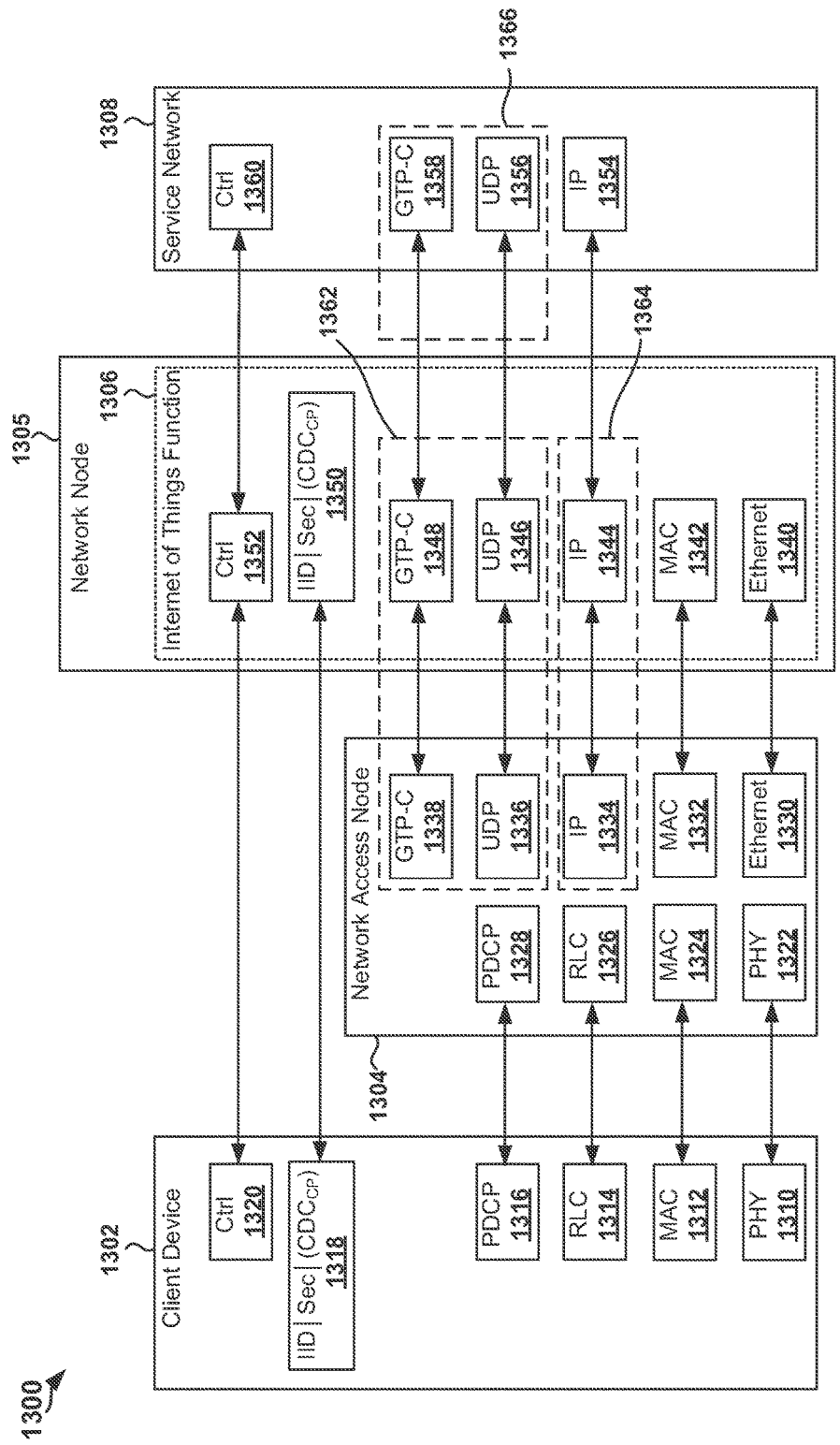
FIG. 13 a control plane protocol stack for IoT data transmission in accordance with various aspects of the present disclosure.

FIG. 13 is a diagram illustrating a control plane protocol stack 1300 for IoT data transmission in accordance with various aspects of the present disclosure. As shown in FIG. 13, the protocol stack 1300 may include a client device protocol stack 1302 (also referred to as an IoT device protocol stack), a network access node protocol stack 1304, an IoTF protocol stack 1306 implemented at a network node 1305, and a service network protocol stack 1308. For example, the network access node protocol stack 1304 may be implemented in an eNB, base station, or network access point. As another example, service network protocol stack 1308 may be implemented in a P-GW. As shown in FIG. 13, the client device protocol stack 1302 may include a physical (PHY) layer 1310, a media access control (MAC) layer 1312, a radio link control (RLC) layer 1314, a packet data convergence protocol (PDCP) layer 1316, and a control (Ctrl) layer 1320. As further shown in FIG. 13, the client device protocol stack 1302 may implement a context protocol layer 1318 for communicating a control plane encrypted client device context (abbreviated as "$CDC_{CP}$" in FIG. 13). The context protocol layer 1318 may further enable communication of an IoTF ID (IID) and/or a security header (abbreviated as "Sec" in FIG. 13) that indicates the presence of an encrypted client device context.

As shown in FIG. 13, the network access node protocol stack 1304 may include a PHY layer 1322, a MAC layer 1324, an RLC layer 1326, and a PDCP layer 1328 that respectively interface with the PHY layer 1310, the MAC layer 1312, the RLC layer 1314, and the PDCP layer 1316 of the client device protocol stack 1302. The network access node protocol stack 1304 may further include an Ethernet layer 1330, a MAC layer 1332, an Internet Protocol (IP)

layer 1334, a user datagram protocol (UDP) layer 1336, and a control plane GPRS Tunneling Protocol (GTP-C) layer 1338.

As shown in FIG. 13, the IoTF protocol stack 1306 may include an Ethernet layer 1340, a MAC layer 1342, an IP layer 1344, a UDP layer 1346, a GTP-C layer 1348, and a control (Ctrl) layer 1352. As further shown in FIG. 13, the IoTF protocol stack 1306 may implement a context protocol layer 1350 for communicating a control plane encrypted client device context (abbreviated as "$CDC_{CP}$" in FIG. 13). The context protocol layer 1350 may also enable communication of an IoTF ID (IID) and/or a security header (abbreviated as "Sec" in FIG. 13) that indicates the presence of an encrypted client device context. As shown in FIG. 13, the context protocol layer 1318 of the client device protocol stack 1302 is in communication with the context protocol layer 1350 of the IoTF protocol stack 1306. In an aspect, an encrypted client device context may be carried in a packet header outside a user plane message in accordance with the exemplary IoT packet format described with respect to FIG. 15.

The service network protocol stack 1308 may include an IP layer 1354, a UDP layer 1356, a GTP-C layer 1358, and a Ctrl layer 1360 that respectively interface with the IP layer 1344, the UDP layer 1346, the GTP-C layer 1348 and the Ctrl layer 1352 of the IoTF protocol stack 1306. In an aspect of the present disclosure, if a network architecture is implemented as a GSM EDGE Radio Access Network (GERAN), protocols different than the IP protocols 1364 may be used. In an aspect of the present disclosure, the GTP-C and UDP protocols indicated by regions 1362 and 1366 may be omitted.

User Plane Protocol Stack

Figure 14:
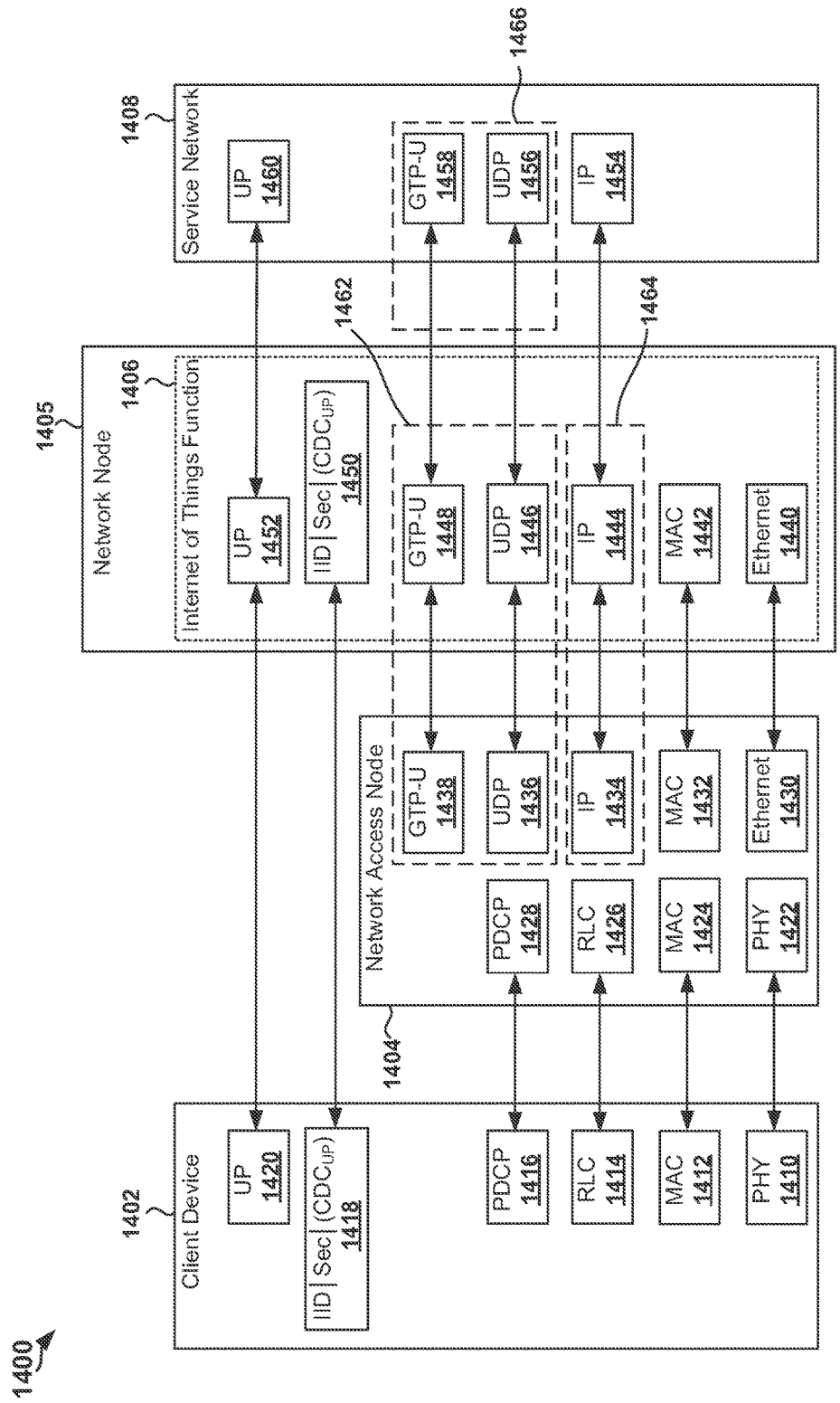
FIG. 14 is a diagram illustrating a user plane protocol stack for IoT data transmission in accordance with various aspects of the present disclosure.

FIG. 14 is a diagram illustrating a user plane protocol stack 1400 for IoT data transmission in accordance with various aspects of the present disclosure. As shown in FIG. 14, the protocol stack 1400 may include a client device protocol stack 1402 (also referred to as an IoT device protocol stack), a network access node protocol stack 1404, an IoTF protocol stack 1406 implemented at a network node 1405, and a service network protocol stack 1408. For example, the network access node protocol stack 1404 may be implemented in an eNB, base station, or network access point. As another example, the service network protocol stack 1408 may be implemented in a P-GW. As shown in FIG. 14, the client device protocol stack 1402 may include a physical (PHY) layer 1410, a media access control (MAC) layer 1412, a radio link control (RLC) layer 1414, a packet data convergence protocol (PDCP) layer 1416, and a user plane (UP) layer 1420. As further shown in FIG. 14, the client device protocol stack 1402 may implement a context protocol layer 1418 for communicating a user plane encrypted client device context (abbreviated as "$CDC_{UP}$" in FIG. 14). The context protocol layer 1418 may further enable communication of an IoTF ID (IID) and/or a security header (abbreviated as "Sec" in FIG. 14) that indicates the presence of an encrypted client device context.

As shown in FIG. 14, the network access node protocol stack 1404 may include a PHY layer 1422, a MAC layer 1424, an RLC layer 1426, and a PDCP layer 1428 that respectively interface with the PHY layer 1410, the MAC layer 1412, the RLC layer 1414, and the PDCP layer 1416 of the client device protocol stack 1402. The network access node protocol stack 1404 may further include an Ethernet layer 1430, a MAC layer 1432, an Internet Protocol (IP) layer 1434, a user datagram protocol (UDP) layer 1436, and a user plane GPRS Tunneling Protocol (GTP-U) layer 1438.

As shown in FIG. 14, the IoTF protocol stack 1406 may include an Ethernet layer 1440, a MAC layer 1442, an IP layer 1444, a UDP layer 1446, and a GTP-U layer 1448. As further shown in FIG. 14, the IoTF protocol stack 1406 may implement a context protocol layer 1450 for communicating a user plane encrypted client device context (abbreviated as "$CDC_{UP}$" in FIG. 14). The context protocol layer 1450 may also enable communication of an IoTF ID (IID) and/or a security header (abbreviated as "Sec" in FIG. 14) that indicates the presence of an encrypted client device context. As shown in FIG. 14, the context protocol layer 1418 of the client device protocol stack 1402 is in communication with the context protocol layer 1450 of the IoTF protocol stack 1406. In an aspect, a user plane encrypted client device context may be carried in a packet header outside a UP message in accordance with the exemplary IoT packet format described with respect to FIG. 15.

The service network protocol stack 1408 may include an IP layer 1454, a UDP layer 1456, a GTP-U layer 1458 and a UP layer 1460 that respectively interface with the IP layer 1444, the UDP layer 1446, the GTP-U layer 1448, and the UP layer 1452 of the IoTF protocol stack 1406. In an aspect of the present disclosure, if a network architecture is implemented as a GSM EDGE Radio Access Network (GERAN), protocols different than the IP protocols 1464 may be used. In an aspect of the present disclosure, the GTP-U and UDP protocols indicated by regions 1462 and 1466 may be omitted. In an aspect of the present disclosure, if the IP protocol is used for UP message delivery, the user plane encrypted network reachability context may be carried in the IP options field (IPv4) or IP extension header (IPv6).

IoT Packet Format

Figure 15:
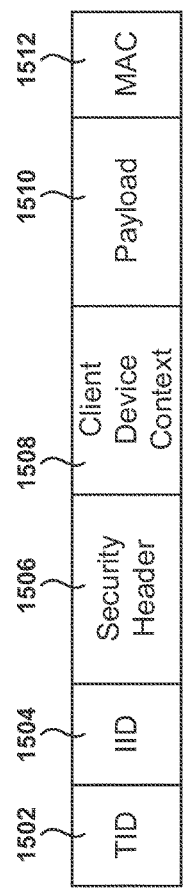
FIG. 15 is a diagram of a packet format in accordance with various aspects of the present disclosure.

FIG. 15 is a diagram of a packet format 1500 for transmissions in an IoT network architecture in accordance with various aspects of the present disclosure. With reference to FIG. 15, the temporary identifier (TID) field 1502 may be used by a network access node (e.g., eNB, base station, or network access point) to identify a client device (also referred to as an IoT device) locally. For example, the value assigned by a network access node to the TID field 1502 for identifying a client device may be a C-RNTI or equivalent.

In an aspect of the present disclosure, the IoTF ID (IID) field 1504 may include a globally unique temporary identifier (GUTI). For example, the GUTI may include an identifier associated with an IoTF and an identifier (e.g., a temporary identifier, such as a mobility management entity (MME) temporary mobile subscriber identity (M-TMSI)) associated with the client device. For example, the GUTI may be used by a network access node to identify an IoTF, and the GUTI may be used by an IoTF to identify a client device. In another aspect, the IID field 1504 may include a global IoTF identifier (GIOTFI) and an identifier (e.g., a temporary identifier, such as an M-TMSI) associated with the client device. For example, the GIOTFI may be an equivalent of a globally unique mobility management entity identifier (GUMMEI) for an IoTF. In an aspect of the present disclosure, the M-TMSI may be encrypted for client device privacy. It should be noted that using the IoTF IP address may disclose the network topology.

The security header field 1506 may indicate the presence of an encrypted client device context, a control plane (CP)/user plane (UP) indication, a sequence number, a time stamp value and/or a random value. For example, the time stamp value may be based on a time and a counter, where the time is the network access node time or IoTF time. The client device context field 1508 may include an encrypted client device context. It should be noted that if a time stamp is used for encryption instead of the sequence number, the IoTF may not need to maintain any client device network states. A random value may be based on the random number and a counter. The random value is generated by the network access node or by the client device, or a combination thereof. The counter may be incremented by a certain value (e.g., one) for each packet. If a random value is used for encryption instead of the sequence number, the client device may generate a new encryption key based on the encryption key in the security context and the random number. If a random value is used for integrity protection instead of the sequence number, the client device may generate a new integrity protection key based on the integrity protection key in the security context and the random number, and may protect a message using the new integrity protection key. The payload field 1510 may include data or control information (e.g., a data packet or a control packet).

The message authentication code (MAC) field 1512 may be used for integrity protection. For example, the MAC field 1512 may include a message authentication code generated by a transmitting device or entity. The message authentication code in the MAC field 1512 may then be used by a receiving device or entity to verify that the integrity of the message has not been compromised (e.g., that the contents of the message have not been altered or manipulated). In one aspect, the message authentication code in the MAC field 1512 may be generated at a transmitting device or entity by applying a message authentication code generation algorithm (e.g., an AEAD cipher), where a message (e.g., a packet) and a user plane key or a control plane key are used as inputs for the message authentication code generation algorithm. The output of the message authentication code generation algorithm may be the message authentication code included in the MAC field 1512. A receiving device or entity may verify the integrity of the received message by applying the message authentication code generation algorithm (e.g., the AEAD cipher) to the message. For example, the received message (e.g., the packet) and the user plane key or the control plane key may be used as inputs for the message authentication code generation algorithm. The receiving device or entity may then compare the output of the message authentication code generation algorithm to the message authentication code included in the MAC field 1512. In such example, when the output of the message authentication code generation algorithm matches the message authentication code included in the MAC field 1512, the receiving device or entity may determine that the message has been successfully verified.

Encrypted Client Device Context Design and Generation

In accordance with the aspects disclosed herein, the encrypted client device context may contain information that may be needed by the network to provide a service to the client device. For example, the client device context may include a security context, a bearer ID, Evolved Packet System (EPS) bearer quality of service(s) (QoS) and S5-TEID(s), and/or other services, parameters, values, settings, or features that may be needed by the network to provide a service to the client device. In some aspects, the client device context may be established during an AKA procedure.

In some aspects, the encrypted client device context may include one or more items of information in addition to the client device context. For example, the encrypted client device context may include an expiration time set by IoTF-C 106 (or indicated in the client device context), which limits the lifetime of the encrypted client device context (e.g., to prevent permanent reuse). As another example, the encrypted client device context may have a key index that identifies the key used for generating the encrypted client device context.

In some aspects, the encrypted client device context may be generated using a secret key that is only known to an entity in the network and, therefore, may not be interpreted and/or modified by client devices. For example, the encrypted client device context may be generated by encrypting a client device context using the secret key of the IoTF-U (e.g., IoTF-U 108). In some aspects, the encrypted client device context may be integrity protected with the secret key of the IoTF-U (e.g., IoTF-U 108) and, therefore, may not be manipulated/modified by client devices.

In an aspect, the encrypted client device context may be provided to a client device (e.g., client device 102) by the IoTF-C (e.g., IoTF-C 106) as a successful completion of authentication and context (e.g., bearer) setup. In an aspect, a client device may include the encrypted client device context in one or more user plane packets (e.g., UL data packets) to enable the IoTF-U (e.g., IoTF-U 108) to reconstruct the client device context on-the-fly. For example, if a client device needs to transmit multiple packets in series, the client device may include the encrypted client device context in the first packet without including the encrypted client device context in subsequent packets. In some aspects, the encrypted client device context may be specific to a client device and, therefore, an encrypted client device context issued to a client device may not be used by any other client devices.

a) Control Plane Encrypted Client Device Context

In an aspect of the present disclosure, an IoTF (e.g., IoTF-C 106 in FIG. 1) may generate an encrypted client device context by concatenating one or more items of information. For example, a control plane (CP) encrypted client device context ($CDC_{CP}$) may be generated based on the expression KeyID∥Enc_$K_{CDC\text{-}IoTF\text{-}C}$($CDC_{CP}$)∥MAC. In an aspect of the present disclosure, the key $K_{CDC\text{-}IoTF\text{-}C}$ (e.g., the key $K_{CDC\text{-}IoTF\text{-}C}$ 304 in FIG. 3) may be the same as the key $K_{CDC\text{-}IoTF}$ (e.g., the key $K_{CDC\text{-}IoTF}$ 302 in FIG. 3) or derived from the key $K_{CDC\text{-}IoTF}$. The term KeyID may represent the Key Index (used for generating the encrypted client device context). The term $CDC_{CP}$ may represent the control plane client device context. For example, the control plane client device context may include a client device identifier, the client device security context (e.g., control plane keys, such as the key $K_{IoT}$ ($K_{ASME}$ equivalent), the key $K_{IoT\text{-}CPenc}$ 210, the key $K_{IoT\text{-}CPint}$ 212), the client device security capabilities (e.g., Evolved Packet System Encryption Algorithm (EEA), Evolved Packet System Integrity Algorithm (EIA)), and/or the next hop (S5/S8) configuration information. For example, the next hop configuration information may include an IoT server address, a P-GW address, and/or TEIDs. The term MAC may indicate the encryption mode and/or a message authentication code generation algorithm (also referred to as a MAC algorithm), which may be chosen by a mobile network operator (MNO) and configured to IoTFs. Therefore, the term Enc_$K_{CDC\text{-}IoTF\text{-}C}$ ($CDC_{CP}$) may represent the result of an encryption operation performed on the control plane client device context using the key $K_{CDC\text{-}IoTF\text{-}C}$.

b) User Plane Encrypted Client Device Context

As another example, a user plane (UP) encrypted client device context ($CDC_{UP}$) may be generated based on the expression KeyID∥Enc_$K_{CDC\text{-}IoTF\text{-}U}$($CDC_{UP}$)∥MAC. The term $CDC_{UP}$ may represent the user plane client device context. For example, the user plane client device context may include a client device identifier, bearer IDs, Evolved Packet System (EPS) bearer quality of service(s) (QoS), an S5 tunnel endpoint identifier (TEID) for a user plane General Packet Radio Service (GPRS) tunneling protocol (GTP-U), a P-GW Internet Protocol (IP) address (or equivalent information) to which the IoTF-U 108 forwards UL data, a client device security context (e.g., a selected encryption algorithm and user plane keys, such as the key $K_{IoT\text{-}UPenc}$ 216, the key $K_{IoT\text{-}UPint}$ 218), the client device security capabilities (e.g., Evolved Packet System Encryption Algorithm (EEA), Evolved Packet System Integrity Algorithm (EIA)), and/or the next hop (S5/S8) configuration information. For example, the next hop configuration information may include an IoT server address, a P-GW address, and/or TEIDs. Therefore, the term $Enc\_K_{CDC\text{-}IoTF\text{-}U}$ ($CDC_{UP}$) may represent the result of an encryption operation performed on the user plane client device context using the key $K_{CDC\text{-}IoTF\text{-}U}$. In an aspect of the present disclosure, the encrypted client device context may only be decrypted by the IoTF (e.g., IoTF-C 106 and/or IoTF-U 108) to which the client device is attached/associated. In an aspect of the present disclosure, a client device context may be compressed before being encrypted.

The encrypted client device context may have one or more characteristics. For example, an encrypted client device context may contain the network state information associated with a particular client device and, therefore, may not be transferable to other client devices. An IoTF-C/U (e.g., the IoTF-C 106 and/or the IoTF-U 108) does not maintain contexts (e.g., network state information) of a client device. Accordingly, such IoTF-C/U may recover a client device context from an encrypted client device context using its own secret key and, therefore, the IoTF-C/U does not need to store any additional information to recover a client device context. The IoTF-C/U may remove a client device context under certain conditions (e.g., Evolved Packet System Connection Management (ECM)-Idle or immediately after small data transfer) and restore it when necessary (e.g., for data transfer).

A client device may store encrypted client device contexts provided by an IoTF-C for fast UL data transfer/fast control plane message transfer. The client device may enter a sleep mode immediately after transmitting one or more data packet(s). Since there may be no message exchange overhead for an IoTF-U to reconstruct a client device context, no delay may be experienced for transmission of small data packets. In an aspect of the present disclosure, no control plane message may be used for user plane data transmission when the client device is in the idle mode.

Tracking Area Update

A client device may perform a tracking area update (TAU) procedure when the client device enters into a new tracking area during the idle mode. The TAU message may include the current tracking area id (TAI) and the GIOTFI or equivalent (e.g., a globally unique mobile management entity identifier (GUMMEI)) of the source IoTF-C. The target IoTF-C may update the location of the client device and the mobility anchor (e.g., IoTF-U ID) to one or more network entities (e.g., a P-GW) along with an encrypted network reachability context. In an aspect of the present disclosure, the encrypted network reachability context may enable the IoTF-U to verify the downlink packet. In an aspect of the present disclosure, an application server (e.g., an IoT server) and/or a P-GW may transmit a downlink (DL) packet with the encrypted network reachability context to the IoTF-U/C (identified by the GIOTFI).

Figure 16:
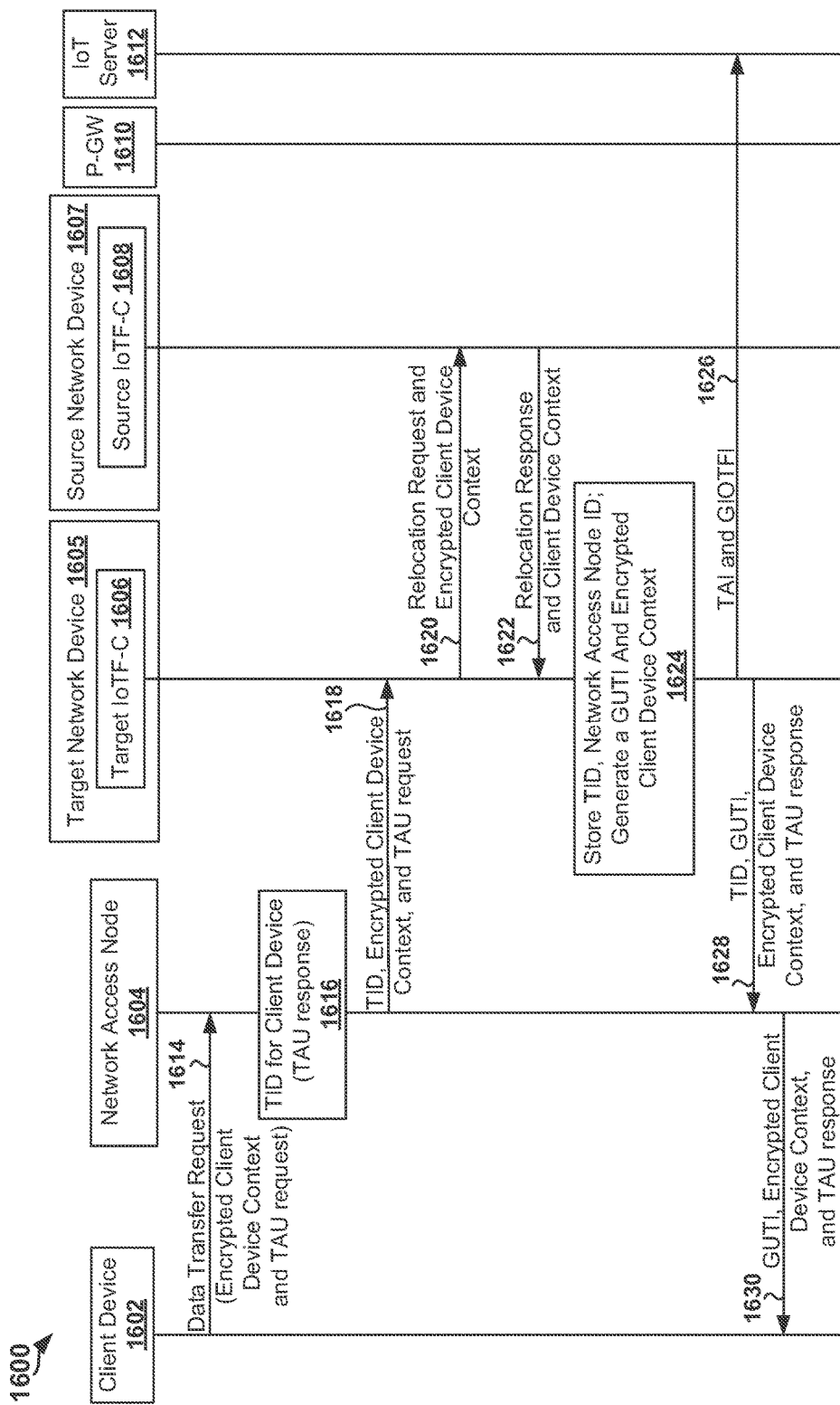
FIG. 16 is a signal flow diagram of a tracking area update (TAU) procedure in an IoT network architecture in accordance with various aspects of the present disclosure.

FIG. 16 is a signal flow diagram 1600 of a TAU procedure in an IoT network architecture (e.g., IoT network architecture 100) in accordance with various aspects of the present disclosure. As shown in FIG. 16, the signal flow diagram 1600 includes a client device 1602 (also referred to as an IoT device), a network access node 1604 (e.g., eNB, base station, network access point), a target IoTF-C 1606 implemented at a target network device 1605, a source IoTF-C 1608 implemented at a source network device 1607, a P-GW 1610, and an IoT server 1612 (also referred to as an application server). The client device 1602 may transmit a data transfer request message 1614 that includes an encrypted client device context (e.g., a control plane (CP) encrypted client context) and a TAU request to the network access node 1604. In an aspect of the present disclosure, the data transfer request message 1614 may be sent by the client device 1602 without establishing an RRC connection.

The network access node 1604 may determine 1616 the target IoTF-C identifier included in the TAU request. The network access node 1604 may then determine the IP address of the target IoTF-C 1606, and may transmit a message 1618 including the TID associated with the client device 1602, the encrypted client device context, and the TAU request to the target IoTF-C 1606. The target IoTF-C 1606 may transmit a message 1620 including a request for the client device context and the encrypted client device context to the source IoTF-C 1608.

The source IoTF-C 1608 may transmit a message 1622 including the client device context to the target IoTF-C 1606. The target IoTF-C 1606 may store 1624 the TID for client device and an ID for the network access node 1604, and may generate 1624 a new GUTI and a new encrypted client device context for the client device 1602 based on the received client device context. In an aspect of the present disclosure, the target IoTF-C 1606 may generate user plane (UP) keys and context generation keys and may provide the keys to an IoTF-U.

The target IoTF-C 1606 may transmit a message 1626 including the tracking area ID (TAI) and the ID of the target IoTF-C 1606 (e.g., GIOTFI) to the IoT server 1612 (or P-GW 1610). The target IoTF-C 1606 may transmit a message 1628 including the TID, the new GUTI, the new encrypted client device context, and the TAU response to the client device 1602. The network access node 1604 may forward the new GUTI, the new encrypted client device context, and the TAU response to the client device 1602 in a message 1630 based on the TID.

The aspects disclosed herein provide an architecture with new dedicated network functions that enable independent deployment and that avoid scalability/inter-working requirements. The aspects disclosed herein may enable a network access node (e.g., a base station) to transfer data to or from client devices without storing or maintaining security contexts for the client devices, thereby avoiding consumption of a substantial amount of resources at the network access node (or other network entity). Security features may be anchored at a new network function (referred to as the IoT Function (IoTF)). Dedicated resources are allocated for IoT data transfer in order to avoid affecting normal client devices' PDN connection/traffic. An encrypted UE context may be used for data transfer to eliminate the UE's semi-persistent context at the IoTF when the UE is in the idle state. The MME/S-GW should not maintain large states (i.e., contexts) of IoT devices that do not transmit traffic frequently. IoT devices may only require cost-effective data delivery without exhausting expensive core network resources.

Encrypted Client Device Context Usage Information

In accordance with the various aspects of the present disclosure, a client device (e.g., client device 702 in FIG. 7)

may transmit usage information associated with an encrypted client device context (also referred to as encrypted client device context usage information) when the client device transmits an encrypted client device context to the network.

In one aspect, the encrypted client device context usage information may indicate an amount of data to be transmitted from the client device. For example, the amount of data may be indicated as a reduced data transmission (e.g., a transmission that includes a single data packet) or a burst data transmission (e.g., one or more transmissions that include several data packets). In an aspect, the amount of data to be transmitted from the client device may be indicated using a single bit (e.g., as part of an information element (IE) in a header of a packet). In such aspect, for example, the client device may enable the bit (e.g., set the bit to '1') to indicate that the amount of data to be transmitted from the client device is a reduced data transmission or may disable the bit (e.g., set the bit to '0') to indicate that the amount of data to be transmitted from the client device is a burst data transmission.

In one aspect, when the client device indicates that the amount of data to be transmitted is a reduced data transmission, the network (e.g., a network node, such as the network node 707, 709, and/or a network access node, such as the network access node 704) may remove the context for the client device immediately after the reduced data transmission is received from the client device. In another aspect, when the client device indicates that the amount of data to be transmitted is a reduced data transmission, the network may maintain the context for the client device for a first threshold period of time. For example, the network may implement a first timer configured to measure the first threshold period of time. In this aspect, the network may remove the context for the client device upon expiration of the first timer. In one aspect, if the network receives a data transmission (e.g., a packet) from the client device before expiration of the first timer, the network may reset the first timer and may maintain the context for the client device until the first timer expires.

In another aspect, when the client device indicates that the amount of data to be transmitted is a burst data transmission, the network may maintain the context for the client device for a second threshold period of time. For example, the network may implement a second timer configured to measure the second threshold period of time. In this aspect, the network may remove the context for the client device upon expiration of the second timer. In one aspect, if the network receives a data transmission (e.g., a packet) from the client device before expiration of the second timer, the network may reset the second timer and may maintain the context for the client device until the second timer expires. For example, the second threshold period of time may be greater than the first threshold period of time.

In one aspect, the encrypted client device context usage information may be included in a header of a packet transmitted to the network. In another aspect, the client device may provide the encrypted client device context usage information to the network during an RRC signaling procedure.

In one aspect, the network (e.g., the network node 605 in FIG. 6) may provide multiple types of encrypted client device contexts to a client device (e.g., the client device 602 in FIG. 6). In such aspect, each type of encrypted client device context may be used by the network (e.g., the network node 907 in FIG. 9) to reconstruct a portion of a context for the client device (e.g., a subset of a context for the client device). For example, a first type of encrypted client device context may be associated with a first service (e.g., a mobile broadband service) provided by the network, where the first type of encrypted client device context enables the network to reconstruct a first portion of the client device context that is needed to support the first service. In such example, a second type of encrypted client device context may be associated with a second service (e.g., ultra-reliable low-latency communications (URLLC)) provided by the network, where the second type of encrypted client device context enables the network to reconstruct a second portion of the client device context that is needed to support the second service. In an aspect, the first portion of the client device context and the second portion of the client device context may include less context information than the client device context originally generated by the network for the client device.

In an aspect, the client device may determine one or more of the multiple types of encrypted client device contexts to use based on the type of transmission to be sent to (or received from) the network. For example, and with reference to the examples provided above, if the client device is to transmit data associated with a mobile broadband service, the client device may transmit the first type of encrypted client device context to the network. As another example, if the client device is to transmit data associated with a URLLC service, the client device may transmit the second type of encrypted client device context to the network. It should be understood that other types of services may be provided by the network in addition to or instead of the examples provided above, such as a high priority access service, a delay tolerant access service, or a machine type communications (MTC) service.

In accordance with the various aspects of the present disclosure, a client device may indicate the type of the encrypted client device context in the previously described usage information when the client device transmits an encrypted client device context to the network. In one aspect, the encrypted client device context usage information may indicate the type of information being transmitted from the client device. For example, the encrypted client device context usage information may indicate that the information being transmitted from the client device is associated with the user plane (e.g., data) or the control plane (e.g., control information). It can be appreciated that since each of the different types of encrypted client device contexts previously discussed may be used by the network to reconstruct a portion of a context for the client device (e.g., a subset of a context for the client device), such different types of encrypted client device contexts may be reduced in size as compared to an encrypted client device context that enables reconstruction of the entire (e.g., full) client device context.

In an aspect, the context (or portion of a context) to be reconstructed by the network (e.g., at the network node 907 in FIG. 9) for a type of service provided by the network (e.g., at the IoT server 912 in FIG. 9) may be associated with a value (e.g., an index number or other value). In such aspect, the client device (e.g., the client device 902 in FIG. 9) may transmit the index number along with the encrypted client device context to facilitate reconstruction of a context at the network for a particular service (or other specific use or application). For example, an index number "1" may indicate a particular quality of service (QoS) for a mobile broadband service and the information needed to reconstruct a context for supporting that QoS. In such example, the client device may transmit an encrypted client device context associated with a mobile broadband service and the index number "1" to facilitate reconstruction of a portion of the client device context that supports the mobile broadband service.

Multiple User Plane Network Functions

In one aspect of the present disclosure, a network may include, among other things, a client device, a network access node (e.g., eNB, base station, network access point), and a network entity (e.g., a serving gateway (S-GW), a packet data network gateway (P-GW)). In such aspect, the network access node may implement a first user plane network function and the network entity may implement a second user plane network function. Accordingly, the network access node may obtain and transmit a first user plane encrypted client device context to the client device and the network entity may obtain and transmit a second user plane encrypted client device context to the client device. In an aspect, the first user plane encrypted client device context may enable the first user plane network function to reconstruct a first context (e.g., a first security context) for the client device for processing (e.g., for verifying and/or decrypting user data packets) of user data traffic for the client device, and the second user plane encrypted client device context may enable the second user plane network function to reconstruct a second context (e.g., a second security context) for the client device for processing (e.g., for verifying and/or decrypting user data packets) of user data traffic for the client device. In one aspect, the client device may transmit multiple encrypted client device contexts to the network along with UL data traffic. For example, the client device may transmit both the first user plane encrypted client device context and the second user plane encrypted client device context along with UL data traffic. In one aspect, the first and second user plane encrypted client device contexts may be transmitted simultaneously (e.g., in the same packet transmitted from the client device). Therefore, it can be appreciated that in some aspects, the multiple encrypted client device contexts transmitted from the client device may enable reconstruction of independent client device contexts that are associated with different entities (e.g., network access node, S-GW) in the network.

Exemplary Apparatus (e.g., Client Device) and Method Thereon

Figure 17:
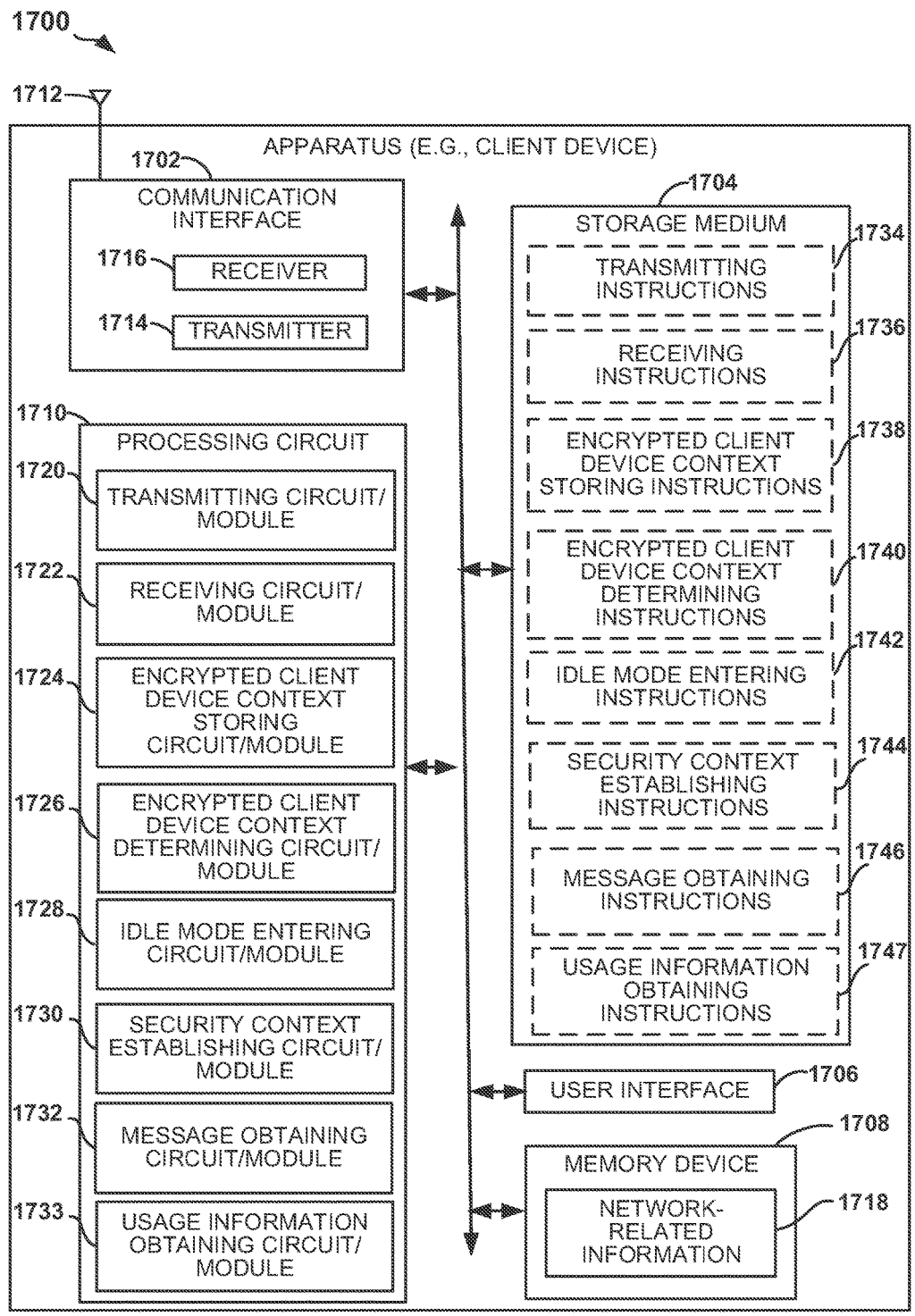
FIG. 17 is an illustration of an apparatus configured to support operations related to communication in an IoT network architecture in accordance with various aspects of the present disclosure.

FIG. 17 is an illustration of an apparatus 1700 configured to communicate with a network based on an IoT network architecture according to one or more aspects of the disclosure (e.g., aspects related to the methods of FIGS. 18-20 described below). The apparatus 1700 includes a communication interface (e.g., at least one transceiver) 1702, a storage medium 1704, a user interface 1706, a memory device 1708, and a processing circuit 1710.

These components can be coupled to and/or placed in electrical communication with one another via a signaling bus or other suitable component, represented generally by the connection lines in FIG. 17. The signaling bus may include any number of interconnecting buses and bridges depending on the specific application of the processing circuit 1710 and the overall design constraints. The signaling bus links together various circuits such that each of the communication interface 1702, the storage medium 1704, the user interface 1706, and the memory device 1708 are coupled to and/or in electrical communication with the processing circuit 1710. The signaling bus may also link various other circuits (not shown) such as timing sources, peripherals, voltage regulators, and power management circuits, which are well known in the art, and therefore, will not be described any further.

The communication interface 1702 may be adapted to facilitate wireless communication of the apparatus 1700. For example, the communication interface 1702 may include circuitry and/or code (e.g., instructions) adapted to facilitate the communication of information bi-directionally with respect to one or more communication devices in a network. The communication interface 1702 may be coupled to one or more antennas 1712 for wireless communication within a wireless communication system. The communication interface 1702 can be configured with one or more standalone receivers and/or transmitters, as well as one or more transceivers. In the illustrated example, the communication interface 1702 includes a transmitter 1714 and a receiver 1716.

The memory device 1708 may represent one or more memory devices. As indicated, the memory device 1708 may maintain network-related information/along with other information used by the apparatus 1700. In some implementations, the memory device 1708 and the storage medium 1704 are implemented as a common memory component. The memory device 1708 may also be used for storing data that is manipulated by the processing circuit 1710 or some other component of the apparatus 1700.

The storage medium 1704 may represent one or more computer-readable, machine-readable, and/or processor-readable devices for storing code, such as processor executable code or instructions (e.g., software, firmware), electronic data, databases, or other digital information. The storage medium 1704 may also be used for storing data that is manipulated by the processing circuit 1710 when executing code. The storage medium 1704 may be any available media that can be accessed by a general purpose or special purpose processor, including portable or fixed storage devices, optical storage devices, and various other mediums capable of storing, containing or carrying code.

By way of example and not limitation, the storage medium 1704 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing code that may be accessed and read by a computer. The storage medium 1704 may be embodied in an article of manufacture (e.g., a computer program product). By way of example, a computer program product may include a computer-readable medium in packaging materials. In view of the above, in some implementations, the storage medium 1704 may be a non-transitory (e.g., tangible) storage medium.

The storage medium 1704 may be coupled to the processing circuit 1710 such that the processing circuit 1710 can read information from, and write information to, the storage medium 1704. That is, the storage medium 1704 can be coupled to the processing circuit 1710 so that the storage medium 1704 is at least accessible by the processing circuit 1710, including examples where at least one storage medium is integral to the processing circuit 1710 and/or examples where at least one storage medium is separate from the processing circuit 1710 (e.g., resident in the apparatus 1700, external to the apparatus 1700, distributed across multiple entities, etc.).

Code and/or instructions stored by the storage medium 1704, when executed by the processing circuit 1710, causes the processing circuit 1710 to perform one or more of the various functions and/or process operations described herein. For example, the storage medium 1704 may include operations configured for regulating operations at one or more hardware blocks of the processing circuit 1710, as well as to utilize the communication interface 1702 for wireless communication utilizing their respective communication protocols.

The processing circuit 1710 is generally adapted for processing, including the execution of such code/instructions stored on the storage medium 1704. As used herein, the term "code" or "instructions" shall be construed broadly to include without limitation programming, instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1710 is arranged to obtain, process and/or send data, control data access and storage, issue commands, and control other desired operations. The processing circuit 1710 may include circuitry configured to implement desired code provided by appropriate media in at least one example. For example, the processing circuit 1710 may be implemented as one or more processors, one or more controllers, and/or other structure configured to execute executable code. Examples of the processing circuit 1710 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1710 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1710 are for illustration and other suitable configurations within the scope of the disclosure are also contemplated.

According to one or more aspects of the disclosure, the processing circuit 1710 may be adapted to perform any or all of the features, processes, functions, operations and/or routines for any or all of the apparatuses described herein. As used herein, the term "adapted" in relation to the processing circuit 1710 may refer to the processing circuit 1710 being one or more of configured, employed, implemented, and/or programmed to perform a particular process, function, operation and/or routine according to various features described herein.

Figure 18A:
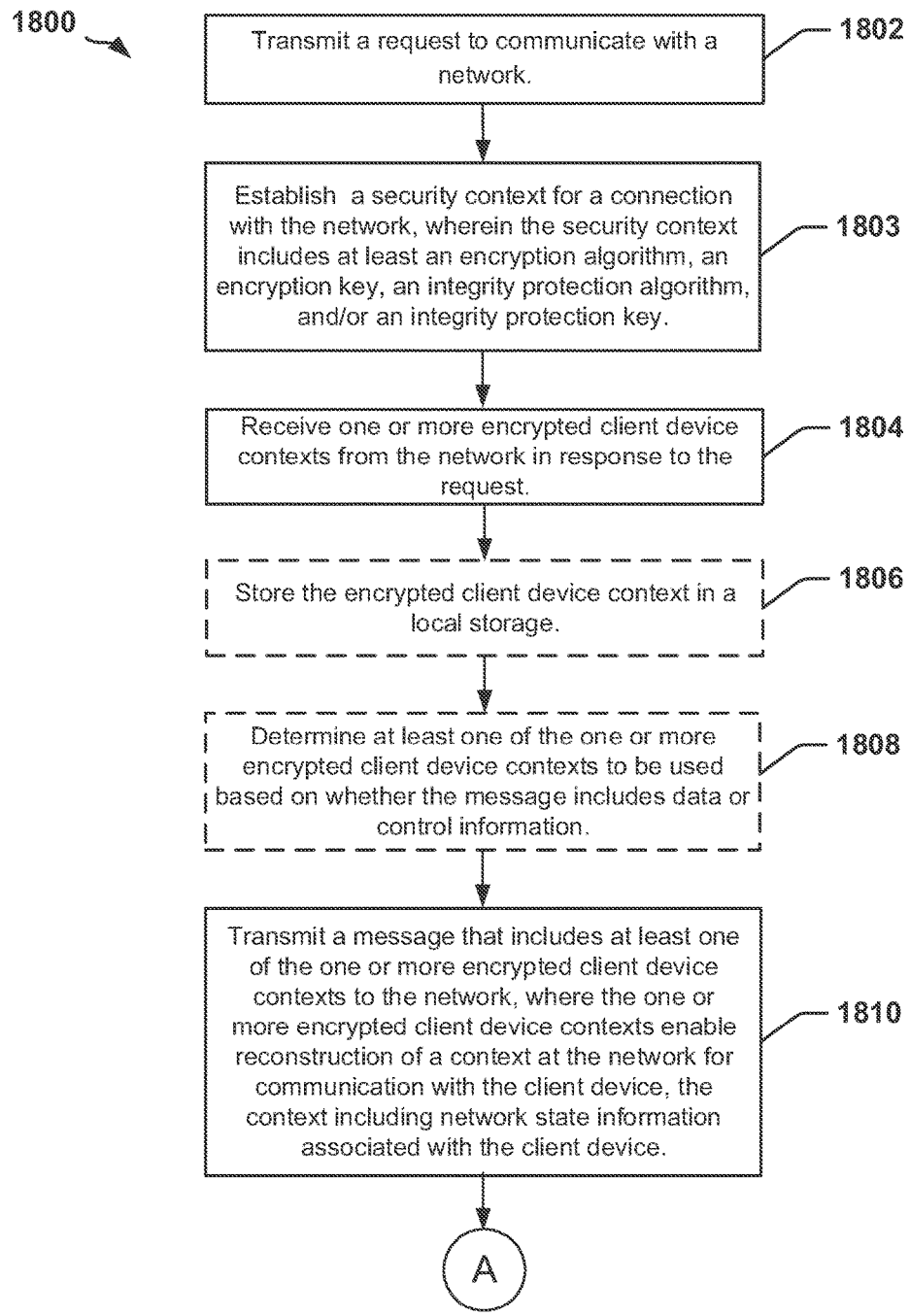
FIG. 18 (including FIGS. 18A and 18B) illustrates a method for communicating in an IoT network architecture in accordance with various aspects of the present disclosure.
Figure 18B:
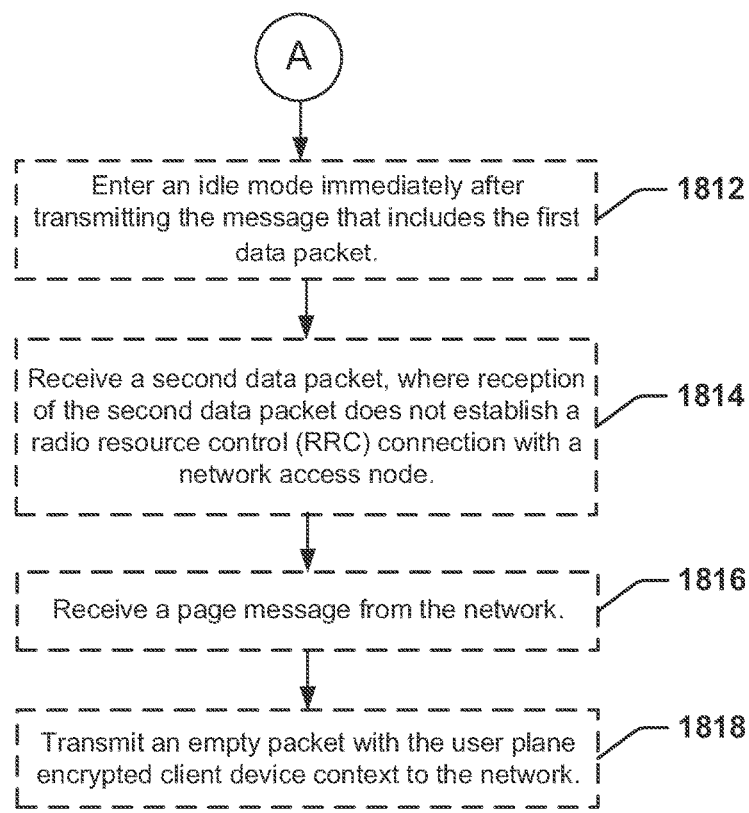
Figure 19:
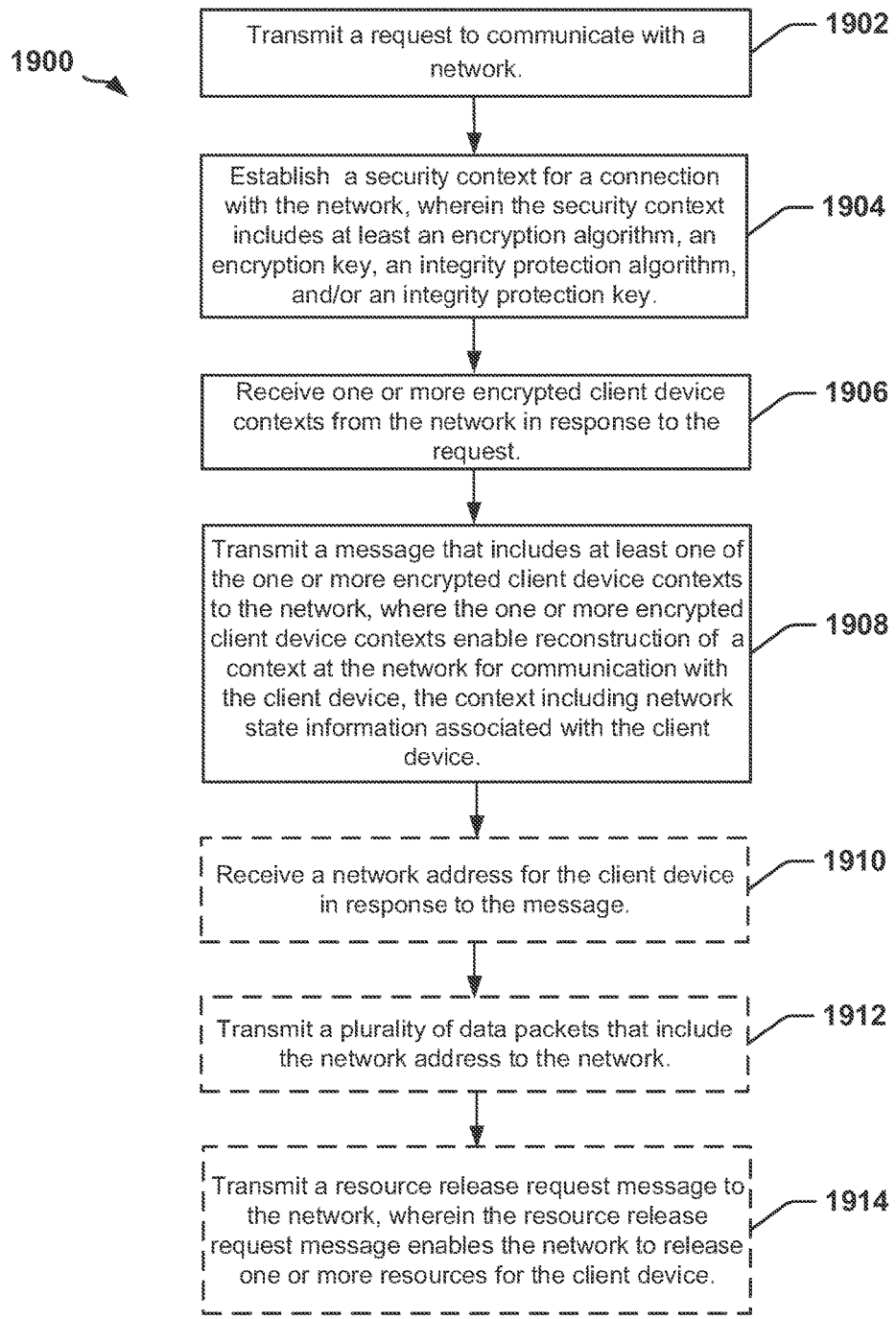
FIG. 19 illustrates a method for communicating with a network in accordance with various aspects of the disclosure.
Figure 20:
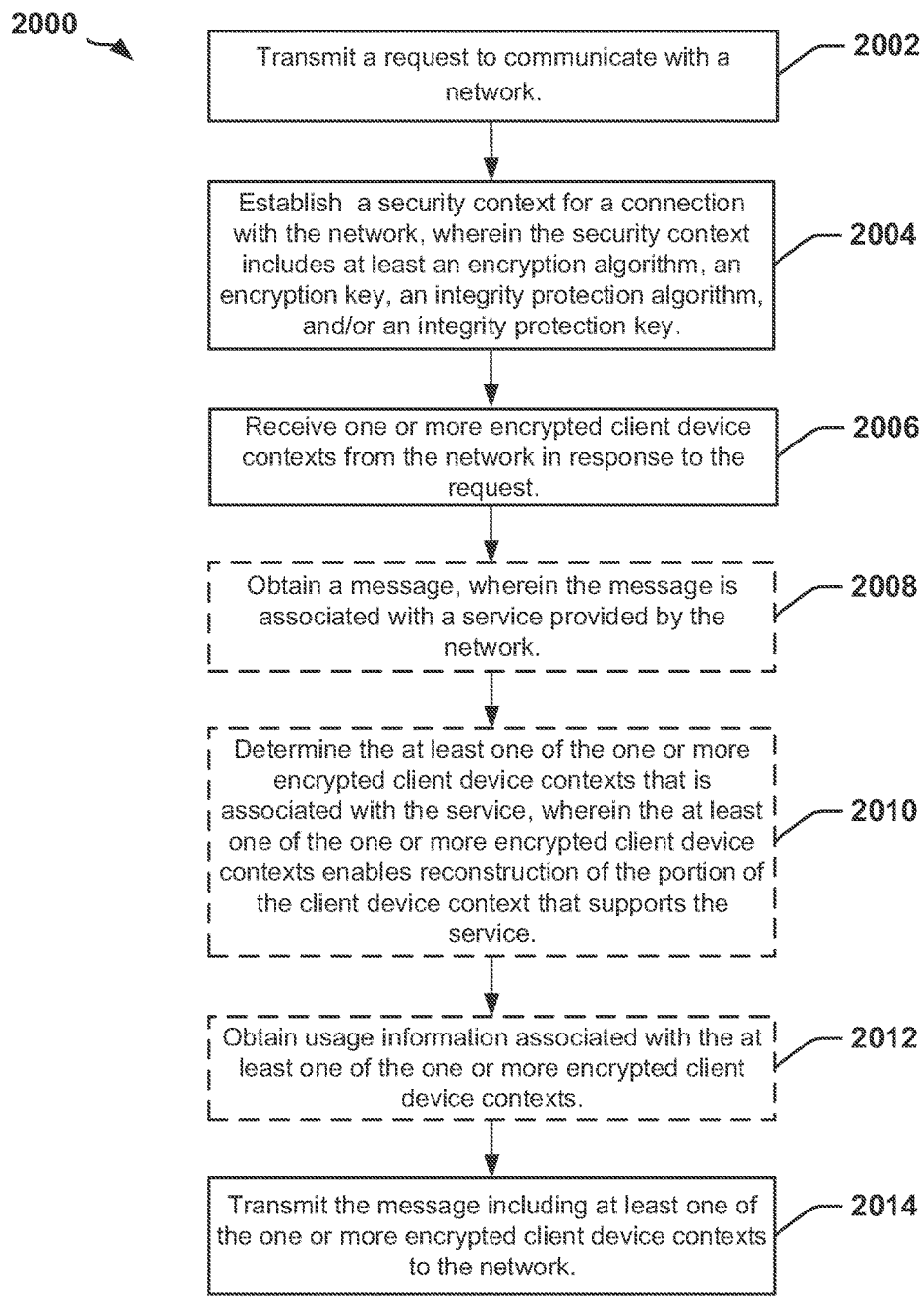
FIG. 20 illustrates a method for communicating with a network in accordance with various aspects of the disclosure.

According to at least one example of the apparatus 1700, the processing circuit 1710 may include one or more of a transmitting circuit/module 1720, a receiving circuit/module 1722, an encrypted client device context storing circuit/module 1724, an encrypted client device context determining circuit/module 1726, an idle mode entering circuit/module 1728, a security context establishing circuit/module 1730, a message obtaining circuit/module 1732, and a usage information obtaining circuit/module 1733 that are adapted to perform any or all of the features, processes, functions, operations and/or routines described herein (e.g., features, processes, functions, operations and/or routines described with respect to FIGS. 18-20).

The transmitting circuit/module 1720 may include circuitry and/or instructions (e.g., transmitting instructions 1734 stored on the storage medium 1704) adapted to perform several functions relating to, for example, transmitting a request to communicate with a network, transmitting a message that includes at least one of the one or more encrypted client device contexts to the network, transmitting an empty packet with the UP encrypted client device context to the network, transmitting a plurality of data packets that include a network address to the network, and transmitting a resource release request message to the network, wherein the resource release request message enables the network to release one or more resources for the client device.

The receiving circuit/module 1722 may include circuitry and/or instructions (e.g., receiving instructions 1736 stored on the storage medium 1704) adapted to perform several functions relating to, for example, receiving one or more encrypted client device contexts from the network in response to the request, receiving a second data packet, wherein receiving the second data packet does not establish a radio resource control (RRC) connection with a network access node, receiving a page message from the network, and receiving a network address for the client device in response to the message.

The encrypted client device context storing circuit/module 1724 may include circuitry and/or instructions (e.g., encrypted client device context storing instructions 1738 stored on the storage medium 1704) adapted to perform several functions relating to, for example, storing the one or more encrypted client device contexts in a local storage.

The encrypted client device context determining circuit/module 1726 may include circuitry and/or instructions (e.g., encrypted client device context determining instructions 1740 stored on the storage medium 1704) adapted to perform several functions relating to, for example, determining at least one of the one or more encrypted client device contexts to be used based on whether the communication comprises data or control information, and determining the at least one of the one or more encrypted client device contexts that is associated with a service, wherein the at least one of the one or more encrypted client device contexts enables reconstruction of the portion of the client device context that supports the service.

The idle mode entering circuit/module 1728 may include circuitry and/or instructions (e.g., idle mode entering instructions 1742 stored on the storage medium 1704) adapted to perform several functions relating to, for example, entering an idle mode immediately after transmitting the message that includes the first data packet.

The security context establishing circuit/module 1730 may include circuitry and/or instructions (e.g., security context establishing instructions 1744 stored on the storage medium 1704) adapted to perform several functions relating to, for example, establishing a security context for a connection with the network, wherein the security context includes at least an encryption algorithm, an encryption key, an integrity protection algorithm, an integrity protection key, or combinations thereof.

The message obtaining circuit/module 1732 may include circuitry and/or instructions (e.g., message obtaining instructions 1746 stored on the storage medium 1704) adapted to perform several functions relating to, for example, obtaining a message, wherein the message is associated with a service provided by the network.

The usage information obtaining circuit/module 1733 may include circuitry and/or instructions (e.g., usage information obtaining instructions 1747 stored on the storage medium 1704) adapted to perform several functions relating to, for example, obtaining usage information associated with the at least one of the one or more encrypted client device contexts.

As mentioned above, instructions stored by the storage medium 1704, when executed by the processing circuit 1710, causes the processing circuit 1710 to perform one or more of the various functions and/or process operations described herein. For example, the storage medium 1704 may include one or more of the transmitting instructions 1734, receiving instructions 1736, encrypted client device context storing instructions 1738, encrypted client device context determining instructions 1740, idle mode entering instructions 1742, security context establishing instructions 1744, message obtaining instructions 1746, and usage information obtaining instructions 1747.

FIG. 18 (including FIGS. 18A and 18B) is a flowchart 1800 illustrating a method for communicating with a network in accordance with various aspects of the disclosure. The method may be performed by an apparatus such as a client device (e.g., the client device 102, 502 or the apparatus 1700). It should be understood that the operations indicated by dashed lines in FIG. 18 represent optional operations.

The client device transmits a request to communicate with a network 1802. In one example, the request may be the request 612 previously described with respect to FIG. 6. In an aspect, the request may include an indication that the client device is requesting an encrypted client device context and/or an indication of a service that the client device is requesting. The client device establishes a security context for a connection with the network, wherein the security context includes at least an encryption algorithm, an encryption key, an integrity protection algorithm, and/or an integrity protection key 1803. In an aspect, the encryption key is a user plane encryption key and the integrity protection key is a user plane integrity protection key, the user plane encryption key and the user plane integrity protection key are maintained at the client device, and the first data packet is at least integrity protected with the user plane integrity protection key or encrypted with the user plane encryption key.

The client device receives one or more encrypted client device contexts from the network in response to the request 1804. In one example, the one or more encrypted client device contexts may be the encrypted client device context in the RRC connection reconfiguration message 626 received by the client device 602 in FIG. 6. In one aspect, the encrypted client device context may be received from the network as a result of a successful authentication with the network. In such aspect, the successful authentication with the network does not establish an access stratum (AS) security context. For example, the one or more encrypted client device contexts may include at least one of a security context, a quality of service (QoS) for a bearer, and/or a tunnel endpoint identifier (TEID). In an aspect, the one or more encrypted client device contexts may include a first context to be used for data related communication with the client device and a second context to be used for control related communication with the client device. In an aspect, the one or more encrypted client device contexts may not be decrypted at the client device. In such aspect, the one or more encrypted client device contexts may be decrypted only by a network device that generated the one or more encrypted client device contexts.

The client device stores the one or more encrypted client device contexts in a local storage 1806. The client device determines at least one of the one or more encrypted client device contexts to be used based on whether a message (e.g., packet) to be transmitted from the client device includes data or control information 1808. For example, the one or more encrypted client device contexts may include a user plane (UP) encrypted client device context and a control plane (CP) encrypted client device context. In such example, the client device may transmit a first data packet with the UP encrypted client device context, or a control packet with the CP encrypted client device context. For example, the control packet may be a tracking area update (TAU) packet.

The client device transmits a message that includes at least one of the one or more encrypted client device contexts to the network 1810. In one example, the message may be the data transfer request message 810 that includes an encrypted client device context and a data packet transmitted by the client device 802 to the network access node 804 in FIG. 8. In an aspect, the one or more encrypted client device contexts enable reconstruction of a context at the network for communication with the client device, the context including network state information associated with the client device. In an aspect, the context is removed (e.g., deleted or no longer not maintained) at the network. In an aspect, the client device may transmit the message including the first data packet without establishing a radio resource control (RRC) connection with a network access node of the network. The client device enters an idle mode immediately after transmitting the message that includes the first data packet 1812.

The client device receives a second data packet, wherein receiving the second data packet does not establish an RRC connection with a network access node 1814. In one example, the second data packet may be the data packet in the fifth message 824 transmitted to the client device 802 from the network access node 804 in FIG. 8. In an aspect, the encryption key is a user plane encryption key and the integrity protection key is a user plane integrity protection key, where the user plane encryption key and the user plane integrity protection key are maintained at the client device. In such aspect, when receiving the second data packet, the client device verifies the second data packet with the user plane integrity protection key and/or decrypts the second data packet with the user plane encryption key. The client device receives a page message from the network 1816. The client device transmits an empty packet with the UP encrypted client device context to the network 1818.

FIG. 19 is a flowchart 1900 illustrating a method for communicating with a network in accordance with various aspects of the disclosure. The method may be performed by an apparatus such as a client device (e.g., the client device 102, 502 or the apparatus 1700). It should be understood that the operations indicated by dashed lines in FIG. 19 represent optional operations.

The client device transmits a request to communicate with a network 1902. In one example, the request may be the request 612 previously described with respect to FIG. 6. In an aspect, the request may include an indication that the client device is requesting an encrypted client device context and/or an indication of a service that the client device is requesting. The client device establishes a security context for a connection with the network, wherein the security context includes at least an encryption algorithm, an encryption key, an integrity protection algorithm, and/or an integrity protection key 1904. In an aspect, the encryption key is a user plane encryption key and the integrity protection key is a user plane integrity protection key, the user plane encryption key and the user plane integrity protection key are maintained at the client device, and the first data packet is at least integrity protected with the user plane integrity protection key or encrypted with the user plane encryption key.

The client device receives one or more encrypted client device contexts from the network in response to the request 1906. In one example, the one or more encrypted client device contexts may be the encrypted client device context in the RRC connection reconfiguration message 626 received by the client device 602 in FIG. 6. In one aspect, the encrypted client device context may be received from the network as a result of a successful authentication with the network. In such aspect, the successful authentication with the network does not establish an access stratum (AS) security context. For example, the one or more encrypted client device contexts may include at least one of a security context, a quality of service (QoS) for a bearer, and/or a tunnel endpoint identifier (TEID). In an aspect, the one or more encrypted client device contexts may include a first context to be used for data related communication with the client device and a second context to be used for control related communication with the client device. In an aspect, the one or more encrypted client device contexts may not be decrypted at the client device. In such aspect, the one or more encrypted client device contexts may be decrypted only by a network device that generated the one or more encrypted client device contexts. In an aspect, the context is removed at the network after the client device receives the one or more encrypted client device contexts from the network. The client device transmits a message that includes at least one of the one or more encrypted client device contexts to the network 1908. In an aspect, the one or more encrypted client device contexts enable reconstruction of a context at the network for communication with the client device, the context including network state information associated with the client device. In an aspect, the message further includes a resource establishment request and at least one of the one or more encrypted client device contexts. For example, the message may be the resource establishment request message 1016. The client device receives a network address for the client device in response to the message 1910. The client device transmits a plurality of data packets that include the network address to the network 1912. The client device transmits a resource release request message to the network, wherein the resource release request message enables the network to release one or more resources for the client device 1914.

FIG. 20 is a flowchart 2000 illustrating a method for communicating with a network in accordance with various aspects of the disclosure. The method may be performed by an apparatus such as a client device (e.g., the client device 102, 502 or the apparatus 1700). It should be understood that the operations indicated by dashed lines in FIG. 20 represent optional operations.

In an aspect, a method for a client device is provided. The client device transmits a request to communicate with a network 2002. The client device establishes a security context for a connection with the network, wherein the security context includes at least an encryption algorithm, an encryption key, an integrity protection algorithm, an integrity protection key, or combinations thereof 2004. The client device receives one or more encrypted client device contexts from the network in response to the request 2006.

The client device obtains a message, wherein the message is associated with a service provided by the network 2008. In an aspect, each of the one or more encrypted client device contexts are associated with one of a plurality of services provided by the network. In such aspect, the client device determines the at least one of the one or more encrypted client device contexts that is associated with the service, wherein the at least one of the one or more encrypted client device contexts enables reconstruction of the portion of the client device context that supports the service 2010. For example, the plurality of services may include a mobile broadband service, an ultra-reliable low-latency communications (URLLC) service, a high priority access service, a delay tolerant access service, and/or a machine type communications (MTC) service.

The client device obtains usage information associated with the at least one of the one or more encrypted client device contexts 2012. In an aspect, the usage information associated with the at least one of the one or more encrypted client device contexts indicates whether the transmission of the message is a reduced data transmission or a burst data transmission. In an aspect, the usage information may include a value (e.g., an index number or other value) associated with the context (or portion of a context) to be reconstructed by the network for a type of service provided by the network.

The client device transmits a message that includes at least one of the one or more encrypted client device contexts to the network 2014. In an aspect, the message includes the usage information. In an aspect, the one or more encrypted client device contexts enable reconstruction of at least a portion of a context at the network for communication with the client device, the context including network state information associated with the client device. In an aspect, the portion of the context is maintained at the network for a time period that is determined based on whether the transmission of the message is the reduced data transmission or the burst data transmission. In an aspect, the one or more encrypted client device contexts include a first user plane encrypted client device context that enables reconstruction of a first context for the client device at a first entity in the network, and a second user plane encrypted client device context that enables reconstruction of a second context for the client device at a second entity in the network. In such aspect, the message includes at least the first user plane encrypted client device context and the second user plane encrypted client device context.

Exemplary Apparatus (e.g., Network Device) and Method Thereon

Figure 21:
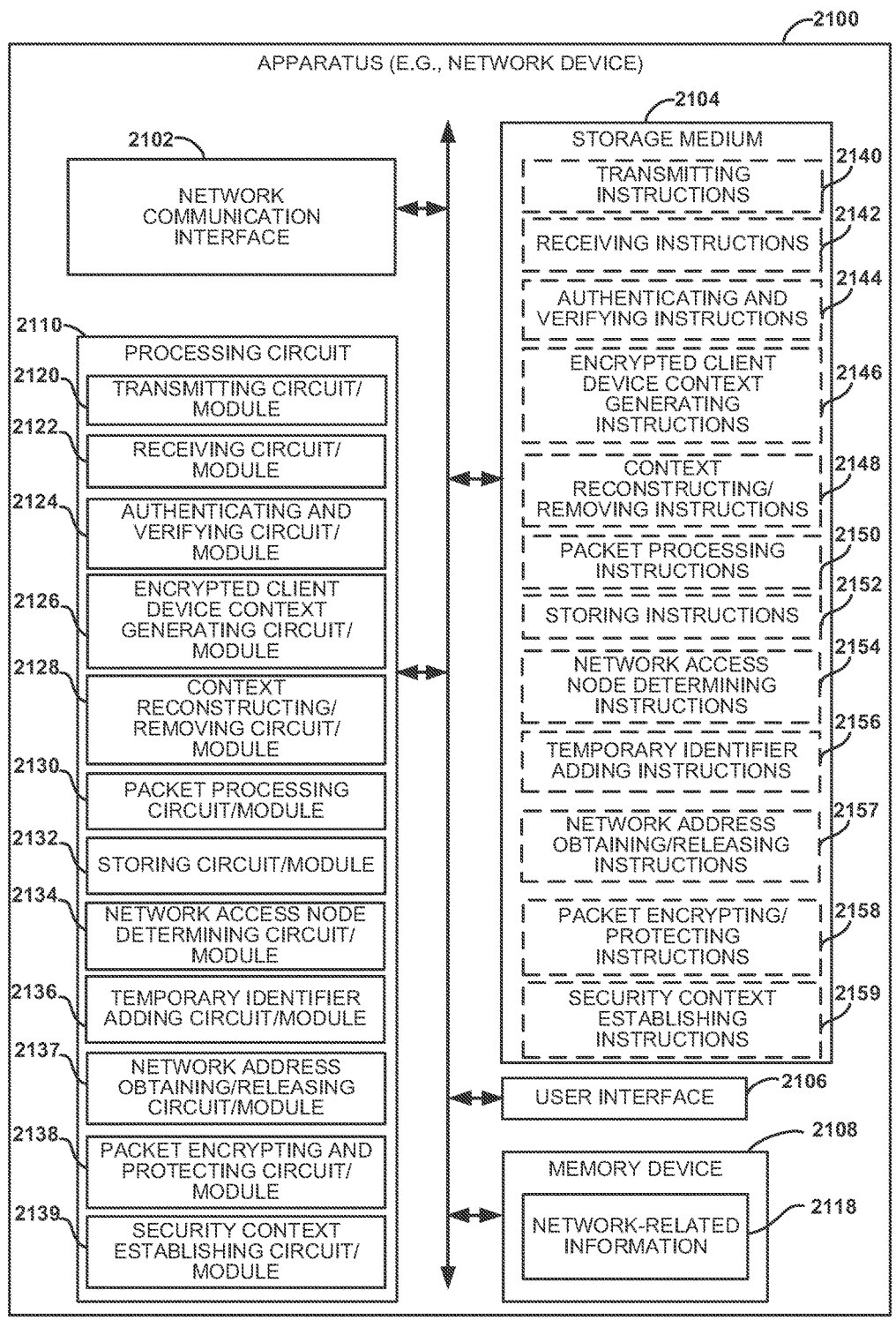
FIG. 21 is an illustration of an apparatus configured to support operations related to communication in an IoT network architecture in accordance with various aspects of the present disclosure.

FIG. 21 is an illustration of an apparatus 2100 according to one or more aspects of the disclosure (e.g., aspects related to the methods of FIGS. 22-26 described below). The apparatus 2100 includes a network communication interface (e.g., at least one transceiver) 2102, a storage medium 2104, a user interface 2106, a memory device 2108, and a processing circuit 2110. In an aspect, the apparatus 2100 may be a network device (e.g., network device 105, 505, 705) that implements an Internet of Things (IoT) Function. For example, the apparatus 2100 may implement a control plane IoT Function (e.g., IoTF-C 106, 506, 606, 706, 906, 1406) and/or a user plane IoT Function (e.g., IoTF-U 108, 508, 608, 708, 806, 908). It should be understood that such network device may be implemented as a single network entity or as multiple network entities.

These components can be coupled to and/or placed in electrical communication with one another via a signaling bus or other suitable component, represented generally by the connection lines in FIG. 21. The signaling bus may include any number of interconnecting buses and bridges depending on the specific application of the processing circuit 2110 and the overall design constraints. The signaling bus links together various circuits such that each of the network communication interface 2102, the storage medium 2104, the user interface 2106, and the memory device 2108 are coupled to and/or in electrical communication with the processing circuit 2110. The signaling bus may also link various other circuits (not shown) such as timing sources, peripherals, voltage regulators, and power management circuits, which are well known in the art, and therefore, will not be described any further.

The network communication interface 2102 may be adapted to facilitate communication of the apparatus 2100. For example, the network communication interface 2102 may include circuitry and/or code (e.g., instructions) adapted to facilitate the communication of information bi-directionally with respect to one or more network entities in a network. The network communication interface 2102 can be configured with one or more standalone receivers and/or transmitters, as well as one or more transceivers.

The memory device 2108 may represent one or more memory devices. As indicated, the memory device 2108 may maintain network-related information/along with other information used by the apparatus 2100. In some implementations, the memory device 2108 and the storage medium 2104 are implemented as a common memory component. The memory device 2108 may also be used for storing data that is manipulated by the processing circuit 2110 or some other component of the apparatus 2100.

The storage medium 2104 may represent one or more computer-readable, machine-readable, and/or processor-readable devices for storing code, such as processor executable code or instructions (e.g., software, firmware), electronic data, databases, or other digital information. The storage medium 2104 may also be used for storing data that is manipulated by the processing circuit 2110 when executing code. The storage medium 2104 may be any available media that can be accessed by a general purpose or special purpose processor, including portable or fixed storage devices, optical storage devices, and various other mediums capable of storing, containing or carrying code.

By way of example and not limitation, the storage medium 2104 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing code that may be accessed and read by a computer. The storage medium 2104 may be embodied in an article of manufacture (e.g., a computer program product). By way of example, a computer program product may include a computer-readable medium in packaging materials. In view of the above, in some implementations, the storage medium 2104 may be a non-transitory (e.g., tangible) storage medium.

The storage medium 2104 may be coupled to the processing circuit 2110 such that the processing circuit 2110 can read information from, and write information to, the storage medium 2104. That is, the storage medium 2104 can be coupled to the processing circuit 2110 so that the storage medium 2104 is at least accessible by the processing circuit 2110, including examples where at least one storage medium is integral to the processing circuit 2110 and/or examples where at least one storage medium is separate from the processing circuit 2110 (e.g., resident in the apparatus 2100, external to the apparatus 2100, distributed across multiple entities, etc.).

Code and/or instructions stored by the storage medium 2104, when executed by the processing circuit 2110, causes the processing circuit 2110 to perform one or more of the various functions and/or process operations described herein. For example, the storage medium 2104 may include operations configured for regulating operations at one or more hardware blocks of the processing circuit 2110, as well as to utilize the network communication interface 2102 for network communication utilizing their respective communication protocols.

The processing circuit 2110 is generally adapted for processing, including the execution of such code/instructions stored on the storage medium 2104. As used herein, the term "code" or "instructions" shall be construed broadly to include without limitation programming, instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 2110 is arranged to obtain, process and/or send data, control data access and storage, issue commands, and control other desired operations. The processing circuit 2110 may include circuitry configured to implement desired code provided by appropriate media in at least one example. For example, the processing circuit 2110 may be implemented as one or more processors, one or more controllers, and/or other structure configured to execute executable code. Examples of the processing circuit 2110 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 2110 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 2110 are for illustration and other suitable configurations within the scope of the disclosure are also contemplated.

According to one or more aspects of the disclosure, the processing circuit 2110 may be adapted to perform any or all of the features, processes, functions, operations and/or routines for any or all of the apparatuses described herein. As used herein, the term "adapted" in relation to the processing circuit 2110 may refer to the processing circuit 2110 being one or more of configured, employed, implemented, and/or programmed to perform a particular process, function, operation and/or routine according to various features described herein.

According to at least one example of the apparatus 2100, the processing circuit 2110 may include one or more of a transmitting circuit/module 2120, receiving circuit/module 2122, authenticating and verifying circuit/module 2124, encrypted client device context generating circuit/module 2126, context reconstructing/removing circuit/module 2128, packet processing circuit/module 2130, storing circuit/module 2132, network access node determining circuit/module 2134, temporary identifier adding circuit/module 2136, a network address obtaining/releasing circuit/module 2137, a packet encrypting and protecting circuit/module 2138, and a security context establishing circuit/module 2139 that are adapted to perform any or all of the features, processes, functions, operations and/or routines described herein (e.g., features, processes, functions, operations and/or routines described with respect to FIGS. 22-26).

The transmitting circuit/module 2120 may include circuitry and/or instructions (e.g., transmitting instructions 2140 stored on the storage medium 2104) adapted to perform several functions relating to, for example, transmitting one or more encrypted client device contexts to the client device, transmitting a new encrypted client device context to a second client device, forwarding a payload portion of the control packet to an application server or packet data network gateway (P-GW), forwarding the control packet to the client device, forwarding the first data packet to the service network, forwarding the second data packet to the client device, and/or transmitting the network address to the client device.

The receiving circuit/module 2122 may include circuitry and/or instructions (e.g., receiving instructions 2142 stored on the storage medium 2104) adapted to perform several functions relating to, for example, receiving, from a client device, a request to communicate with a network, receiving a control packet and an encrypted client device context from the client device, receiving a first data packet and an encrypted client device context from the client device, receiving a second data packet from a server or a packet data network gateway (P-GW), receiving a control packet from a second client device, receiving the context for a second client device from a second network device, receiving a message that includes a resource establishment request and at least one of the one or more encrypted client device contexts from the client device, receiving a message from the client device, the message including at least one of the one or more encrypted client device contexts and usage information associated with the one or more encrypted client device contexts, and/or receiving a resource release request message from the client device.

The authenticating and verifying circuit/module 2124 may include circuitry and/or instructions (e.g., authenticating and verifying instructions 2144 stored on the storage medium 2104) adapted to perform several functions relating to, for example, requesting authentication information from a home subscriber server (HSS)/authentication, authorization, and accounting (AAA) server, performing mutual authentication with the client device, and verifying the encrypted client device context received from the client device.

The encrypted client device context generating circuit/module 2126 may include circuitry and/or instructions (e.g., encrypted client device context generating instructions 2146 stored on the storage medium 2104) adapted to perform several functions relating to, for example, generating one or more encrypted client device contexts, wherein the one or more encrypted client device contexts enable reconstruction of the at least one context at the network for communication with the client device, determining whether the encrypted client device context has expired, generating a new encrypted client device context, determining to generate the one or more encrypted client device contexts, where the determination is based on at least one of encrypted client device context usage information indicated in the request, a subscription of the device, or a policy, and requesting a client device context for a second client device from a second network device, the request including a control plane (CP) encrypted client device context. For example, the one or more encrypted client device contexts may include a first context to be used for data related communication and a second context to be used for control related communication.

The context reconstructing/removing circuit/module 2128 may include circuitry and/or instructions (e.g., context reconstructing/removing instructions 2148 stored on the storage medium 2104) adapted to perform several functions relating to, for example, obtaining a key (e.g., the key $K_{CDC\text{-}IoTF\text{-}U}$) for an encrypted client device context associated with a client device, obtaining a security context for the client device from the encrypted client device context based on the key, reconstructing the at least one context from the encrypted client device context, reconstructing at least a portion of a context based on the at least one of the one or more encrypted client device contexts and the usage information, removing at least one context, and/or maintaining the at least a portion of a context for a first threshold period of time when the usage information indicates a reduced data transmission, or a second threshold period of time when the usage information indicates a burst data transmission, the second threshold period of time being greater than the first threshold period of time.

The packet processing circuit/module 2130 may include circuitry and/or instructions (e.g., packet processing instructions 2150 stored on the storage medium 2104) adapted to perform several functions relating to, for example, processing the control packet using the at least one context, wherein the processing includes at least one of verifying or decrypting the control packet using the context.

The storing circuit/module 2132 may include circuitry and/or instructions (e.g., storing instructions 2152 stored on the storage medium 2104) adapted to perform several functions relating to, for example, storing a temporary identifier (ID) for a downlink packet for the client device.

The network access node determining circuit/module 2134 may include circuitry and/or instructions (e.g., network access node determining instructions 2154 stored on the storage medium 2104) adapted to perform several functions relating to, for example, determining a network access node to which the second data packet is forwarded.

The temporary identifier adding circuit/module 2136 may include circuitry and/or instructions (e.g., temporary identifier adding instructions 2156 stored on the storage medium 2104) adapted to perform several functions relating to, for example, adding a temporary identifier to the second data packet that enables the network access node to determine the client device.

The network address obtaining/releasing circuit/module 2137 may include circuitry and/or instructions (e.g., network address obtaining/releasing instructions 2157 stored on the storage medium 2104) adapted to perform several functions relating to, for example, obtaining a network address for the client device in response to the message, transmitting a resource release request message from the client device to a gateway, wherein the resource release request message causes the gateway to release the network address for the client device, and/or transmitting a resource release request message to a gateway when a timer expires prior to a transmission from the client device to the network or prior to a transmission from the network to the client device, wherein the resource release request message enables the gateway to release one or more resources for the client device.

The packet encrypting and protecting circuit/module 2138 may include circuitry and/or instructions (e.g., packet encrypting and protecting instructions 2158 stored on the storage medium 2104) adapted to perform several functions relating to, for example, encrypting or integrity protecting the packet using a user plane (UP) client device keys, decrypting and verifying the first data packet based on the security context, and/or encrypting or integrity protecting the second data packet using the user plane encryption key or the user plane integrity protection key.

The security context establishing circuit/module 2139 may include circuitry and/or instructions (e.g., security context establishing instructions 2159 stored on the storage medium 2104) adapted to perform several functions relating to, for example, establishing at least one context with the client device, the at least one context including network state information associated with a connection between the client device and the network, wherein the network state information includes at least an encryption algorithm, an encryption key, an integrity protection algorithm, an integrity protection key, or combinations thereof.

As mentioned above, instructions stored by the storage medium 2104, when executed by the processing circuit 2110, causes the processing circuit 2110 to perform one or more of the various functions and/or process operations described herein. For example, the storage medium 2104 may include one or more of the transmitting instructions 2140, receiving instructions 2142, authenticating and verifying instructions 2144, encrypted client device context generating instructions 2146, context reconstructing/removing instructions 2148, packet processing instructions 2150, storing instructions 2152, network access node determining instructions 2154, temporary identifier adding instructions 2156, network address obtaining/releasing instructions 2157, packet encrypting and protecting instructions 2158, and security context establishing instructions 2159.

Figure 22A:
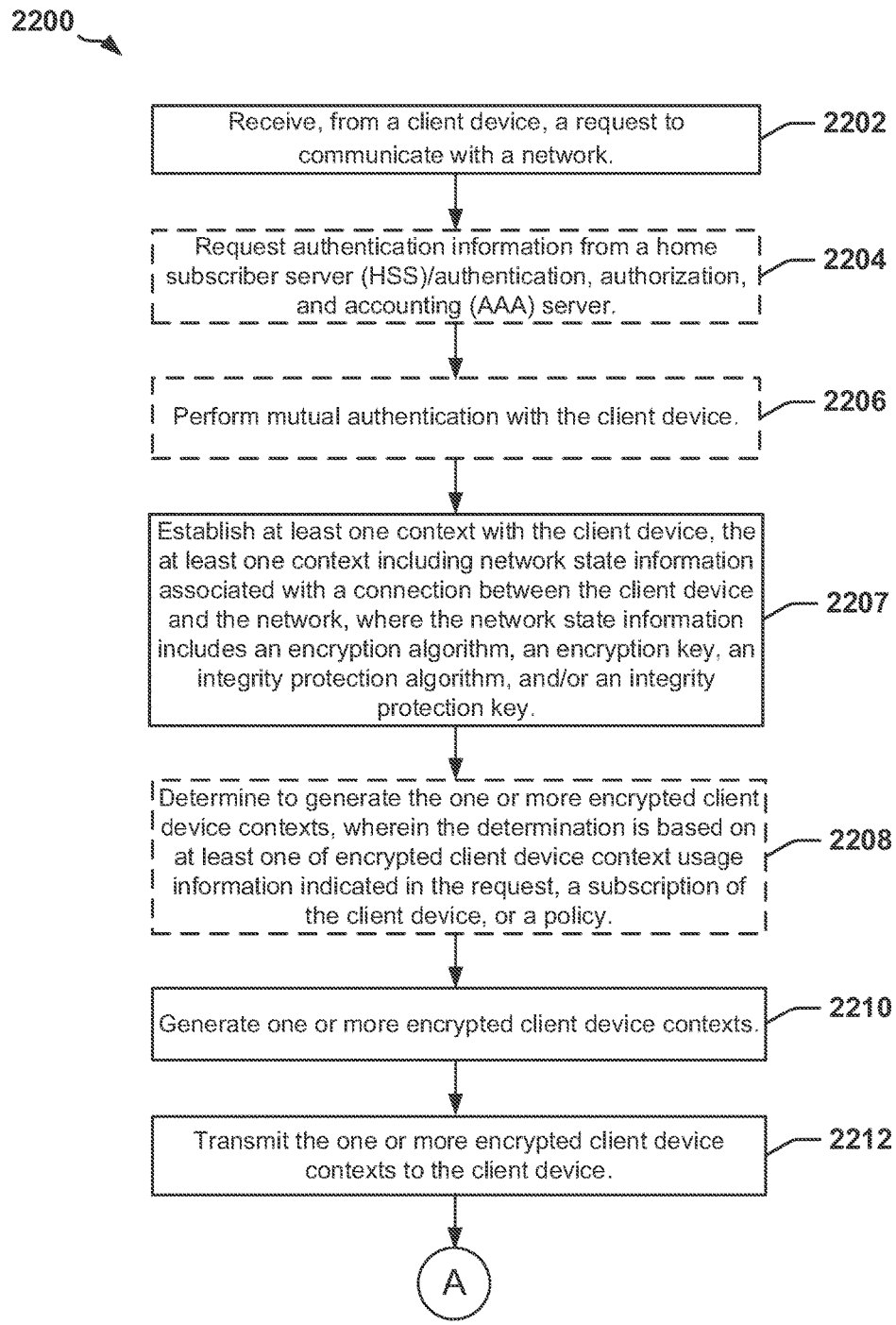
FIG. 22 (including FIGS. 22A and 22B) illustrates a method for communicating in an IoT network architecture in accordance with various aspects of the present disclosure.
Figure 22B:
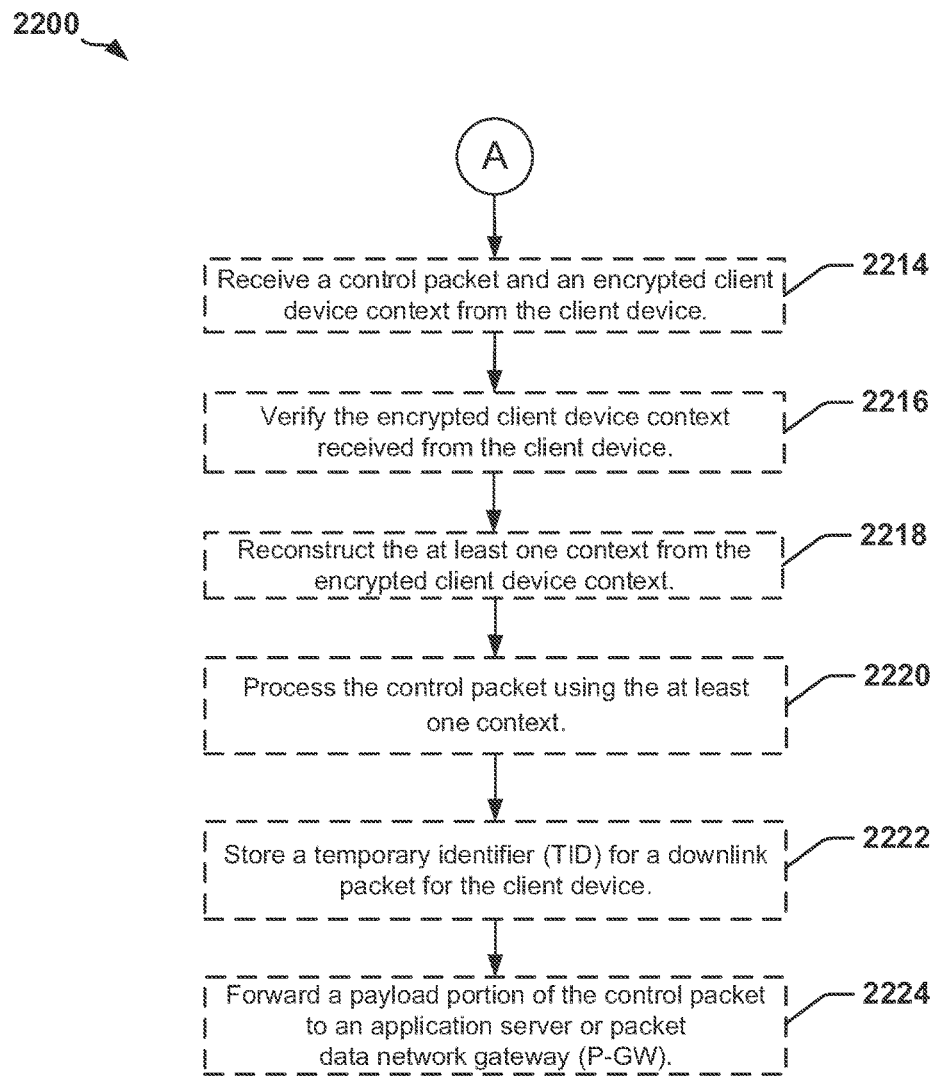

FIG. 22 (including FIGS. 22A and 22B) is a flowchart 2200 illustrating a method for communicating in an IoT network architecture in accordance with various aspects of the disclosure. The method may be performed by an apparatus such as a network device (e.g., the network device 105 of FIG. 1 or the apparatus 2100 of FIG. 21) that implements an IoT Function (e.g., a control plane IoTF, such as the control plane IoTF 106 of FIG. 1). It should be understood that the operations indicated with dashed lines in FIG. 22 represent optional operations.

The apparatus receives, from a client device, a request to communicate with a network 2202. The apparatus requests authentication information from a home subscriber server (HSS)/authentication, authorization, and accounting (AAA) server 2204. The apparatus performs mutual authentication with the client device 2206.

The apparatus establishes at least one context with the client device, the at least one context including network state information associated with a connection between the client device and the network 2207. In an aspect, the network state information includes at least an encryption algorithm, an encryption key, an integrity protection algorithm, and/or an integrity protection key. The apparatus determines to generate the one or more encrypted client device contexts, wherein the determination is based on at least one of encrypted client device context usage information indicated in the request, a subscription of the client device, and/or a policy 2208.

The apparatus generates one or more encrypted client device contexts 2210. In an aspect, the one or more encrypted client device contexts enable reconstruction of a context at the network for communication with the client device. In an aspect, the one or more encrypted client device contexts include a first context to be used for data related communication and a second context to be used for control related communication. The apparatus transmits the one or more encrypted client device contexts to the client device 2212.

The apparatus receives a control packet and an encrypted client device context from the client device 2214. The apparatus verifies the encrypted client device context received from the client device 2216. In an aspect, the apparatus verifies the encrypted client device context received from the client device by determining whether the encrypted client device context has expired, generates one or more new encrypted client device contexts when the previous encrypted client device context has expired, and transmits the one or more new encrypted client device contexts to the client device when the previous encrypted client device context has expired. In an aspect, verifying the encrypted client device context includes determining a key for verifying the encrypted client device context.

The apparatus reconstructs the at least one context from the encrypted client device context 2218. The apparatus processes the control packet using the at least one context, where the processing includes at least one of verifying or decrypting the control packet using the at least one context 2220. The apparatus stores a temporary identifier (ID) for a downlink packet for the client device 2222. The apparatus forwards a payload portion of the control packet to an application server or packet data network gateway (P-GW) 2224.

Figure 23A:
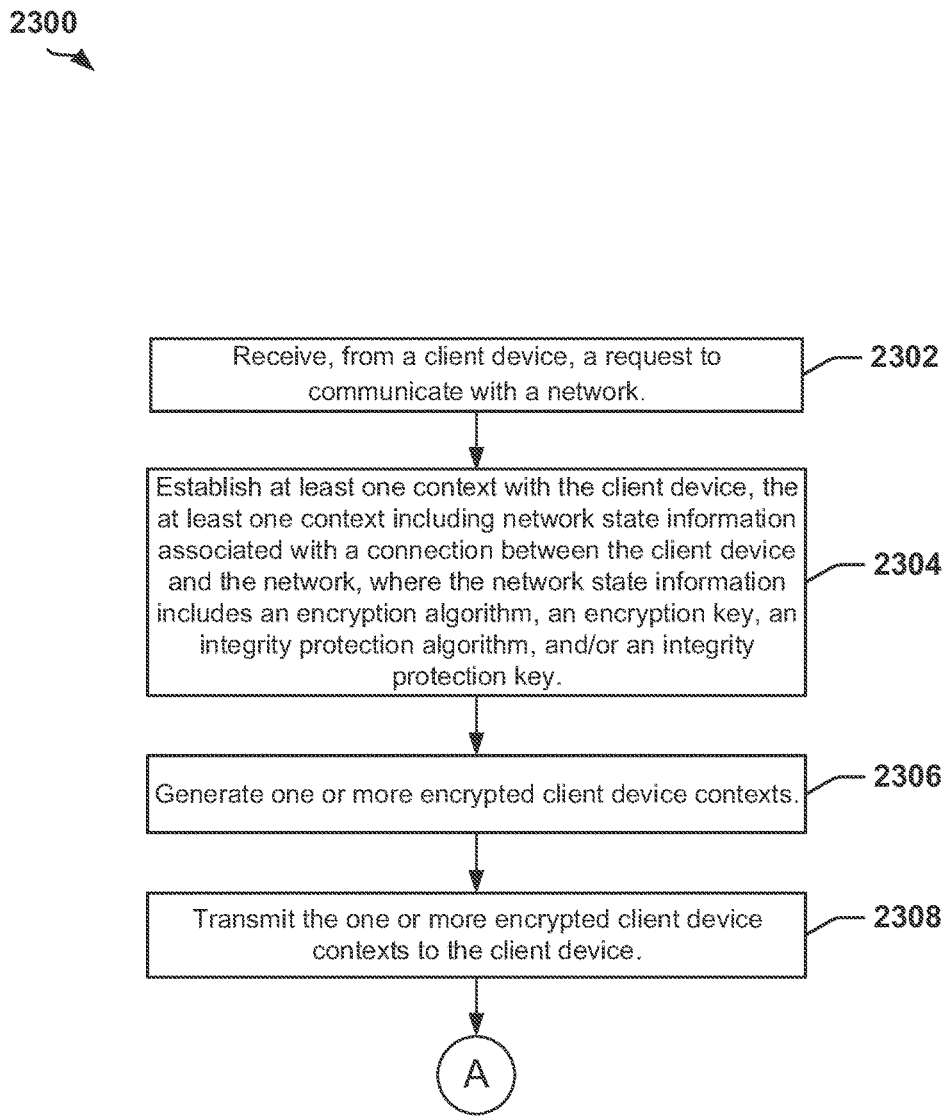
FIG. 23 (including FIGS. 23A and 23B) illustrates a method for communicating in an IoT network architecture in accordance with various aspects of the disclosure.
Figure 23B:
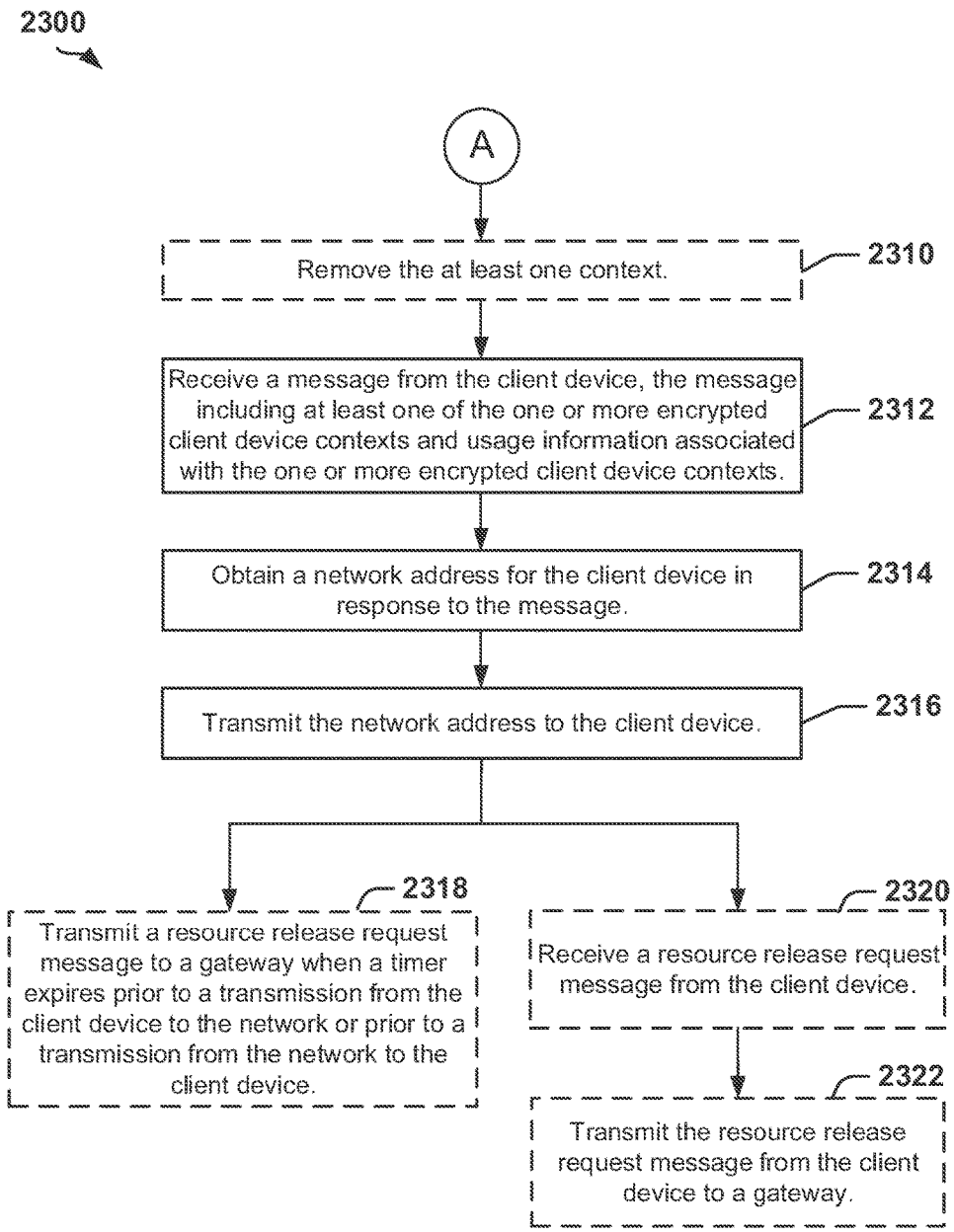

FIG. 23 (including FIGS. 23A and 23B) is a flowchart 2300 illustrating a method for communicating in an IoT network architecture in accordance with various aspects of the disclosure. The method may be performed by an apparatus such as a network device (e.g., the network device 105 of FIG. 1 or the apparatus 2100 of FIG. 21) that implements an IoT Function (e.g., a control plane IoTF, such as the control plane IoTF 106 of FIG. 1). It should be understood that the operations indicated with dashed lines in FIG. 23 represent optional operations.

The apparatus receives, from a client device, a request to communicate with a network 2302. The apparatus establishes at least one context with the client device, the at least one context including network state information associated with a connection between the client device and the network, wherein the network state information includes at least an encryption algorithm, an encryption key, an integrity protection algorithm, and/or an integrity protection key 2304. The apparatus generates one or more encrypted client device contexts 2306. In an aspect, the one or more encrypted client device contexts enable reconstruction of the at least one context at the network for communication with the client device. The apparatus transmits the one or more encrypted client device contexts to the client device 2308. The apparatus removes the at least one context 2310. The apparatus receives a message from the client device, the message including at least one of the one or more encrypted client device contexts and usage information associated with the one or more encrypted client device contexts 2312. In an aspect, the usage information indicates whether transmission of the message is a reduced data transmission or a burst data transmission. In an aspect, the network device may reconstruct at least a portion of a context based on the at least one of the one or more encrypted client device contexts and the usage information. In an aspect, the message from the client device includes a resource establishment request and at least one of the one or more encrypted client device contexts. For example, the message may be the resource establishment request message 1016 in FIG. 10. The apparatus obtains a network address for the client device in response to the message 2314. The apparatus transmits the network address to the client device 2316. In an aspect, the apparatus maintains the at least a portion of a context for a first threshold period of time when the usage information indicates a reduced data transmission, or a second threshold period of time when the usage information indicates a burst data transmission, the second threshold period of time being greater than the first threshold period of time. In one aspect, the apparatus transmits a resource release request message to a gateway when a timer expires prior to a transmission from the client device to the network or prior to a transmission from the network to the client device 2318. In an aspect, the resource release request message enables the gateway to release one or more resources for the client device. In another aspect, the apparatus receives a resource release request message from the client device 2320. In such aspect, the apparatus transmits the resource release request message from the client device to a gateway 2322. In an aspect, the resource release request message enables the gateway to release one or more resources for the client device. In some aspects, the operation 2318 and the operations 2320 and 2322 may be performed in the alternative. For example, if operation 2318 is performed, operations 2320 and 2322 may not be performed. As another example, if the operations 2320 and 2322 are performed, operation 2318 may not be performed.

Figure 24:
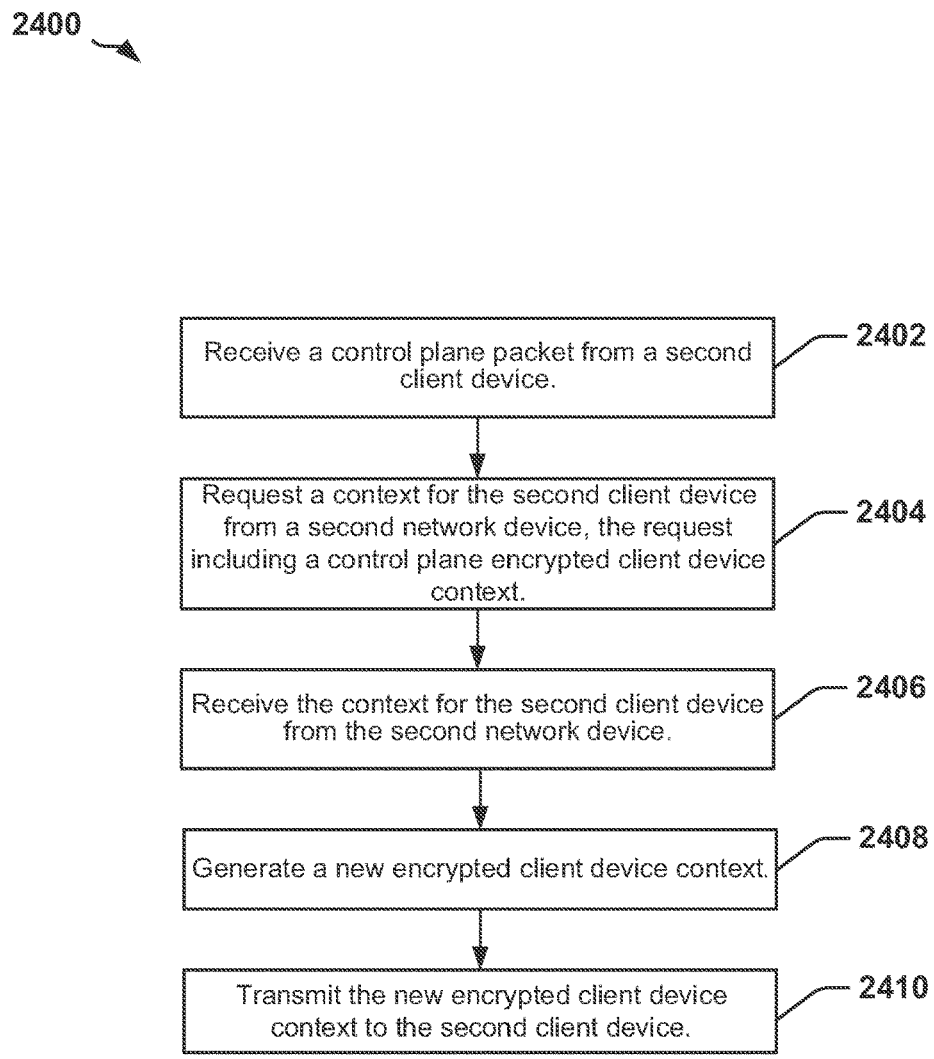
FIG. 24 illustrates a method operational in an apparatus for communication in an IoT network architecture in accordance with various aspects of the present disclosure.

FIG. 24 is a flowchart 2400 illustrating a method for communicating in an IoT network architecture in accordance with various aspects of the disclosure. The method may be performed by an apparatus such as a network device (e.g., the network device 105 of FIG. 1 or the apparatus 2100 of FIG. 21) that implements an IoT Function (e.g., a control plane IoTF, such as the control plane IoTF 106 of FIG. 1).

The apparatus receives a control plane packet from a second client device 2402. In an aspect, the second client device is different from the client device from which the request to communicate with the network is initially received. The apparatus requests a context for the second client device from a second network device, the request including a control plane (CP) encrypted client device context 2404. The apparatus receives the context for the second client device from the second network device 2406. The apparatus generates a new encrypted client device context 2408. The apparatus transmits the new encrypted client device context to the second client device 2410.

Figure 25A:
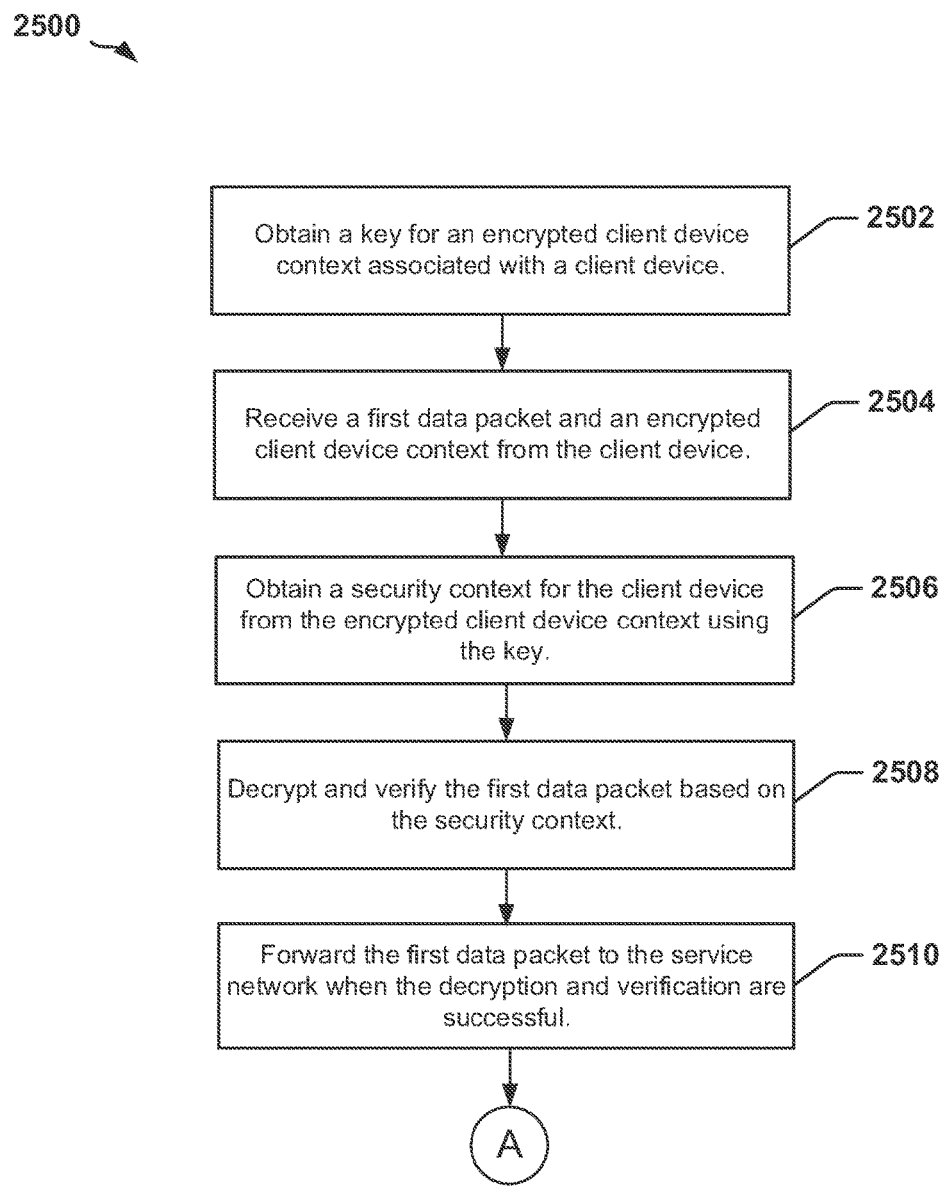
FIG. 25 (including FIGS. 25A and 25B) illustrates a method for communicating in an IoT network architecture in accordance with various aspects of the present disclosure.
Figure 25B:
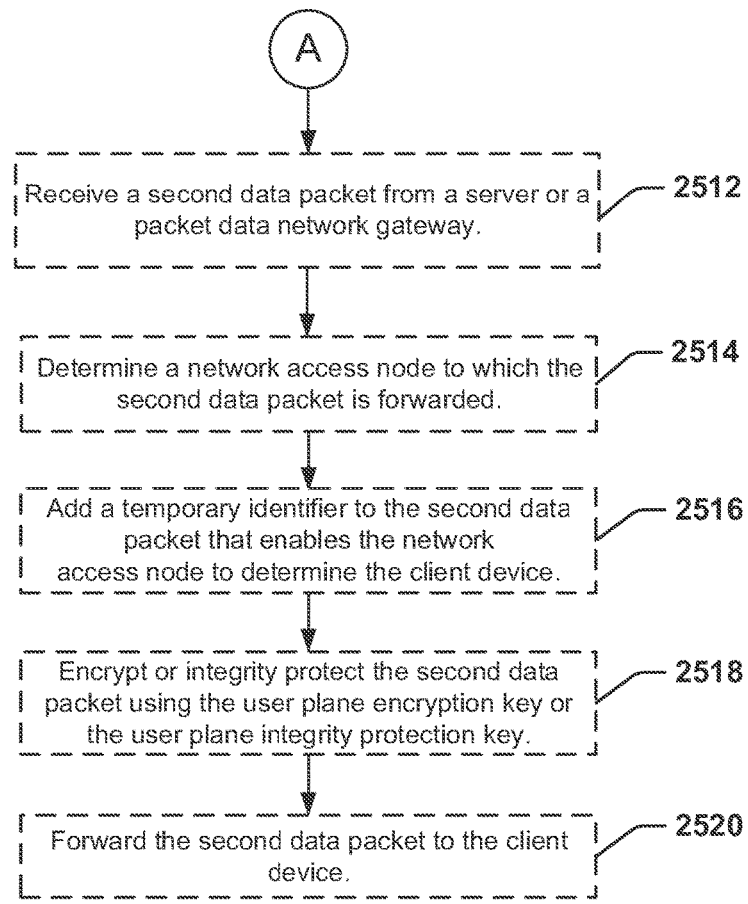

FIG. 25 (including FIGS. 25A and 25B) is a flowchart 2500 illustrating a method for communicating in an IoT network architecture in accordance with various aspects of the disclosure. The method may be performed by an apparatus such as a network device (e.g., the network device 105 of FIG. 1 or the apparatus 2100 of FIG. 21) that implements an IoT Function (e.g., a user plane IoTF, such as the user plane IoTF 108 of FIG. 1). It should be understood that the operations indicated with dashed lines in FIG. 25 represent optional operations.

The apparatus obtains a key (e.g., the key $K_{CDC\text{-}IoTF\text{-}U}$) for an encrypted client device context associated with a client device 2502. The apparatus receives a first data packet (e.g., UL data packet) and the encrypted client device context from the client device 2504. The apparatus obtains a security context for the client device from the encrypted client device context using the key 2506. The apparatus decrypts and verifies the first data packet based on the security context 2508. The apparatus forwards the first data packet to a service network when the decryption and verification are successful 2510.

In an aspect, the apparatus receives a second data packet (e.g., the DL data packet in message 914 of FIG. 9) from a server or a packet data network gateway 2512. The apparatus determines a network access node to which the second data packet is forwarded 2514. The apparatus adds a temporary identifier to the second data packet that enables the network access node to determine the client device 2516. The apparatus encrypts or integrity protects the second data packet using the user plane encryption key or the user plane integrity protection key 2518. The apparatus forwards (e.g., via message 934 in FIG. 9) the second data packet to the client device 2520.

Figure 26A:
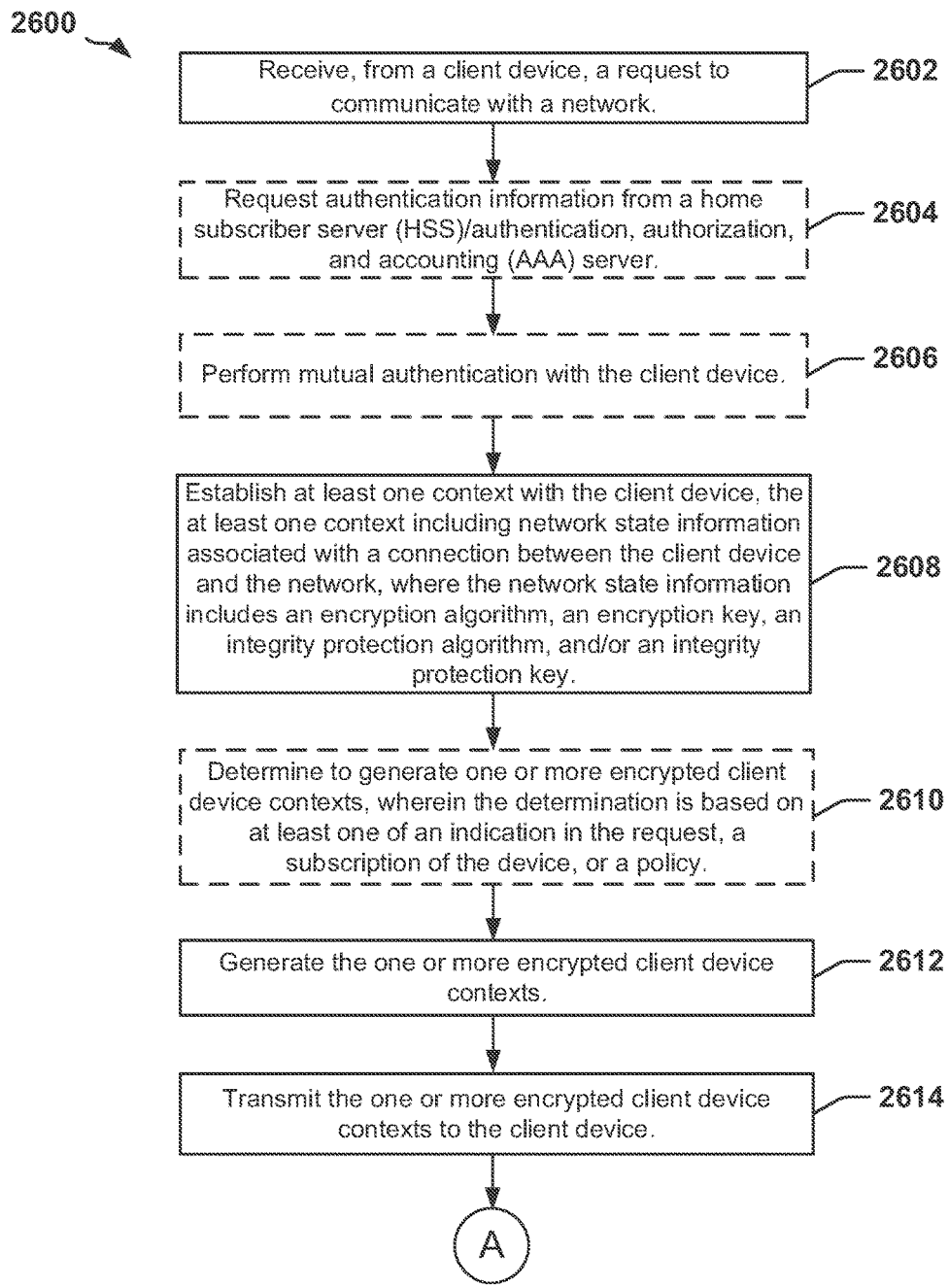
FIG. 26 (including FIGS. 26A and 26B) illustrates a method for communicating in an IoT network architecture in accordance with various aspects of the disclosure.
Figure 26B:
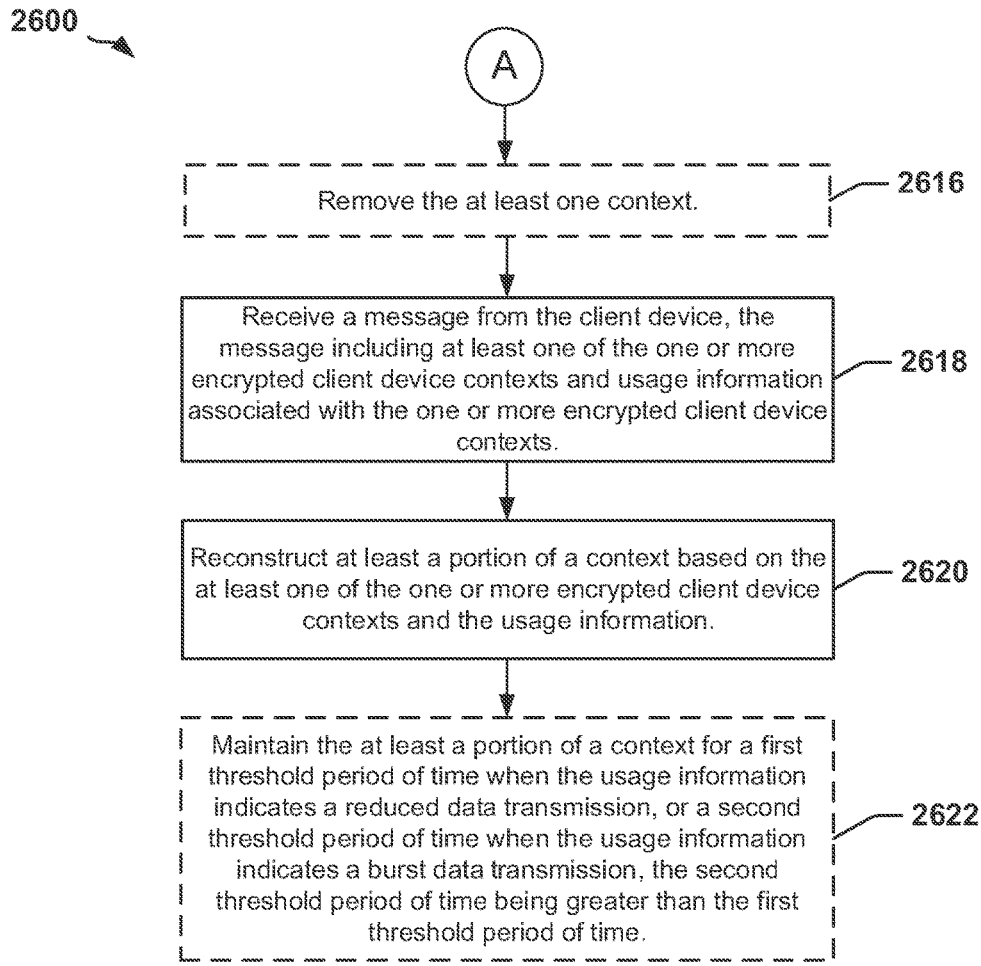

FIG. 26 (including FIGS. 26A and 26B) is a flowchart 2600 illustrating a method for communicating in an IoT network architecture in accordance with various aspects of the disclosure. The method may be performed by an apparatus such as a network device (e.g., the network device 105 of FIG. 1 or the apparatus 2100 of FIG. 21) that implements an IoT Function (e.g., a control plane IoTF, such as the control plane IoTF 106 of FIG. 1). It should be understood that the operations indicated with dashed lines in FIG. 26 represent optional operations.

The apparatus receives, from a client device, a request to communicate with a network 2602. The apparatus requests authentication information from a home subscriber server (HSS)/authentication, authorization, and accounting (AAA) server 2604. The apparatus performs mutual authentication with the client device 2606.

The apparatus establishes at least one context with the client device, the at least one context including network state information associated with a connection between the client device and the network 2608. In an aspect, the network state information includes at least an encryption algorithm, an encryption key, an integrity protection algorithm, and/or an integrity protection key. The apparatus determines to generate the one or more encrypted client device contexts, wherein the determination is based on at least one of encrypted client device context usage information indicated in the request, a subscription of the client device, and/or a policy 2610.

The apparatus generates one or more encrypted client device contexts 2612. In an aspect, the one or more encrypted client device contexts enable reconstruction of a context at the network for communication with the client device. In an aspect, the one or more encrypted client device contexts include a first context to be used for data related communication and a second context to be used for control related communication. The apparatus transmits the one or more encrypted client device contexts to the client device 2614. The apparatus removes the at least one context 2616. The apparatus receives a message from the client device, the message including at least one of the one or more encrypted client device contexts and usage information associated with the one or more encrypted client device contexts 2618. The apparatus reconstructs at least a portion of a context based on the at least one of the one or more encrypted client device contexts and the usage information 2620. The apparatus maintains the at least a portion of a context for a first threshold period of time when the usage information indicates a reduced data transmission, or a second threshold period of time when the usage information indicates a burst data transmission, the second threshold period of time being greater than the first threshold period of time 2622.

Exemplary Apparatus (e.g., Network Access Node) and Method Thereon

Figure 27:
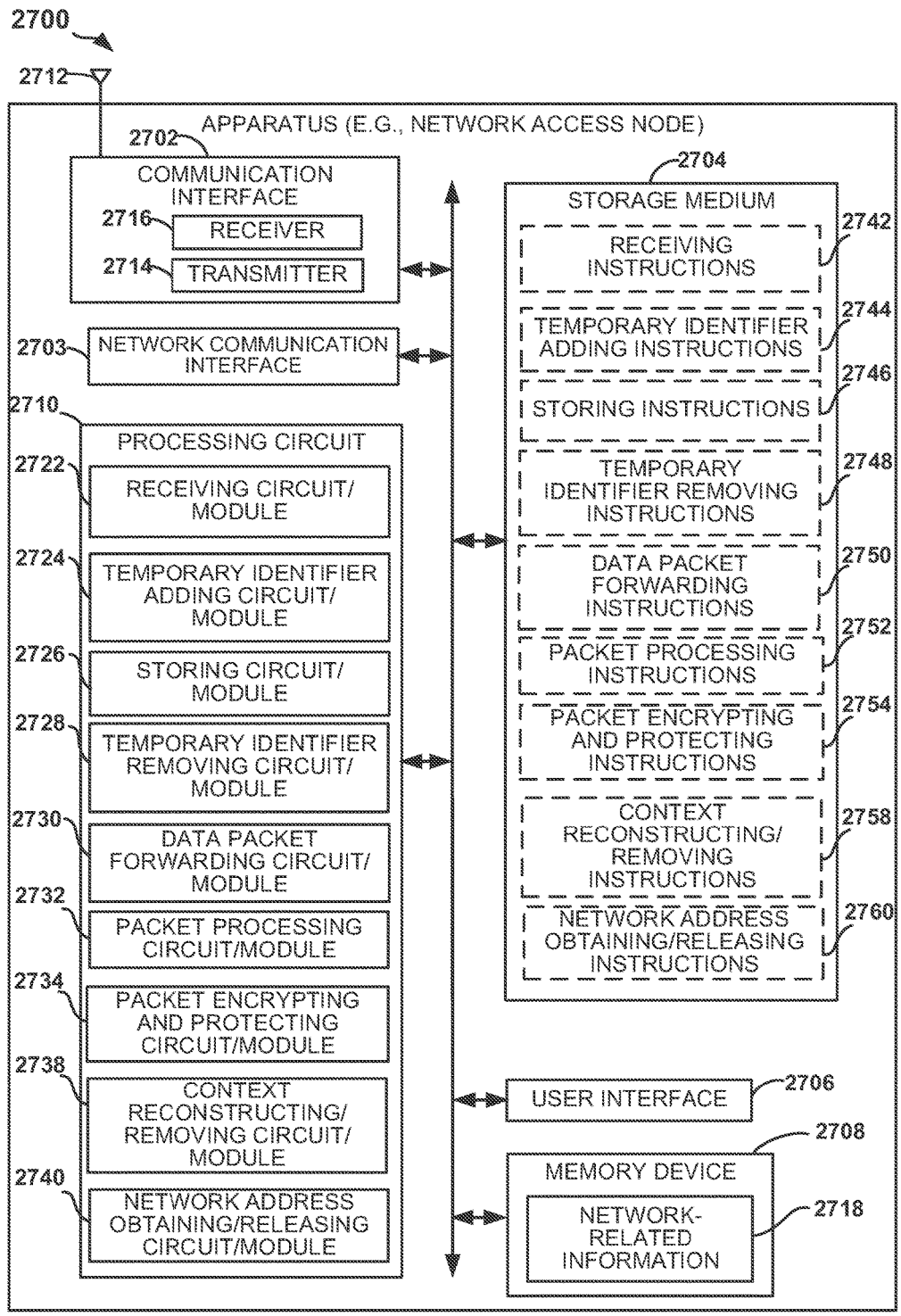
FIG. 27 is an illustration of an apparatus configured to support operations related to communication in an IoT network architecture in accordance with various aspects of the present disclosure.

FIG. 27 is an illustration of an apparatus 2700 according to one or more aspects of the disclosure (e.g., aspects related to the methods of FIGS. 28 and 29 described below). The apparatus 2700 includes a communication interface (e.g., at least one transceiver) 2702, a network communication interface 2703, a storage medium 2704, a user interface 2706, a memory device 2708, and a processing circuit 2710.

These components can be coupled to and/or placed in electrical communication with one another via a signaling bus or other suitable component, represented generally by the connection lines in FIG. 27. The signaling bus may include any number of interconnecting buses and bridges depending on the specific application of the processing circuit 2710 and the overall design constraints. The signaling bus links together various circuits such that each of the communication interface 2702, network communication interface 2703, the storage medium 2704, the user interface 2706, and the memory device 2708 are coupled to and/or in electrical communication with the processing circuit 2710. The signaling bus may also link various other circuits (not shown) such as timing sources, peripherals, voltage regulators, and power management circuits, which are well known in the art, and therefore, will not be described any further.

The communication interface 2702 may be adapted to facilitate wireless communication of the apparatus 2700. For example, the communication interface 2702 may include circuitry and/or code (e.g., instructions) adapted to facilitate the communication of information bi-directionally with respect to one or more communication devices in a network. The communication interface 2702 may be coupled to one or more antennas 2712 for wireless communication within a wireless communication system. The communication interface 2702 can be configured with one or more standalone receivers and/or transmitters, as well as one or more transceivers. In the illustrated example, the communication interface 2702 includes a transmitter 2714 and a receiver 2716.

The network communication interface 2703 may be adapted to facilitate communication of the apparatus 2700. For example, the network communication interface 2703 may include circuitry and/or code (e.g., instructions) adapted to facilitate the communication of information bi-directionally with respect to one or more network entities in a network. The network communication interface 2703 can be configured with one or more standalone receivers and/or transmitters, as well as one or more transceivers.

The memory device 2708 may represent one or more memory devices. As indicated, the memory device 2708 may maintain network-related information/along with other information used by the apparatus 2700. In some implementations, the memory device 2708 and the storage medium 2704 are implemented as a common memory component. The memory device 2708 may also be used for storing data that is manipulated by the processing circuit 2710 or some other component of the apparatus 2700.

The storage medium 2704 may represent one or more computer-readable, machine-readable, and/or processor-readable devices for storing code, such as processor executable code or instructions (e.g., software, firmware), electronic data, databases, or other digital information. The storage medium 2704 may also be used for storing data that is manipulated by the processing circuit 2710 when executing code. The storage medium 2704 may be any available media that can be accessed by a general purpose or special purpose processor, including portable or fixed storage devices, optical storage devices, and various other mediums capable of storing, containing or carrying code.

By way of example and not limitation, the storage medium 2704 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing code that may be accessed and read by a computer. The storage medium 2704 may be embodied in an article of manufacture (e.g., a computer program product). By way of example, a computer program product may include a computer-readable medium in packaging materials. In view of the above, in some implementations, the storage medium 2704 may be a non-transitory (e.g., tangible) storage medium.

The storage medium 2704 may be coupled to the processing circuit 2710 such that the processing circuit 2710 can read information from, and write information to, the storage medium 2704. That is, the storage medium 2704 can be coupled to the processing circuit 2710 so that the storage medium 2704 is at least accessible by the processing circuit 2710, including examples where at least one storage medium is integral to the processing circuit 2710 and/or examples where at least one storage medium is separate from the processing circuit 2710 (e.g., resident in the apparatus 2700, external to the apparatus 2700, distributed across multiple entities, etc.).

Code and/or instructions stored by the storage medium 2704, when executed by the processing circuit 2710, causes the processing circuit 2710 to perform one or more of the various functions and/or process operations described herein. For example, the storage medium 2704 may include operations configured for regulating operations at one or more hardware blocks of the processing circuit 2710, as well as to utilize the communication interface 2702 for wireless communication utilizing their respective communication protocols.

The processing circuit 2710 is generally adapted for processing, including the execution of such code/instructions stored on the storage medium 2704. As used herein, the term "code" or "instructions" shall be construed broadly to include without limitation programming, instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 2710 is arranged to obtain, process and/or send data, control data access and storage, issue commands, and control other desired operations. The processing circuit 2710 may include circuitry configured to implement desired code provided by appropriate media in at least one example. For example, the processing circuit 2710 may be implemented as one or more processors, one or more controllers, and/or other structure configured to execute executable code. Examples of the processing circuit 2710 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 2710 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 2710 are for illustration and other suitable configurations within the scope of the disclosure are also contemplated.

According to one or more aspects of the disclosure, the processing circuit 2710 may be adapted to perform any or all of the features, processes, functions, operations and/or routines for any or all of the apparatuses described herein. As used herein, the term "adapted" in relation to the processing circuit 2710 may refer to the processing circuit 2710 being one or more of configured, employed, implemented, and/or programmed to perform a particular process, function, operation and/or routine according to various features described herein.

Figure 28:
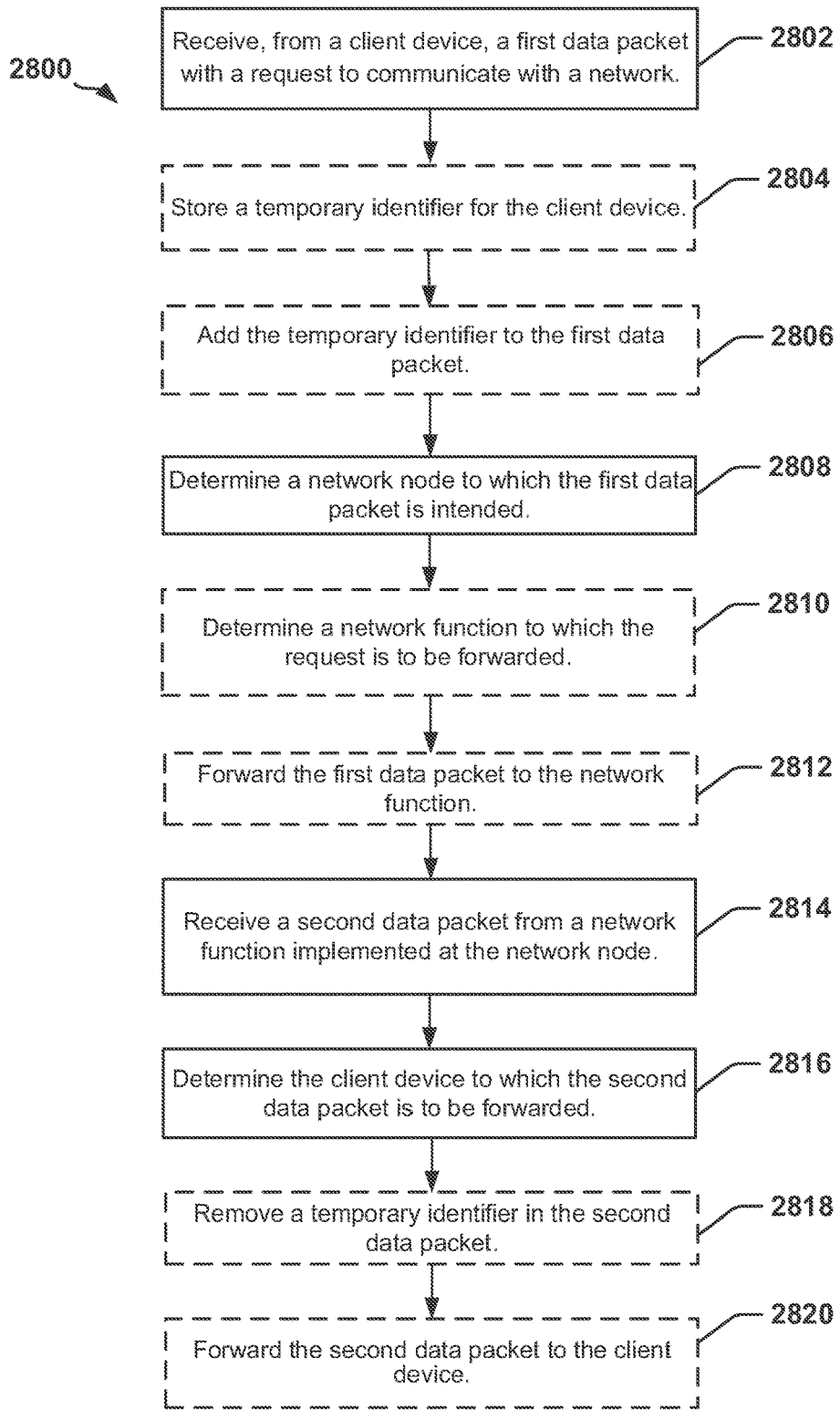
FIG. 28 illustrates a method for communicating in an IoT network architecture in accordance with various aspects of the present disclosure.

According to at least one example of the apparatus 2700, the processing circuit 2710 may include one or more of a receiving circuit/module 2722, a temporary identifier adding circuit/module 2724, a storing circuit/module 2726, a temporary identifier removing circuit/module 2728, a data packet forwarding circuit/module 2730, a packet processing circuit/module 2732, a packet encrypting and protecting circuit/module 2734, a context reconstructing/removing circuit/module 2738, and network address obtaining/releasing circuit/module 2740 that are adapted to perform any or all of the features, processes, functions, operations and/or routines described herein (e.g., features, processes, functions, operations and/or routines described with respect to FIGS. 28 and 29).

The receiving circuit/module 2722 may include circuitry and/or instructions (e.g., receiving instructions 2742 stored on the storage medium 2704) adapted to perform several functions relating to, for example, receiving, from a client device, a first data packet with a request to communicate with a network, receiving a first data packet and the encrypted client device context from the client device, receiving a second data packet from a network function implemented at the network node, and receiving a message that includes a resource establishment request and at least one of the one or more encrypted client device contexts from the client device.

The temporary identifier adding circuit/module 2724 may include circuitry and/or instructions (e.g., temporary identifier adding instructions 2744 stored on the storage medium 2704) adapted to perform several functions relating to, for example, adding a temporary identifier to the first data packet.

The storing circuit/module 2726 may include circuitry and/or instructions (e.g., storing instructions 2746 stored on the storage medium 2704) adapted to perform several functions relating to, for example, storing a temporary identifier for the client device. For example, the temporary identifier may be a cell radio network temporary identifier (C-RNTI). In an aspect, the temporary identifier is stored for a predetermined period of time.

The temporary identifier removing circuit/module 2728 may include circuitry and/or instructions (e.g., temporary identifier removing instructions 2748 stored on the storage medium 2704) adapted to perform several functions relating to, for example, removing the temporary identifier in the second data packet.

The data packet forwarding circuit/module 2730 may include circuitry and/or instructions (e.g., data packet forwarding instructions 2750 stored on the storage medium 2704) adapted to perform several functions relating to, for example, determining a first network node to which a first data packet is intended, forwarding a first data packet to a service network when the decryption and verification are successful, determining a network function to which a request is to be forwarded, where the determination is preconfigured at the network access node, determining the client device to which the second data packet is to be forwarded, and forwarding the second data packet to the client device.

The packet processing circuit/module 2732 may include circuitry and/or instructions (e.g., packet processing instructions 2752 stored on the storage medium 2704) adapted to perform several functions relating to, for example, decrypting and verifying the first data packet based on the security context.

The packet encrypting and protecting circuit/module 2734 may include circuitry and/or instructions (e.g., packet encrypting and protecting instructions 2754 stored on the storage medium 2704) adapted to perform several functions relating to, for example, encrypting or integrity protecting a packet using a user plane (UP) client device keys, decrypting and verifying the first data packet based on the security context, and/or encrypting or integrity protecting the second data packet using the user plane encryption key or the user plane integrity protection key.

The context reconstructing/removing circuit/module 2738 may include circuitry and/or instructions (e.g., context reconstructing/removing instructions 2758 stored on the storage medium 2704) adapted to perform several functions relating to, for example, obtaining a key (e.g., the key $K_{CDC-IoTF-U}$) for an encrypted client device context associated with a client device, obtaining a security context for the client device from the encrypted client device context using on the key, reconstructing at least one context from the encrypted client device context, reconstructing at least a portion of a context based on the at least one of the one or more encrypted client device contexts and usage information, removing at least one context, and/or maintaining the at least a portion of a context for a first threshold period of time when the usage information indicates a reduced data transmission, or a second threshold period of time when the usage information indicates a burst data transmission, the second threshold period of time being greater than the first threshold period of time.

The network address obtaining/releasing circuit/module 2740 may include circuitry and/or instructions (e.g., network address obtaining/releasing instructions 2760 stored on the storage medium 2704) adapted to perform several functions relating to, for example, obtaining a network address for the client device in response to the message, transmitting the network address to the client device, transmitting a resource release request message from the client device to a gateway, wherein the resource release request message enables the gateway to release one or more resources for the client device, and/or transmitting a resource release request message to a gateway when a timer expires prior to a transmission from the client device to the network or prior to a transmission from the network to the client device, wherein the resource release request message enables the gateway to release one or more resources for the client device.

As mentioned above, instructions stored by the storage medium 2704, when executed by the processing circuit 2710, causes the processing circuit 2710 to perform one or more of the various functions and/or process operations described herein. For example, the storage medium 2704 may include one or more of the receiving instructions 2742, a temporary identifier adding instructions 2744, a storing instructions 2746, a temporary identifier removing instructions 2748, a data packet forwarding instructions 2750, a packet processing instructions 2752, a packet encrypting and protecting instructions 2754, a context reconstructing/removing instructions 2758, and network address obtaining/releasing instructions 2760.

FIG. 28 is a flowchart 2800 illustrating a method for communicating in an IoT network architecture in accordance with various aspects of the disclosure. The method may be performed by an apparatus such as a network access node (e.g., the network access node 104 of FIG. 1 or apparatus 2700 of FIG. 27).

The apparatus receives, from a client device, a first data packet with a request to communicate with a network 2802. The apparatus stores a temporary identifier for the client device 2804. For example, the temporary identifier may be a cell radio network temporary identifier (C-RNTI), and the temporary identifier may be stored for a predetermined period of time. The apparatus adds the temporary identifier to the first data packet 2806.

The apparatus determines a first network node to which the first data packet is intended 2808. The apparatus determines a network function to which the request is to be forwarded, where the determination is preconfigured at the network access node 2810. The apparatus forwards the first data packet to the network function 2812.

The apparatus receives a second data packet from a network function implemented at the network node 2814. The apparatus determines the client device to which the second data packet is to be forwarded 2816. In an aspect, the apparatus determines the client device to which the second data packet is to be forwarded by identifying the client device from a temporary identifier in the second data packet. The apparatus removes the temporary identifier in the second data packet 2818. The apparatus forwards the second data packet to the client device 2820.

Figure 29A:
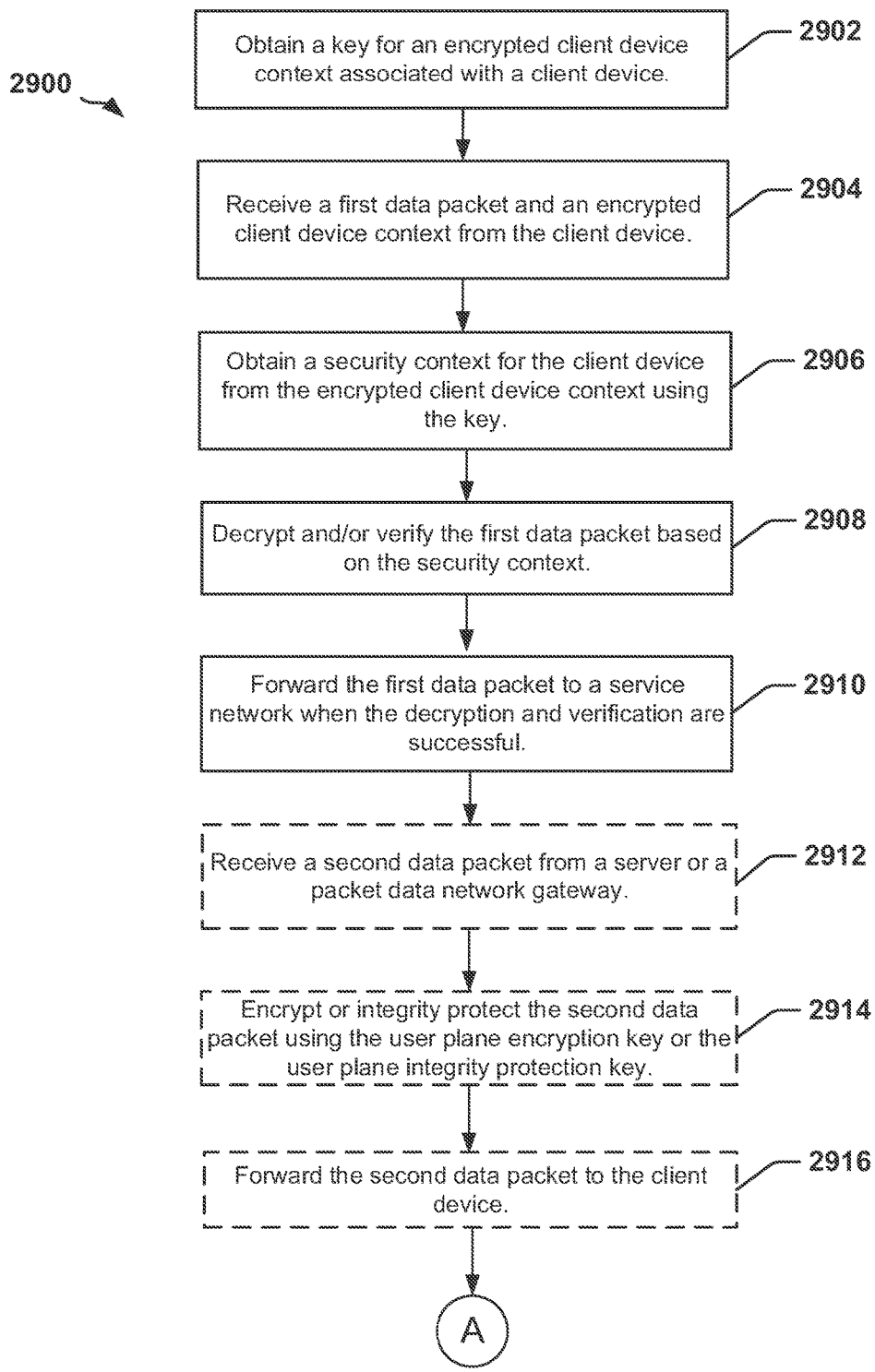
FIG. 29 (including FIGS. 29A and 29B) illustrates a method for communicating in an IoT network architecture in accordance with various aspects of the disclosure.
Figure 29B:
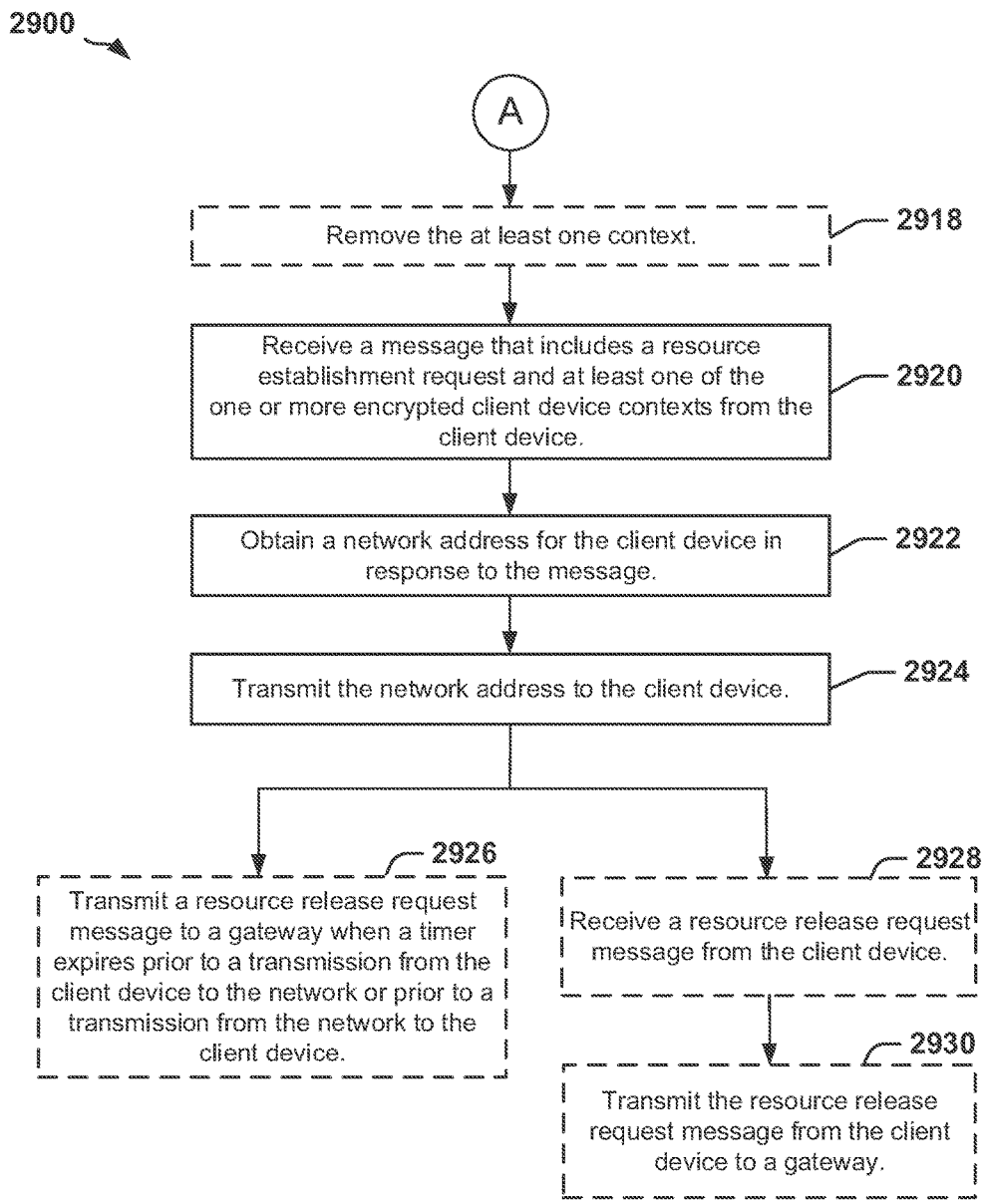

FIG. 29 (including FIGS. 29A and 29B) is a flowchart 2900 illustrating a method for communicating in a network in accordance with various aspects of the disclosure. The method may be performed by an apparatus such as a network access node (e.g., the network access node 1204 of FIG. 12 or apparatus 2700 of FIG. 27). It should be understood that the operations indicated with dashed lines in FIG. 27 represent optional operations.

The apparatus obtains a key (e.g., the key $K_{CDC\text{-}IoTF\text{-}U}$) for an encrypted client device context associated with a client device 2902. The apparatus receives a first data packet (e.g., UL data packet) and the encrypted client device context from the client device 2904. The apparatus obtains a security context for the client device from the encrypted client device context using the key 2906. The apparatus decrypts and/or verifies the first data packet based on the security context 2908. The apparatus forwards the first data packet to a service network when the decryption and verification are successful 2910. The apparatus receives a second data packet (e.g., a DL data packet) from a server or a packet data network gateway 2912. The apparatus encrypts or integrity protects the second data packet using the user plane encryption key or the user plane integrity protection key 2914. The apparatus forwards the second data packet to the client device 2916. The apparatus removes the at least one context 2918. The apparatus receives a message that includes a resource establishment request and at least one of the one or more encrypted client device contexts from the client device 2920. The apparatus obtains a network address for the client device in response to the message 2922. The apparatus transmits the network address to the client device 2924. In one aspect, the apparatus transmits a resource release request message to a gateway when a timer expires prior to a transmission from the client device to the network or prior to a transmission from the network to the client device 2926. In an aspect, the resource release request message enables the gateway to release one or more resources for the client device. In another aspect, the apparatus receives a resource release request message from the client device 2928. In such aspect, the apparatus transmits the resource release request message from the client device to a gateway 2930. In an aspect, the resource release request message enables the gateway to release one or more resources for the client device. In some aspects, the operation 2926 and the operations 2928 and 2930 may be performed in the alternative. For example, if operation 2926 is performed, operations 2928 and 2930 may not be performed. As another example, if the operations 2928 and 2930 are performed, operation 2926 may not be performed.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein. Additional elements, components, steps, and/or functions may also be added or not utilized without departing from the disclosure.

While features of the disclosure may have been discussed relative to certain implementations and figures, all implementations of the disclosure can include one or more of the advantageous features discussed herein. In other words, while one or more implementations may have been discussed as having certain advantageous features, one or more of such features may also be used in accordance with any of the various implementations discussed herein. In similar fashion, while exemplary implementations may have been discussed herein as device, system, or method implementations, it should be understood that such exemplary implementations can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. In some aspects, a process may correspond to a method, a function, a procedure, a subroutine, a subprogram, etc. When a process corresponds to a function, its termination corresponds to a return of the function to the calling function or the main function. One or more of the various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the implementations disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

Within the disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the disclosure, without limitation as to the type of electronic circuits, as well as software implementations of information and instructions that, when executed by a processor, enable the performance of the functions described in the disclosure.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like. As used herein, the term "obtaining" may include one or more actions including, but not limited to, receiving, generating, determining, or any combination thereof.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Accordingly, the various features associate with the examples described herein and shown in the accompanying drawings can be implemented in different examples and implementations without departing from the scope of the disclosure. Therefore, although certain specific constructions and arrangements have been described and shown in the accompanying drawings, such implementations are merely illustrative and not restrictive of the scope of the disclosure, since various other additions and modifications to, and deletions from, the described implementations will be apparent to one of ordinary skill in the art. Thus, the scope of the disclosure is only determined by the literal language, and legal equivalents, of the claims which follow.

What is claimed is:

1. A method for a client device comprising:
    transmitting a request to communicate with a network;
    establishing a security context for a connection with the network, wherein the security context includes at least one of an encryption algorithm, an encryption key, an integrity protection algorithm, an integrity protection key, or combinations thereof;
    receiving one or more encrypted client device contexts from the network in response to the request, wherein the one or more encrypted client device contexts include network state information associated with the client device, the network state information including at least the security context and information associated with one or more bearers for the client device; and
    transmitting a message that includes at least one of the one or more encrypted client device contexts to the network, wherein the one or more encrypted client device contexts enable reconstruction of a context at the network for communication with the client device, the context including the network state information.

2. The method of claim 1, wherein the context is removed at the network.

3. The method of claim 1, further comprising:
    determining at least one of the one or more encrypted client device contexts to use based on whether the message includes data or control information.

4. The method of claim 1, wherein the encrypted client device contexts include a first context to be used for data related communication with the client device and a second context to be used for control related communication with the client device.

5. The method of claim 1, wherein the one or more encrypted client device contexts include at least one of a security context, a quality of service for a bearer, a tunnel endpoint identifier, or combinations thereof.

6. The method of claim 1, wherein the request comprises an indication that the client device is requesting the one or more encrypted client device contexts.

7. The method of claim 1, wherein the request comprises an indication of a service that the client device is requesting.

8. The method of claim 1, wherein the one or more encrypted client device contexts include a user plane encrypted client device context and a control plane encrypted client device context, and wherein the message includes:
   a first data packet with the user plane encrypted client device context, or
   a control packet with the control plane encrypted client device context.

9. The method of claim 8, wherein the encryption key is a user plane encryption key and the integrity protection key is a user plane integrity protection key, wherein the user plane encryption key and the user plane integrity protection key are maintained at the client device, and wherein the first data packet is at least integrity protected with the user plane integrity protection key or encrypted with the user plane encryption key.

10. The method of claim 8, wherein transmission of the message including the first data packet does not establish a radio resource control connection with a network access node of the network.

11. The method of claim 8, further comprising entering an idle mode immediately after transmitting the message that includes the first data packet.

12. The method of claim 8, further comprising:
   receiving a second data packet, wherein receiving the second data packet does not establish a radio resource control connection with a network access node.

13. The method of claim 12, wherein the encryption key is a user plane encryption key and the integrity protection key is a user plane integrity protection key, wherein the user plane encryption key and the user plane integrity protection key are maintained at the client device, and wherein receiving the second data packet comprises at least one of verifying the second data packet with the user plane integrity protection key or decrypting the second data packet with the user plane encryption key.

14. The method of claim 8, wherein the control packet is a tracking area update.

15. The method of claim 1, further comprising:
   receiving a page message from the network.

16. The method of claim 1, further comprising:
   transmitting an empty packet with the user plane encrypted client device context to the network.

17. The method of claim 1, wherein encrypted client device context is received from the network as a result of a successful authentication with the network.

18. The method of claim 17, wherein the successful authentication with the network does not establish an Access Stratum security context.

19. The method of claim 1, further comprising storing the one or more encrypted client device contexts in a local storage.

20. The method of claim 1, wherein the one or more encrypted client device contexts is not decrypted at the client device, and wherein the one or more encrypted client device contexts is decrypted only by a network device that generated the one or more encrypted client device contexts.

21. The method of claim 1, wherein the message further includes a resource establishment request, further comprising:
   receiving a network address for the client device in response to the message; and
   transmitting a plurality data packets that include the network address to the network.

22. The method of claim 1, further comprising:
   transmitting a resource release request message to the network, wherein the resource release request message enables the network to release one or more resources for the client device.

23. The method of claim 1, wherein the context is removed at the network after receiving the one or more encrypted client device contexts from the network.

24. A client device comprising:
   a wireless communication circuit configured to communicate with a network access node; and
   a processing circuit coupled to the wireless communication circuit, the processing circuit configured to
   transmit a request to communicate with a network;
   establish a security context for a connection with the network, wherein the security context includes at least one of an encryption algorithm, an encryption key, an integrity protection algorithm, an integrity protection key, or combinations thereof;
   receive one or more encrypted client device contexts from the network in response to the request, wherein the one or more encrypted client device contexts include network state information associated with the client device, the network state information including at least the security context and information associated with one or more bearers for the client device; and
   transmit a message that includes at least one of the one or more encrypted client device contexts to the network, wherein the one or more encrypted client device contexts enable reconstruction of a context at the network for communication with the client device, the context including the network state information.

25. The client device of claim 24, wherein the context is removed at the network.

26. The client device of claim 24, wherein the processing circuit is further configured to:
   determine at least one of the one or more encrypted client device contexts to use based on whether the message includes data or control information.

27. The client device of claim 24, wherein the encrypted client device contexts include a first context to be used for data related communication with the client device and a second context to be used for control related communication with the client device.

28. The client device of claim 24, wherein the one or more encrypted client device contexts includes at least one of a security context, a quality of service for a bearer, a tunnel endpoint identifier, or combinations thereof.

29. The client device of claim 24, wherein the processing circuit is further configured to:
   store the one or more encrypted client device contexts in a local storage.

30. The client device of claim 24, wherein the one or more encrypted client device contexts include a user plane encrypted client device context and a control plane encrypted client device context, and wherein the message includes:

a first data packet with the user plane encrypted client device context, or a control packet with the control plane encrypted client device context.

31. The client device of claim 30, wherein the encryption key is a user plane encryption key and the integrity protection key is a user plane integrity protection key, wherein the user plane encryption key and the user plane integrity protection key are maintained at the client device, and wherein the first data packet is at least integrity protected with the user plane integrity protection key or encrypted with the user plane encryption key.

* * * * *